US006047323A

United States Patent [19]
Krause

[11] Patent Number: 6,047,323
[45] Date of Patent: Apr. 4, 2000

[54] CREATION AND MIGRATION OF DISTRIBUTED STREAMS IN CLUSTERS OF NETWORKED COMPUTERS

[75] Inventor: Michael R. Krause, Boulder Creek, Calif.

[73] Assignee: Hewlett-Packard Company, Palo Alto, Calif.

[21] Appl. No.: 08/671,562

[22] Filed: Jun. 27, 1996

Related U.S. Application Data

[63] Continuation-in-part of application No. 08/545,561, Oct. 19, 1995, and application No. 08/593,313, Jan. 31, 1996.

[51] Int. Cl.$^7$ ........................................................ G06F 9/40
[52] U.S. Cl. ........................... 709/227; 709/201; 709/231; 709/301
[58] Field of Search .......................... 395/200.31, 200.46, 395/200.55, 200.59, 200.68, 200.57, 200.61, 200.6, 200.74, 200.78, 200.79, 681; 709/201, 216, 225, 229, 238, 230, 244, 248, 249, 301, 231, 227

[56] References Cited

U.S. PATENT DOCUMENTS 5,517,668  5/1996  Szwerinski et al. .................. 395/200.6

OTHER PUBLICATIONS

Artsy and Finkel, "Designing a Process Migration Facility The Charlotte Experience," 1989, IEEE, Sep. 1989.

Sinha et al., "Process Migration in the GALAXY Distributed Operating System," 1991, IEEE.

Taudes, "How to Migrate Processes in Distributed Computing Systems —a Markov Team Approach," 1992, IEEE.

Malkawi et al., "Process Migration in Virtual Memory Multicomputer Systems," 1993. IEEE.

Goldman, "Data Interfaces as Support for Module Migration," 1994, IEEE.

Swaminathan and Goldman, "Dynamic Reconfiguration with I/O Abstraction," Paper from Department of Computer Science, Washington University, Campus Box 1045, One Brookings Drive, Saint Louis, MO 63130–4899, Mar. 17, 1995.

Paindaveine and Milojicic, "Process vs. Task Migration," 1996, IEEE.

Roush and Campbell, "Fast Dynamic Process Migration," 1996, IEEE.

Koyama, Shimzu, Ashihara, Zhang, and Kameda, "Performance Evaluation of Adaptive Load Balancing Policies in Distributed Systems," Department of Computer Science, The University of Electro–Communications.

Bernadat, P. (OSF Res. Inst., Gieres, France), "An Implementation of Streams For a Symmetric Multiprocessor UNIX Kernel", Proceedings of the Autumn 1989 EUUG Conference Buntingford, UK: Eur. UNIX Syst. User Group, 1989, p. 21–9 of x+302 pp., Sept. 1989.

Garg, A, Parallel Streams: A Multi–Processor Implementation, Berkeley, Calif.: USENIX Assoc., 1990.

*Primary Examiner*—Frank J. Asta
*Assistant Examiner*—Daniel Patru

[57] ABSTRACT

A distributed STREAMS process operates on a multicomputer system composed of a cluster of nodes of one or more processors running an operating system having a file system and a STREAMS message-passing mechanism implementing network protocols, client-server applications, and STREAMS-based pipes. A local node has a software application operative under the operating system. The distributed STREAMS process determines that it is operating within a cluster and transparently intercepts application open requests which are sent to a controlling thread (CT) created during node initialization. The CT determines whether the open is to occur on the local or a remote node and whether any cluster facility should be activated by examining major and minor numbers encoded within the file structure being opened. If the CT determines a local open is to occur, it performs a local open, as normal, and activates the indicated cluster facilities. If the CT determines a remote open is to occur, it uses the STREAMS mechanism to establish a connection to the remote node via a STREAMS software interconnect driver (S-ICS) operating on both nodes. The local node's CT then communicates the open request to the remote node's CT which performs an internal STREAMS open to create data structures and infrastructure to ensure proper communication and error recovery. If a failure occurs, the CT and S-ICS detect this failure and transparently initiate error recovery by migrating failed components, if possible, to new node(s) within the cluster. This migration capability can also be used to provide load balancing within the cluster of distributed STREAMS.

47 Claims, 19 Drawing Sheets

Middleware 50 generates the following message and sends it to the controlling thread on the source node

```
Stack ID:<node, sth address>
Target Node: Ox......
Target Ctl Thread Addr: Ox....
Migration Failure Policy:
Re-probe for new node
Migration Req ID: Ox....
```

Controlling thread 34 on source node generates the following message and send it to the controlling thread 34A on the target node

```
Stack ID:<node, sth address>
Source Ctl Thread Addr: Ox....
Source Node Addr: Ox....
Migration Req ID: Ox....
```

Controlling thread 34A on target node generates the following message and send it to the source controlling thread 34

```
Migration Req ID: Ox....
Migration Success:Success
Type of Failure:None
New Load Level: Ox....
Misc:....
```

Source Controlling thread examines this message and determines if error recovery is necessary. If so, then updates the message and informs middleware. If not, then it updates its local information and the S-ICS forwards the message to the original middleware requester.

FIG. 8

CREATION AND MIGRATION OF DISTRIBUTED STREAMS IN CLUSTERS OF NETWORKED COMPUTERS

RELATED APPLICATION DATA

This application is a continuation-in-part of commonly-assigned, copending application Ser. No. 08/545,561, filed Oct. 19, 1995, titled "Dynamic Function Replacement for STREAMS Framework" and Ser. No. 08/593,313, filed Jan. 31, 1996, titled "STREAMS Function Registering."

© Copyright Hewlett-Packard 1996: The disclosure of this patent document contains material which is subject to copyright protection. The copyright owner has no objection to facsimile reproduction by anyone of the patent document or the patent disclosure, as it appears in the Patent and Trademark Office patent file or records, but otherwise reserves all copyrights whatsoever.

BACKGROUND OF THE INVENTION

This invention relates to the interoperation of networked computers and more particularly to a distributed operating system for a cluster of computer nodes.

A node is a computer which is composed of one or more computational processors (potentially a SMP—Symmetrical Multi-Processor), local memory, an Input/Output subsystem, and optional peripheral devices. Hence, a cluster is a set of two or more nodes that cooperate at some level to solve a problem. The nodes within a cluster may be interconnected using a variety of software and hardware solutions depending upon the price-performance requirements. Depending upon how a cluster is implemented—shared memory or message passing—a cluster can provide the following capabilities: high availability since no single point of failure mandates halting a distributed application, application load-leveling to increase or more efficiently utilize cluster-wide resources, hardware sharing, increased aggregate computational and I/O bandwidth, increased access to resources such as mass storage, networking, etc.

STREAMS is a relatively light-weight message-passing framework that has become a deface standard for implementing networking protocols and client/server applications/services upon. The conventional STREAMS mechanism is described in UNIX System V Network Programming, S. A. Rago (1993), Ch. 3 and 9. For example, NFS, UDP/IP, TCP/IP, SPX, NetBIOS, SNA, and DLPI all define networking protocols which have been implemented by a number of vendors utilizing the STREAMS framework. Applications based on these protocols and services should be able to take advantage of what a cluster has to offer if clustering is to be successful.

Accordingly, a need remains to modify the STREAMS framework to comprehend cluster infrastructure needs and to facilitate applications and cluster facilities executing within this environment.

SUMMARY OF THE INVENTION

An object of the invention is to solve a large class of customer problems such as high-availability, increased computational and I/O performance, single-point of administration, etc. in the multicomputer environment (commonly known as a cluster) by enabling STREAMS to work in such an environment.

In accordance with the invention, the STREAMS framework is modified such that it can create distributed streams and be able to migrate these streams among nodes in the cluster.

Another object of the invention is to make all of this work transparent to customer applications, both in user-space and within the kernel. The process of the invention meets this need by modifying the STREAMS framework to shield the software from realizing it is within a clustered environment, a problem no other vendor has solved to my knowledge.

A cluster is an arbitrarily large set of computers which are interconnected via a high-speed communication link. The cluster, itself, can be connected to non-clustered nodes via standard networking links such as FDDI, ATM, or 100VG-hardware links and drivers installed on a subset of the cluster nodes providing gateway services. These standard networking links can use standard networking protocols such as TCP/IP to communicate while the cluster interconnect preferably uses custom lightweight protocols.

A node is a computer which is composed of one or more SPU (System Processor Units), local memory and cache, an Input/Output subsystem, and optional peripheral devices such as mass storage. A node is used to solve a problem.

A distributed stream is a stream which has been split between two nodes at some predesignated point. This will be commonly done between a module and a driver. For example, the TCP/IP protocol can be split such that TCP or UDP resides on one node and IP resides on another. The rules for deciding whether to split are usually based on what state information is maintained, where and performance considerations. For the reminder of this description, I will use TCP/IP as an example since it is well understood and is commonly implemented.

A distributed STREAM is a STREAM which has any of the following characteristics/properties:

The application and the entire STREAM stack may exist on the same node, just as in the non-clustered environment, but the STREAMS-related framework infrastructure can be utilized to take advantage of the cluster facilities such as load leveling, high availability, etc.

The STREAM stack may execute on a different node from where the application accessing it is executing.

The STREAM may be broken into constituent components at the module/driver/stream head levels with each component being executed on different, individual nodes within the cluster.

STREAMS-based pipes may have each pipe end executing on a different node within the cluster.

A STREAM stack may be migrated, either in whole or part, from one node to another.

The invention implements distributed STREAMS in a cluster using the following system components: a controlling thread, a set of preview functions, and a P-ICS driver; and preferably also a S-ICS driver.

A thread is a software processing element that provides a set of functionality via executing application instructions on a computer.

A controlling thread is a specialized thread which acts as a third-party communication and control point for a distributed STREAM. The basic functions are described in the detailed explanation of the technology.

A S-ICS driver is the STREAMS software interconnect driver which is responsible for moving messages between any of the following components: The application's STREAMS stack, the controlling thread, the P-ICS, and preview functions. A P-ICS is the physical cluster interconnect which provides the basic communication fabric.

A preview function is a STREAMS-based function enabled via STREAMS Dynamic Function Replacement which examines messages to multiplex them between the various components within this system.

FIG. 5 illustrates a distributed stream, an interconnect driver, and an independent middleware software thread. Note that the middleware involved, while key to making distributed STREAMS possible, the processes being described are completely independent of the middleware implementation—a significant advantage since it makes it possible to interoperate with multiple middleware suppliers as long as the communication interface is standardized.

As can be seen, the stream has been split onto two or more nodes and makes use of middleware existing upon one of the two nodes or a third node. The interconnect drivers are further split between an intelligent Streams-based driver (S-ICS) and a dumb, physical driver (P-ICS—FIGS. 2A, 2B, 3A, 3B) which may be reused for non-Streams related internodal communications. The intelligent Streams-based driver contains the protocol for communicating with the middleware and the kernel daemons which handle STREAMS requests/replies.

The basic stream creation algorithm for creating the illustrated configuration is given below. This algorithm utilizes a new in-kernel STREAMS interface.

Open the device file via the normal open( ) path. Since the file system has a single system view from the application's perspective, no application changes are necessary but it is necessary to determine the correct node to perform the open upon, as described.

When the file system performs the open, VFS (virtual file system) will eventually call the STREAMS framework open routine. Using the framework's autopush and configuration capabilities, instead of opening the target driver, IP in this case, we transparently open the interconnect driver. This is accomplished by remapping the device number of the interconnect driver to the target device number which is stored for later usage. The kernel remapping actually occurs at the time the drivers are installed within the system during system boot. The STREAMS framework may need to recognize when a driver has been configured for clustering.

STREAMS then performs the interconnect driver open just as it normally would for any driver. At this point, we have only a stream head and a driver instance on the node where the application currently resides.

The next step is to perform an open on the node where the actual driver resides. In order to do this, the saved device number is remapped into a node address. The STREAMS-based interconnect driver communicates to the middleware via a suitable protocol and determines what the target remote node is and all pertinent communication information. This communication may either be configured as part of the interconnect driver's open routine processing or it may be initiated via a transparent ioctl to the driver telling it to probe and take the following action—this is an implementation issue but it should be noted.

The interconnect driver then creates a message which is sent to the target node to a well-known address. Within this node, there exists an in-kernel daemon or controlling thread which listens for such requests and is awakened upon the message arrival. This daemon decodes the request and optionally (1) processes it itself, (2) performs a thread-create to handle the request, or (3) hands it off to an existing thread which is already multiplexing multiple target driver instances.

At this point, the thread handling the request will perform an in-kernel streams_open( ) on the target node using the original device number derived from the application's open request. The streams_open( ) opens up the IP driver just as though the IP driver existed on the same node as the application. Once IP is opened, the stream head address is returned to the initiating node's interconnect driver and this address combined with the remote node's address are used to create a unique addressing tuple within the cluster without having to create another independent naming scheme. This tuple will later be used for stream migration and verification.

At this point, the application should be able to return from the open( ) and continue processing without any modification.

As can be seen, this process does not require any modifications to the user application, the TCP module, or the IP driver—a key capability for a cluster configuration to be successful.

Stream migration involves migrating either one or both halves of the distributed stream within the cluster to new nodes. The migration must occur transparently to the application and should not require modifications to the stream stack's components. Using the previous example, we have two points of potential failure. The first point is the node where the IP driver resides. If this node fails for some reason, the connections currently executing through this node should not fail nor notice the failure. The interconnect driver would see that it has lost its connection with the node and initiate a recovery protocol using the previously described stream creation process.

For the upper-half of the stream, it is sometimes desirable to migrate applications for various reasons such as load-balancing or system maintenance. This type of migration is more difficult since the upper-half and the application must be placed in stasis until the migration is completed and the lower-half must not attempt to ship inbound data to the upper-half since the upper-half will not be able to process the information and this could lead to timing and data corruption problems.

Conventional implementations involving splitting TCP/IP onto different nodes have relied upon modifying the actual modules involved, which directly impacts performance, supportability, maintenance costs, increases development time, increases cost, etc. This is an unnecessary burden since it limits what modules and drivers can be easily executed within a clusters. In order to remove this burden, the following process is given:

The process proposed to migrate TCP (used only as an example since this is applicable to any module) within a distributed STREAMS environment utilizes key features of the STREAMS framework combined with a new ioctl to transparently migrate the TCP module without it being aware that the migration is occurring and without requiring modification to the module itself. This process requires one function to be written by the module/driver developer which is used to marshall the data structures and messages currently associated with the structure pointed to by q→q_ptr. The actual details of this function are not relevant at this time, only that this is a critical step in transparently migrating a stream.

The basic stream migration is as follows:

An independent thread on node A or the application itself, should it be designed to migrate itself or connections from one node to another, issues a new ioctl which will be interpreted by the STREAMS framework that migration is to occur. This ioctl will contain all of the necessary information to move the stream to a new node.

The framework issues an ioctl to the interconnect driver to inform its remote driver handler thread that it is about to migrate and to treat it as being flow controlled, for all intents.

The framework then freezes the local stack and executes a marshalling function upon each module's q_ptr structure, a module private data structure. This marshalling function will return all of the information necessary to replicate this structure and associated memory on the target node.

When this information is gathered, the framework delivers it and all framework specific information, such as stream head state and messages, and sends this to a daemon on the target node which then either re-creates the stream stack immediately or awaits the process to be re-established and then recreates based on which node opened the stream. For example, if this was an in-kernel application such as NFS then the stream could be completely recreated immediately and the NFS process would be notified of its creation and re-initialization. If this was a user-space socket application, the process waits until the application is fully migrated before re-creation occurs.

Once the stream stack has been recreated, the new interconnect driver instance informs the remote node that it is now capable of receiving messages and the communication begins anew. All of this is transparent to the application, the modules, and the drivers involved.

Similarly, should the node where the IP driver runs fail, the user-application will need to continue operation without change. For this to occur, the interconnect driver will need to recognize when failure has occurred and re-establish its connection via the previously described open process on a new node.

The processes described provide the following advantages within the cluster environment:

Streams may be split and distributed to multiple nodes without requiring modification to the drivers or the modules involved. In the past, only heavy modification to these components allowed them to be distributed which added complexity and cost performance.

No modifications means shorter development times, reduced support and troubleshooting time, and reduced testing times. In addition, the developer does not need to learn how the cluster environment works since, for all intents and purposes, well-designed STREAMS drivers and modules work together identically to the way they worked on a single node. This means a user of the invention will be able to open the cluster environment to third-party ISVs faster and at a lower cost than prior systems.

Streams may be migrated between nodes without requiring modifications to either the drivers or the modules, again removing the complexity and performance loss from the current mechanisms used.

Migration requirements are limited to a single function which is independent in its execution of the driver or module's normal STREAMS framework interaction.

The system may be utilize any P-ICS driver without requiring any modifications to the basic technology implementation within the controlling thread or the S-ICS; the technology provides a set of common data structures and interface which provides P-ICS independence. This allows the technology to transparently take advantage of future P-ICS improvements.

Any STREAMS-based implementation of a protocol or application stack may be transparently, i.e. ported without modification, implemented and executed within a cluster.

The basic STREAMS framework implementation operates without modification to any DDI/DKI (Device Driver Interface/Driver Kernel Interface) routines. In addition, all STREAMS framework messages, commands, logging and administration drivers, system calls, Dynamic Function Replacement, Dynamic Function Registration, and stream head behavior all execute just as in the non-distributed environment. This allows the stack to be designed using the normal single-system paradigm and does not require, aside from marshalling functions if supported, the designer to understand or develop with the cluster configuration in mind.

The distributed STREAMS implementation may be performed without modifying the VFS (virtual file system) implementation which ensures portability to other operating systems which implement STREAMS under VFS.

It is assumed that the reader is skilled in the art and familiar with clustering, operating system design, networking, distributed systems, and STREAMS concepts and framework design/implementation. Additional terminology is defined in the Detailed Description.

The design is protocol independent. This means that the design may be used for a variety of network or other application protocols and does not require any changes to be implemented. Some of the preview functions may require minor modifications but these will center more around how the solution is applied. For example, the IP bind preview functions are specific to the global port management solution but are not required to implement the base TCP/IP implementation using this technology.

The design may make use of any number of different P-ICS driver implementations without requiring S-ICS driver or controlling thread redesign. This allows the design to take advantage of new technologies or fabric paradigms such as shifting from receiver-based communication to sender-based communication which offers a number of simplifications and performance improvements.

The design illustrates how all aspects of the STREAMS framework are accomplished within a distributed environment. This includes commands, logging (strlog), administration (SAD), pipes, system calls, DDI routines, etc. For the most part, the STREAMS framework does not require many modifications since the controlling threads, S-ICS drivers, and some of the, preview functions perform a majority of the work. This allows the technology to be quickly integrated into other STREAMS implementations other than just HP's. In addition, because the S-ICS drivers and controlling threads are independent of the STREAMS implementation, other than requiring the Function Replacement capabilities, their design should be portable to other vendor's platforms.

The design does not require STREAMS-based modules and drivers to be modified to operate within a distributed environment. This is a key issue since both Sun and Locus appear to require the protocol modules such as TCP, UDP, and IP to be extensively modified to operate. This is really where this design differentiates itself from anything else that has been proposed. The design concentrates the changes within the different components outside of the modules and drivers supplied by the application which makes porting them and supporting them much faster and cost effective.

The design also eliminates the need to modify the VFS (virtual file system) layer to accommodate distributed driver opens. The design proposes a unique and protocol independent open and migration algorithm.

The foregoing and other objects, features and advantages of the invention will become more readily apparent from the following detailed description which proceeds with reference to the drawings.

BRIEF DESCRIPTION OF THE DRAWINGS

FIG. 8 is a diagram illustrating a portion of the flow of messages between the controlling thread and the middleware in the process of FIG. 5 showing how the middleware informs the controlling thread on a source node of a component failure and sends recovery target node/thread information to the source node.

APPENDIX A is A Transport Independent and STREAMS Kernel Interface description of the STREAMS interface implemented in HP-UX 10.10 and later releases.

DETAILED DESCRIPTION

1.0 General Description

1.1 Example Cluster Setup

Figure 1:
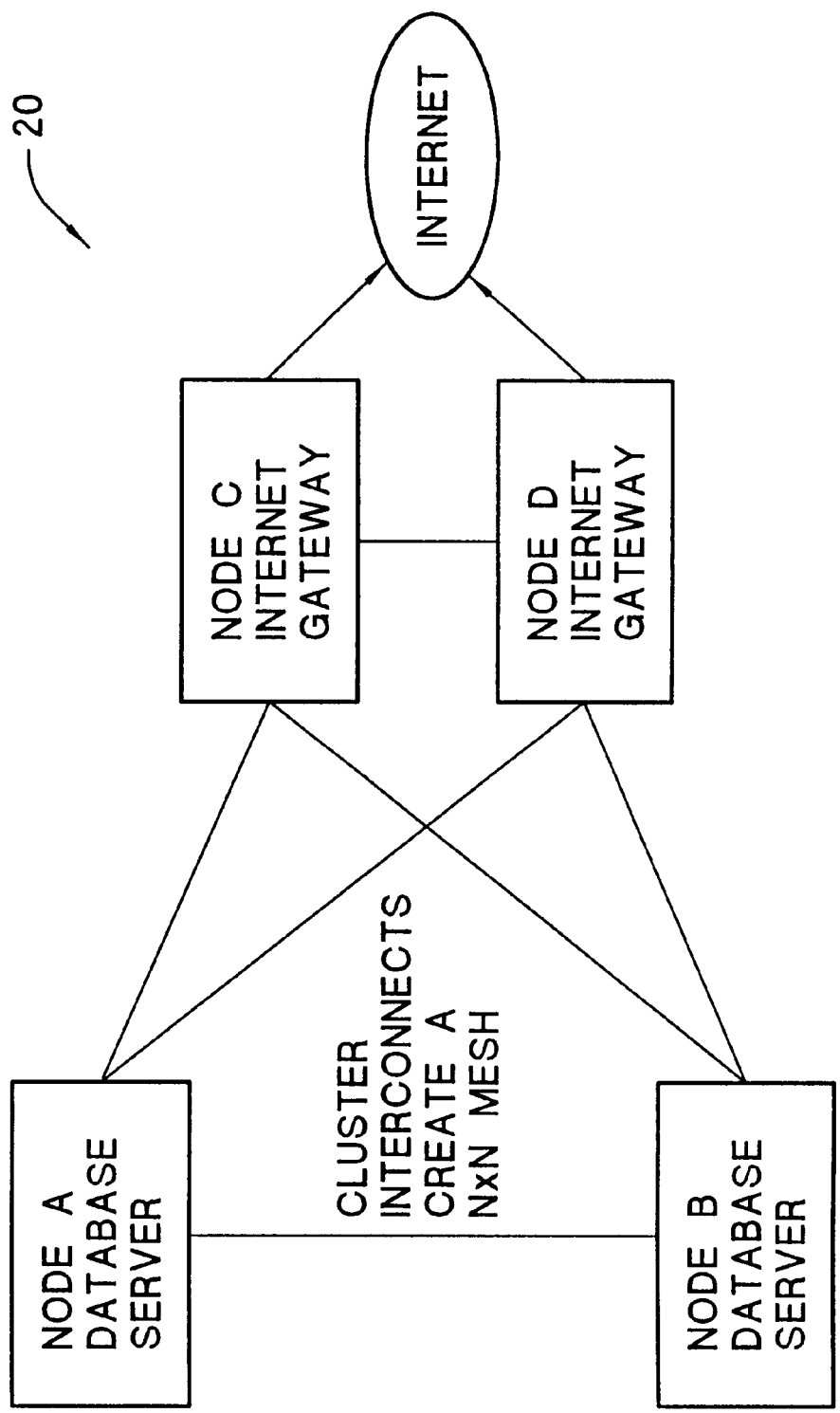
FIG. 1 is a block diagram of an example cluster of computer nodes interconnected by high speed digital data interconnects and operable in accordance with the present invention.

Referring to FIG. 1, the example cluster is based on combining a number of new and existing technologies to create a unique cluster solution which cannot be easily duplicated using conventional distributed application techniques. The cluster can be used by remote client applications to access a distributed database which is used to implement a highly available data warehouse. The client applications can utilize a world-wide web browser such as Netscape to create query requests and to examine the results. A browser offers advantages over conventional client software in that it has a consistent interface and operating criteria which makes it easier for remote users to learn and execute and to examine data.

The number of nodes used to implement the various portions of this solution within the cluster depends upon the size of the data warehouse and the number of clients which are simultaneously accessing the data. For example, a small data warehouse with several hundred gigabytes of data can be implemented using four to eight nodes for the data warehouse and two nodes acting as the Internet gateways. A large data warehouse consisting of several terabytes of data would be implemented with sixteen to thirty-two nodes with four to eight nodes acting as Internet gateways if the number of remote clients is high with the remaining nodes acting as data base servers.

Each Internet gateway node can communicate to the remote clients using one to four 622 Mb ATM links. All nodes will be linked together using a cluster interconnect solution which may consist of a combination of hardware, software, and firmware technologies.

The example shown in FIG. 1 utilizes a small, four node cluster containing nodes A, B, C, and D. Nodes A and B implement the distributed data base which provides the data warehouse; nodes C and D act as the Internet gateways and query engines providing access to the remote clients. All nodes are interconnected via some high speed technology. The interconnect may be through some arbitrated loop or a switch technology. In any case, all nodes may directly access every node within the cluster. The actual technology used to implement the interconnects is independent of distributed STREAMS, but there are, of course, preferred technologies which make the STREAMS design and implementation easier. This independence is a design advantage since new technologies may be incorporated and taken advantage of relatively transparently—this leads to a longer-life, lower cost solution for applications, protocols, and cluster services built on top of distributed STREAMS.

The assumptions made about the cluster are:

The cluster is interconnected via software/hardware upon which STREAMS and streams-based drivers may execute.

Each node's operating system instance is multi-threaded and should be MP-scalable.

The cluster may provide an optional middleware framework to which STREAMS may probe or supply information. Such communication takes place via a well-defined interface. A middleware framework, at least some entity such as a controlling thread is needed if STREAMS is to make intelligent decisions for the various operations it performs. Note: while this STREAMS design, itself, is middleware independent, the actual extent to which the design implementation actually utilizes this middleware is strictly implementation dependent. This should be kept in mind when understanding what the controlling thread is and how it might be used to perform some, if not all, of the middleware tasks depending upon how it is implemented.

A distributed stream is a STREAM which can operate over a clustered environment in any of the following, but not restricted to, ways:

The application and the entire stream stack may exist on the same node, just as in the non-cluster environment, but the STREAMS-related cluster framework infrastructure is being utilized to take advantage of the cluster facilities such as load leveling, high availability, etc.;

The stream stack may execute on a different node from where the application accessing it is executing;

The stream may be broken into constituent components at the module/driver/stream head levels with each component potentially being executed on individual nodes within the cluster;

In the case of streams-based pipes, each end of the pipe may exist on a separate node within the cluster.

The main point is that the stream has been somehow separated from its accessing application in some manner which would not normally exist if the stream were operating on a single node. This separation is made for a number of reasons which will be explained below.

A stream is distributed for any of the following (but not restricted to) reasons: to take advantage of cluster-wide facilities, for applications to have a single system view of a cluster 20 which should facilitate their execution and management within a cluster, and to provide high availability, load balancing, and hardware sharing. A side effect of distribution is higher overall cluster performance with reduced CPU overhead. To illustrate these concepts, the following examples are given using the example cluster described in the next section.

1.2 Hardware Sharing

A cluster 20 implemented in accordance with the invention enables substantial hardware sharing. Hardware sharing offers a number of benefits over the conventional system configuration:

Increased hardware selection and flexibility since each node may be scaled in terms of processing capabilities, memory, I/O backplane, etc. to the task it is performing. In other words, the cluster is not required to be a homogenous set of nodes. In the FIG. 1 example cluster, the gateway node (C, D) configuration can be: 4-way SMP, 32-bit processors, two fast-wide SCSI 4GB discs, 256 MB of memory, two 622 Mb ATM networking cards, and one interconnect card though two could be installed if HA is an issue. The database server configuration can be: 4-way SMP, 64-bit processors to address a large address space, Fibre Channel attached disc arrays with multiple TB of disc capacity, and one (two) interconnect card Lower hardware purchase and maintenance costs over the cluster lifetime. In the example cluster 20, only the gateway nodes C, D need to have 622 Mb ATM cards installed. This not only reduces the number of cards, which while short-term expensive are long-term inexpensive since the fixed card cost is amortized over the cluster lifetime, but it also reduces the number of communication lines that must be installed. A communication line that can support a 622 Mb ATM card is quite expensive and each line has recurring usage and maintenance costs that may be difficult to amortize over the cluster lifetime.

Improved security due to solution being partitioned. The three main parts in this example solution—the remote client, the gateway, and the database server—all execute on different nodes. This allows both physical and software security to be easily implemented and enforced at these well-defined execution points.

Solution partitioning also reduces the number and types of failure points. For nodes A and B, the failure points are restricted to mass storage, the database software, the distributed application, and the cluster interconnect. For nodes C and D, the failure points are restricted to mass storage (but on a much smaller scale since these nodes should not require much mass storage), the gateway hardware, the networking protocol stacks, the query engine, the Internet software, and the cluster interconnect. In any case, with a reduced number of failure points, the solution has fewer places where Murphy's law applies, increased fault isolation, easier debugging, reduced cluster complexity, and lower administration/support costs since a single point of database or gateway administration may be created.

Within the example cluster environment, hardware sharing also improves overall aggregate cluster performance and efficiency by keeping the TCP/IP stack executing only on the gateway nodes. This is accomplished using the standard RPC (Remote Procedure Call) function shipment paradigm to ship only the results of remote execution to each node.

In a conventional distributed client/server application, each node would normally execute the TCP/IP stack and then use packet forwarding to the gateway nodes to communicate to the remote clients. The problem with the conventional approach is that the number of cycles necessary to perform all of the work associated with creating, processing, and routing packets through the gateway may be several thousand of cycles per packet. Expending this many cycles per packet, considering the number of remote clients possible and the amount of data being routed, is not optimal and leads to reduces cluster performance:

Cycles spent on networking are not being spent on the database server so the customer is not realizing the maximum system performance that they were paying for. In addition, the instruction cache will suffer greater flux from switching between the database application and the networking code which will result in more cache misses reduced processor performance. Implementing network protocols over the cluster interconnect increases packet latency by increasing the contention for system resources (memory, processor and I/O buses, timers, etc.) and the interconnect I/O card. This translates into reduced cluster-wide performance for the distributed database and increased response time for the remote applications. Note: latency is viewed as the key to creating high-performance clusters so lower latency generally translates into faster response time and hence higher throughput and performance.

The interconnect solution can become overly complex, resulting in poor performance and higher design costs, if it must support all of the capabilities of transport protocols such as TCP or UDP require.

Using STREAMS-based TCP/IP as an example, instead of creating a client/server application between the database application on node A and the remote Internet application, the present invention distributes the application such that the TCP/IP connection need only exist on node C and is transparently accessed from the application on node A via the standard RPC (remote procedure call) function shipment paradigm. Function shipment basically ships functional execution from one location to another, which in this example, allows the cluster to off-load from nodes A and B all of the expensive TCP/IP processing cycles to nodes C and D; this should translate into higher system performance for nodes A and B. How this is accomplished within the STREAMS framework is discussed below.

1.3 Load Balancing

Load balancing is used to even out the work load among the nodes within the cluster. In the example cluster 20, load balancing can be utilized in two areas: the database server and the Internet gateway. For the database server nodes, if the database has been properly distributed, the probability of a request targeting each server node should be the same. Unfortunately, probability does not always reflect reality. If the requests create "hot spots" within the database, the cluster nodes will not be used equally and the aggregate cluster performance may be reduced. Similarly, if a disproportionate number of remote clients enter the cluster via Node C and not node D, then the cluster response time to client queries can be increased. In such situations, the solution is to impose load balancing policies and migrate applications, application instances, data, connections, or any combination of the above to lighter loaded nodes. The following example illustrates how this works using STREAMS-based pipes.

STREAMS-based pipes are bi-directional queues which can be used to send and receive data between two or more cooperating threads of execution. Examples range from the simple such as command-line processing to the complex where multiple clients are communicating with a server application via a well-known pipe end. Applications make use of STREAMS-based pipes instead of memory-based pipes when additional filtering or pre-processing of data is needed—memory-based pipes cannot have filtering modules pushed into the middle of the pipe to accomplish this work.

Within cluster example 20, the database server application can be composed of a set of cooperating threads that communicate via pipes. When the cluster becomes unbalanced, one solution is to migrate some component of the database or some of the database server instances to the other nodes within the cluster. In prior distributed environments, this approach means redesigning the application to utilize a different communication paradigm such as Sockets or to understand when a migration occurs how to switch to the new paradigm. Such redesigns are expensive and reduce the number of applications that can ported or are capable of taking advantage of the benefits of clustering—this is unacceptable to many customers. To solve this problem, the application can continue to utilize pipes (STREAMS-based pipes may be transparently substituted for memory-based pipes even if the application does not take advantage of the added functionality). When the unbalance is detected, either pipe end or the entire pipe and the associated thread of execution is migrated to a new node within the cluster. All of this occurs without having to modify a single line of code within the application.

1.4 High Availability

High availability is a commonly-used expression to describe a software or hardware solution which provides fault tolerant behavior without necessarily providing all of the complexity nor cost of most fault tolerant systems. Extending the ability to distribute or migrate STREAMS described above provides the ability to recover from most single point failures for software and hardware within the cluster. For example, in FIG. 1, if a remote Internet application were communicating to an application on node B via the node D gateway and the node D gateway failed, we could initiate a recovery mechanism on node C which would transparently handle all the application activity as though it had being doing so from the beginning. Similarly, if the application contained synchronization points on node A and node B, then if either node failed, the remote client application would continue unaware of the recovery occurring, i.e. it would continue to operate normally, never sensing that a problem has occurred.

Note: distributed STREAMS can be used to recover from some single points of failure, primarily those where the component is a stateless entity such as DLPI. Distributed STREAMS cannot be used to recover from single points of failure for state-maintaining components such as TCP in the event of node failure. In such a case, the remote client application would sense that their connection has gone away and would need to be restarted—this is tolerated by customers today, but might not be tolerated in the future. Perhaps distributed STREAMS could make use of the research and prototyped solution of Brevix, a HP Labs project. Brevix defines a mechanism to allow specific traps to invoke error handling routines instead of just crashing the system. These error handling routines could be used to migrate client applications, and, hence, STREAMS instances to other nodes within the cluster. If this research could be extended to include more traps and the usage of the "panic" function could be replaced with an evaluation routine which would determine if it is safe to migrate applications before taking the system down, distributed STREAMS could provide a valuable high-availability solution that would allow a vendor to differentiate itself in the clustering market.

Brevix is limited in the number of system traps it can handle. These are usually limited to trap 15—Data segmentation fault, and, I believe, traps 18, 26, 27, and 28, which deal with memory protection and unaligned memory references. The advantage of Brevix is that it can be performed on a per subsystem basis so a recovery mechanism would be able to determine with some confidence whether it is safe to migrate the components depending upon the subsystem being effected.

Many kernel subsystems will call panic( ) when they cannot make forward progress or something corrupt has been detected. If panic( ) were changed from only having a message string to having a policy parameter, then the recovery and migration could be done more intelligently. The policy parameter would include whether to consider the entire subsystem suspect, if it impacts other subsystems, and what are the steps to recovery.

1.5 Single System View

Since a cluster 20 is composed of multiple nodes, a cluster is inherently more complex and potentially difficult to manage on a node by node basis. If, however, we view the cluster, at least from the application's viewpoint, as a single system, then many problems become much easier to solve. For example, if the application is using TCP/IP and binds itself to a particular port and then that application wishes to migrate for any reason to another node, we must ensure that no other application has already bound that port on the target migration node or the migration cannot take place. The way to solve this problem is to prevent the possibility of the problem ever occurring by using a cluster middleware to manage a cluster-wide port-space. The distributed STREAMS design of this invention provides techniques, algorithms, and STREAMS framework modifications which eliminate the need to modify the existing modules or drivers and allows the applications to execute transparently on any combination of nodes without modification.

1.6 DLKM and Single System View Issues

If the operating system supports dynamically loadable kernel modules (DLKM), each node within a cluster can be self-configured to only load and execute those modules for the applications being currently executed. In a distributed STREAMS environment, this is accomplished by having a flat file accessible for each node which describes how to load the STREAMS subsystem. At this point, STREAMS can then bring over the necessary modules and drivers to allow a streams-based subsystem such as TCP/IP to be loaded and configured for the application being executed. From the single-system view, there must be a mechanism that allows each node to find the cluster-wide configuration data as well as node-specific configuration data.

For DLKM to function, each node will be required to contain a flat file which contains the following information:

A list of nodes from which the STREAMS subsystem can be loaded so the streams-init function can proceed down this list and communicate with via a well-defined connection management protocol. This protocol will allow the initiating node to determine which nodes, if any, are capable of downloading the subsystem and to perform the actual download.

The file will also contain a set of default STREAMS drivers and driver load parameters which should be loaded whenever STREAMS is loaded. At a minimum, the clone, strlog, and sad drivers should always be loaded. Though it could be argued that these are not needed until an application attempts to open the driver, nearly every STREAMS-based driver makes use of these drivers either directly or indirectly so it is faster and simpler to load them at initialization.

The file will also contain a list of STREAMS-based subsystems which may need to be loaded and their corresponding server nodes. The idea is to pre-stage sufficient information such that these subsystems do not require a flat-file of their own. This would work by altering str_install( ) so that it can read this information via communicating with the server node and having it download the current data structures. The difference would be str_install( ) would not actually load the subsystem; it would only create the needed STREAMS infrastructure such that a subsystem load could be accomplished faster and with less information, i.e. a new flat file. This might eliminate the STREAMS subsystems from having to create new load facilities since everything would occur via STREAMS. In addition, since this is a cluster, subsystem loading might have a HA quality to it.

1.7 Design Problems

This invention provides solutions to a number of design problems connected to distributed STREAMS and streams-based applications. These problems are listed to familiarize the reader with some of the issues that are particular to the cluster environment and will hopefully lead to a better understanding of how the proposed design works and the reasons why it is designed this way.

With a single system view of the cluster, there is only one set of device files that an application may open. The problem to be solved is how to determine which node is the right node to open a device upon since the potential corresponding target hardware or software may not exist on every node? In addition, how do we determine this node based on a device file name which does not communicate this information? Such a situation was illustrated in the previous hardware sharing example.

If different parts of a streams-based stack are to operate on different nodes, how are these components created and interconnected without requiring any component design modifications? This is a key goal to creating an open cluster environment that will encourage developers to port their modules and drivers to clusters.

If a stream is to migrate from one node to another for load balancing or high availability reasons or whatever, how do we maintain state and correctness and do so without modifying the components design (Note: for some cluster facilities, each component might require additional functionality in order to take advantage of these facilities; other facilities will have default behavior and require no modifications or additional code)? We must be concerned with STREAMS put and service routines which may be executing asynchronously to the migration effort.

For modules or drivers which utilize the DDI/DKI standard utility strlog( ), how do we route messages to a single cluster log driver which an administrator may execute strace upon? Also, how do we distinguish between one nodes logging and another's logging, and do so without losing information or modifying the module or driver?

A number of STREAMS implementations (HP, Sun, OSF, Mentat, Unixware, etc.) utilize a number of different queue synchronization levels. These synchronization levels are key to ensuring correct queue access and operation. Within a cluster, how do we provide these capabilities and to what extent, if at all?

When creating streams-based multiplexors, how do we intelligently link the components together without creating unnecessary overhead and performance degradation? What do we do if one half of the multiplexor migrates to a new node and the other does not or cannot?

There are many more problems than these, but this should provide a basis to understand what must be solved before distributed STREAMS can be an effective solution within a cluster.

1.8 Design Rules

In evaluating a distributed STREAMS design, three design rules come to mind. The first rule is: any modifications to the STREAMS framework should not result in any performance degradation for the non-distributed STREAMS application. Too often, developers add a feature here and there to satisfy a subset of the customer base. Usually, no single feature costs much in terms of performance degradation, but over time, and an ever-expanding feature set, the sum of the performance degradations can add up to serious overall performance degradation which directly impacts the entire customer base. So, in adding distributed STREAMS functionality, the design must not add performance degradation that the entire customer base will experience. The temptation to spend a cycle here and there for convenience sake must be fought off whenever possible.

The second rule is: no STREAMS module or driver should require modification to work within a distributed STREAMS environment. This is key to getting third-party developers to develop their software on the target platform and to reduce the overall time and cost of developing, deploying, and supporting applications for the cluster environment. In the past, many cluster software developers have gone to such extremes as modifying the main paths of code to add checks to see if a cluster-specific operation must now be performed. This type of modification is not only unacceptable from a performance and cost perspective, but it restricts how clusters may be used and may reduce their appeal to customers. The only potential exception to this rule is that a module or driver may require additional functionality to be added in order to migrate an instance from one node to another. This functionality does not require modification of the existing code, but is added functionality which the STREAMS framework will utilize to migrate the module/driver's private data for which STREAMS normally remains ignorant. Also, module/driver functionality may be augmented using STREAMS Dynamic Function Replacement and Registration which are described in co-pending, commonly-owned U.S. Ser. No. 08/545,561, filed Oct. 19, 1995, and Ser. No. 08/593,313, filed Jan. 31, 1996, incorporated by reference herein.

The third rule is: to make the distributed STREAMS solution as middleware independent as possible. Wherever feasible, the design should confine the points and the circumstances when communication with the middleware takes place. This independence will yield more design flexibility and faster transition to new middleware technologies at a lower cost in terms of time to market, porting time, and overall product support.

2.0 Design Overview

Figure 2A:
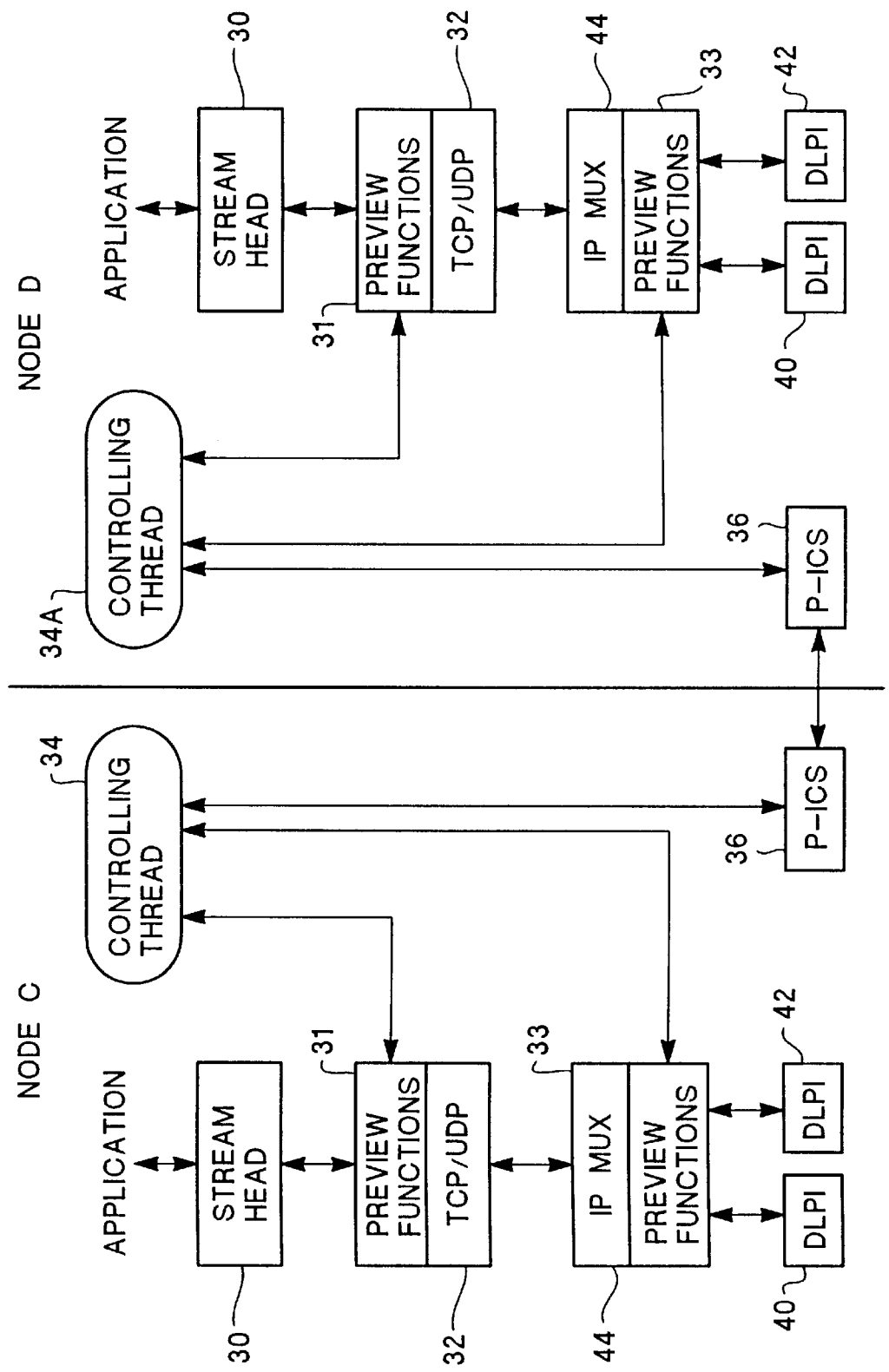
FIGS. 2A and 2B are more detailed block diagrams of a portion of the example cluster of FIG. 1 showing alternative modes of interoperation of nodes C and D.
Figure 2B:
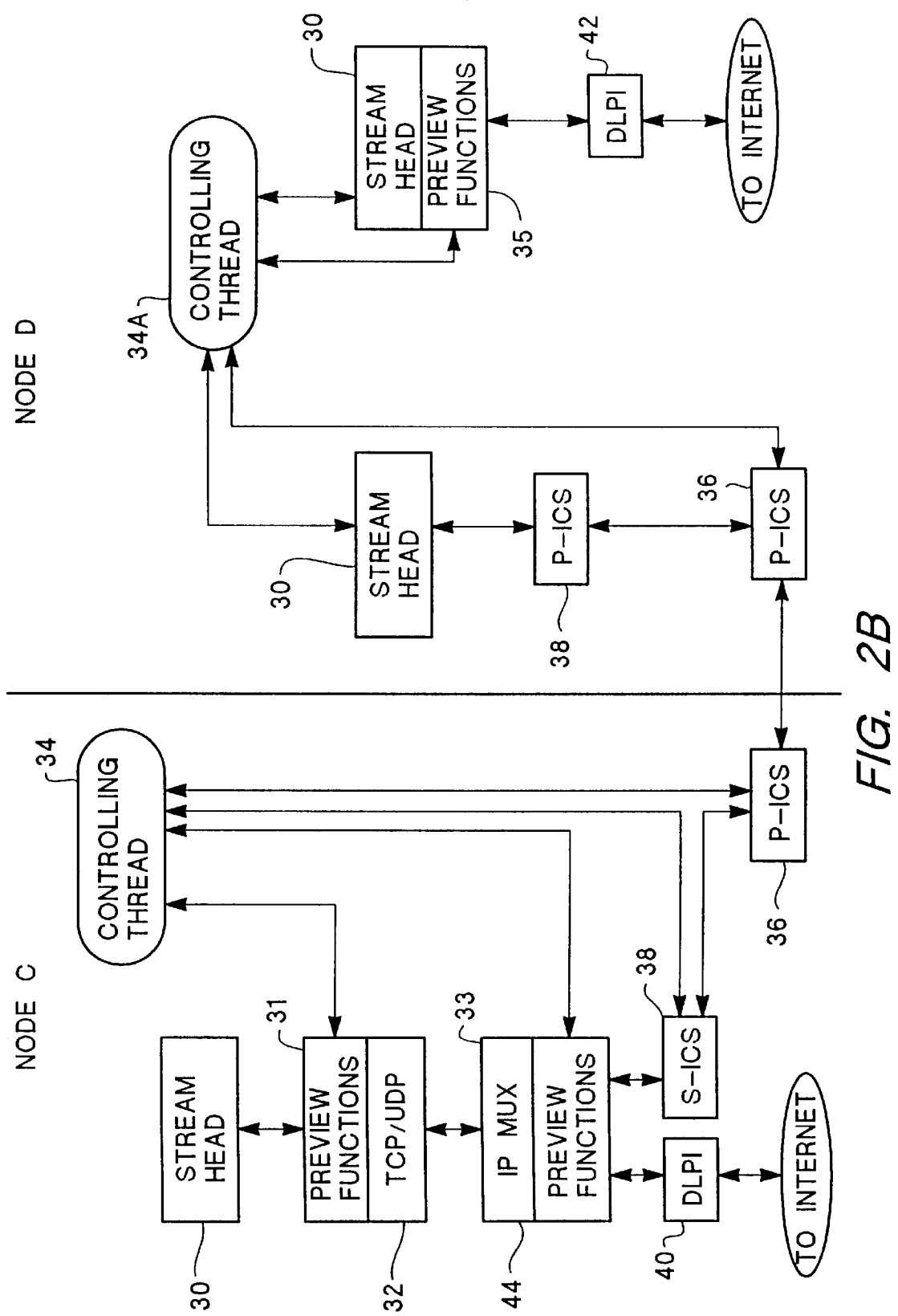

Referring to FIGS. 2A and 2B, the basic architecture of a STREAMS stack is a stream head 30 and a driver 44 with zero or more modules 32 pushed on top of the driver. More complex stacks may be created using software multiplexors which connect multiple stream stacks into a tree-like structure which may now be accessed and treated as a single stack instance. Keeping this in mind, the distributed STREAMS design will be explained in step-wise refinement throughout the rest of this description.

At a minimum, the design of the present invention will include a controlling thread 34 and a physical cluster interconnect driver 36 (P-ICS) 36. In addition, there may exist one or more instances of a STREAMS-based driver called the software cluster interconnect driver S-ICS 38. Each of these components will be explained in detail in later sections, but first let's examine two potential design configurations and how they can be used to solve different cluster problems. These configurations are illustrated in FIG. 2A and FIG. 2B.

The P-ICS provides a high-speed interconnect link using a light-weight, low-latency protocol which may contain both software and hardware components. These interconnects, are, for all intents and purposes, virtual circuits. Virtual circuits offer a number of conceptual as well as implementation advantages, the least of which is the ability to move an instance from one to another transparently with respect to the application. In addition, virtual circuits eliminate the need to maintain protocol-specific information within the streams or physical interconnect drivers or within the STREAMS framework, which simplifies the overall design and implementation, improves performance, and increases code re-use and flexibility. Also keep in mind that the simple architectures shown in FIGS. 2A and 2B do not imply any limitations on the number of STREAMS which can be managed nor what cluster facilities may be made available to each stack.

In the first configuration, FIG. 2A shows a TCP/IP stack with multiple DLPI ATM drivers 40, 42 linked under the IP multiplexor 44, i.e. this is the standard configuration one might find in a STREAMS-based TCP/IP implementation. In addition, there are three other components illustrated. The first two are the controlling thread 34 and the P-ICS 36; the third is a set of preview functions 31, 33, 35 which can augment the TCP and IP behavior based upon what cluster facilities this stack will take advantage of. For TCP this could be a cluster-wide port management scheme, while for IP this could be a high availability set of functions to deal with error and card failure conditions; in either case, this is optional functionality which will require access to the controlling thread and the P-ICS. Note: all streams-based stacks will be known to the controlling thread when they are created so, at a minimum, all stacks should be able to migrate between nodes without modifying the non-clustered implementation, though the stacks will be required to provide a pair of functions for each component which has private data associated with it.

In the second configuration, FIG. 2B shows a TCP stack with multiple DLPI ATM drivers linked under the IP multiplexor, but in this case, one DLPI instance 42 is actually executing on a different node. For this to work, the S-ICS driver 38 is linked under the IP multiplexor 44 with its primary responsibility to route data from IP to the remote DLPI instance 42. This stack could have been created this way or may be the result of a high availability recovery scheme, for example, if a DLPI driver noted a card failure and sent a M_ERROR message. This message will be intercepted by the IP augmented functions and the controlling thread will be informed and the recovery policy will be invoked. In this situation, the application never notices the card failure, but continues to operate as before. How this is accomplished is explained in a later section.

In both configurations, you will notice that there is no mention of a middleware entity since this is an optional component. In these configurations, the controlling threads have sufficient information to coordinate the different facilities and recovery mechanisms among all the nodes running this TCP/IP stack. Again, this coordination is explained in detail in later sections as the components are discussed and their interactions are noted.

2.1 Controlling Kernel Thread Overview

In order to transparently establish and migrate streams within a cluster there must exist a third-party entity which can communicate with the STREAMS framework, with other controlling thread instances, and with any, if present, cluster-wide management middleware. This is accomplished by creating one or more kernel management threads. These threads have, at a minimum, the following responsibilities/capabilities:

If a stream is being created normally as illustrated in the first configuration, the controlling thread will be responsible for noting the creation and informing the STREAMS framework to perform the function augmentation, if the stack has been configured to do so. The stack informs the STREAMS framework using str_install( ). The command str_install( ) is used to install a STREAMS driver or module into a kernel. The parameters passed into this function define items such as synchronization levels, streamtab entries, etc. For clustering, we simply add a new parameter which will contain a set of policies that may be invoked. Since even a non-cluster port of a driver or module requires a recompile, the driver or module will automatically pick up a default set of policies without changing the implementation. The default policies should be to enable stack migration for load balancing and high availability.

If a stream is being created with its components existing on different nodes within the cluster, the controlling thread will be responsible for creating the components on the remote node. In the previous figure, the controlling thread would be responsible for creating the remote DLPI instance and a local stream head. If modules were needed to be pushed upon this driver instance, then it would also be responsible for pushing these modules.

The controlling thread uses the in-kernel STREAMS interface to communicate to stream instances on the local node. The preferred form of STREAMS interface is implemented in Hewlett-Packard Company's HP-UX 10.10 and 10.20 releases and described in accompanying Appendix A, incorporated herein by this reference. The reason to keep the controlling thread in the kernel is both performance and security. An in-kernel interface does not need to go through the excessive system call interface to communicate to its partners. As for security, this keeps all routing tables and management structures protected from other threads and snooping. Does this mean that the controlling threads could not be implemented in user-space? No, it does not and doing so would not require design changes for this solution since all that we are concerned with is the ability to send messages and not what the messages must go through to get there.

The controlling thread is responsible for establishing the S-ICS instance for the node. There may be only one instance for all controlling threads, in which case they share the stream head pointer address, or there may be multiples with each thread tailoring the information held within the S-ICS to the functionality it supports.

It is responsible for passing on stream head specific messages.

It is responsible for passing messages between the components and performing the necessary flow-control.

The controlling thread participates in stream migration.

If a node fails and part of a set of stream instance components were operating on that node, the controlling thread participates in error recovery which is associated with high availability solutions.

The controlling thread can communicate with the cluster-wide middleware to probe for information and to update the middleware on changes in what it is managing. This is one of two locations within the cluster which will have potentially detailed knowledge of the middleware and how to communicate with it. By limiting this information, the STREAMS framework remains independent of the middleware which allows more flexibility in working with and designing solutions for new middleware technologies.

How all of these things are accomplished is discussed in detail in the following sections.

2.2 S-ICS Overview

The S-ICS 38 is a key component in making the STREAMS framework design solution middleware independent. The S-ICS is a streams-based software driver which exists above the P-ICS, physical interconnect driver 36. The driver was chosen to be streams-based in order easily integrate into the STREAMS framework and because it offers some unique and standard mechanisms which simplify stream migration and recovery, not to mention that this allows the P-ICS implementation-specific dependencies to be isolated to a single point from the STREAMS framework perspective. At a minimum, the S-ICS 38 will have the following capabilities/responsibilities:

It will participate in a distributed stream component's creation.

It will be responsible for probing middleware and updating middleware about low-level STREAMS framework and application specific information, unless this information is stored within the controlling thread.

It will process messages to and from the P-ICS from the STREAMS framework, the controlling management thread, and from the middleware where applicable.

It will maintain potentially application specific caches of information to improve performance and simplify module and driver integration within a distributed STREAMS environment. These caches may contain information such as routing tables for packets which arrive at nodes which may not have the target application running.

These subjects will be explained in greater detail in the subsequent sections.

2.3 Component Operation Example

Figure 3A:
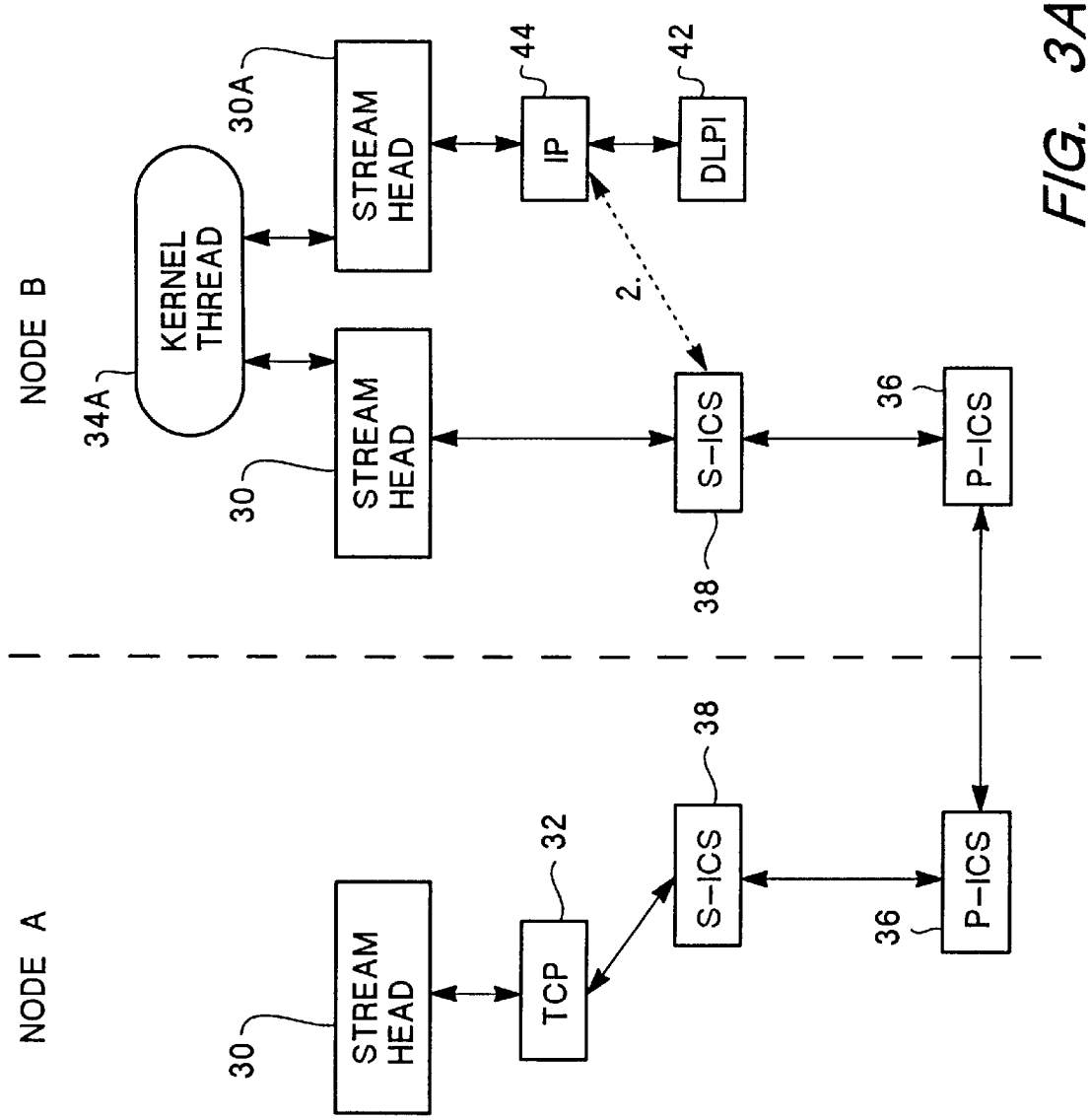
FIGS. 3A and 3B are more detailed block diagrams of a portion of the example cluster of FIG. 1 showing alternative configurations for splitting the stream stacks for operation of TCP/IP on nodes A and B.
Figure 3B:
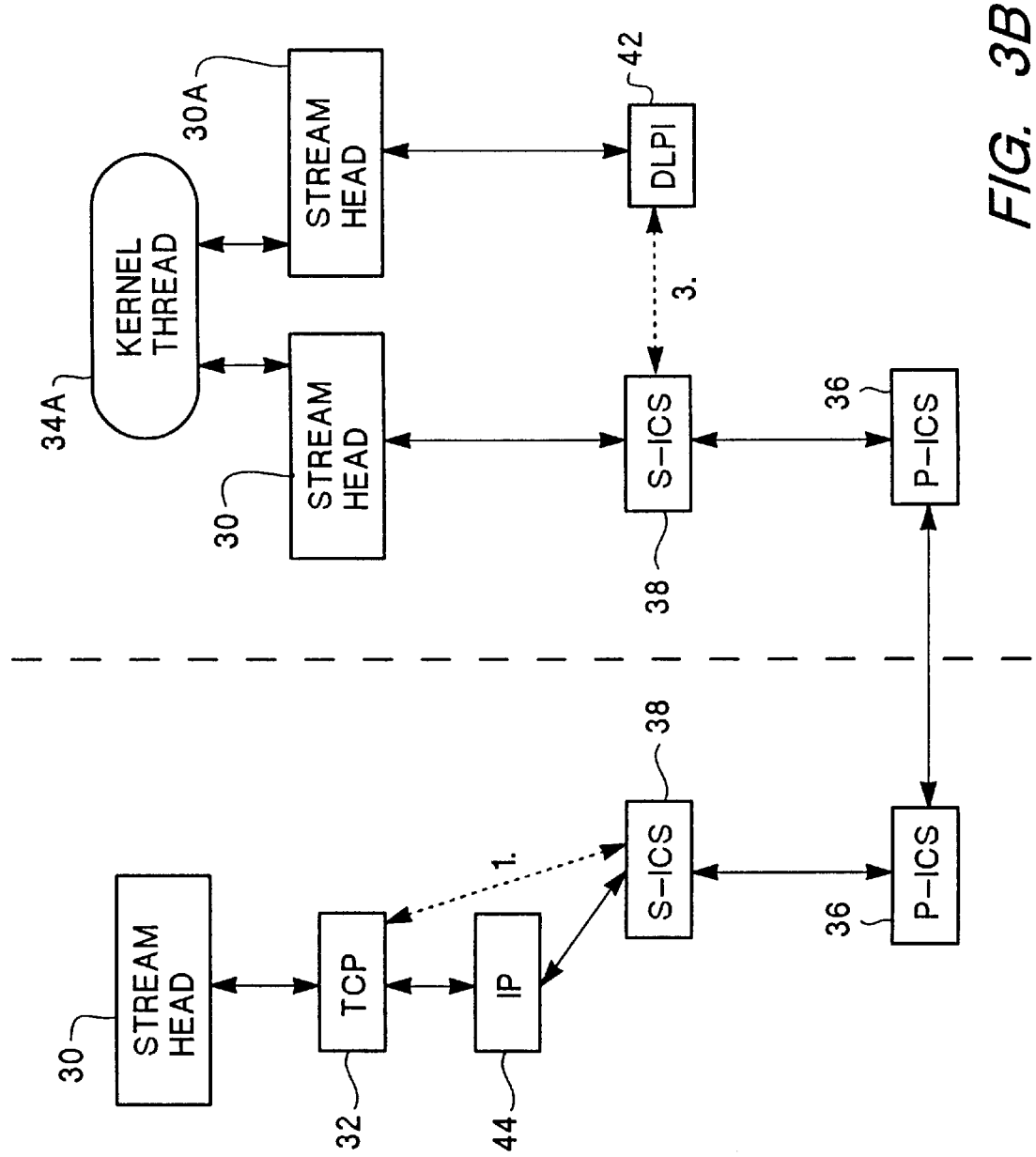

In order to illustrate how all of these components work together, we will walk through an example using what will most likely be the most common place distributed STREAMS will be applied: TCP/IP. This example is shown in FIGS. 3A and 3B in two alternative configurations. This section will not discuss how the stream is initially created, that's for later, but will concentrate on how it functions and what design solutions may be used to maintain the three design rules previously discussed.

2.3.1 Non-Split Stack TCP/IP

In the first configuration shown in FIG. 3A, the stream stack 30, 32, 44 is created normally from the stack's perspective but there is additional processing. During open, the controlling thread 34 is informed that a stack (FIG. 4) is being created. When the STREAMS framework open( ) code executes, the controlling thread took note of the stream head address and the drivers being opened and the modules being pushed. It then examines each driver/module to determine if there is a set of cluster policies associated. The controlling thread 34 then acts upon these policies by augmenting the stack with the appropriate functionality in order for the stack to be able to transparently take advantage of cluster-wide facilities.

Once the functions have been augmented, the controlling thread will only intervene or react based on what is forwarded to it and the policies set up. So, for the most part the TCP/IP stack operates exactly as it did in the non-cluster environment with the application seeing nearly the identical performance. It should be apparent that this configuration meets all design rules.

2.3.2 Split-Stack TCP/IP

When we distribute the stack, we may do so in two different ways with each having its trade-offs. The first alternative splits the stack between the TCP and IP modules. The benefits of this split are:

TCP maintains state and IP does not, so if we wish to migrate the stack to a new node, we only need to migrate TCP and not update IP which reduces the amount of migration work.

In addition, if the node executing IP were to fail, we can easily establish a new IP instance on another node within the cluster without effecting the TCP module or the application.

For a streams-based TCP, there will exist a TCP default queue for connection indications and such. The default queue may require additional code be added to route connect indications and such to the correct target node. Such a situation could occur if the application has been migrated to a new node. If the stack is split at this level, the code needed to perform this default queue processing could be re-used for the TCP/IP processing as well, at least in terms of determining where to route messages within the cluster.

The disadvantages are:

This alternative is not protocol implementation independent at all. In most cases, the complete modularity that on the surface appears to exist, in reality does not. If this split is utilized, the design must take into account any special forms of communication between these two modules and any pre-conceptions about private data and access to it. In other words, this alternative requires in-depth knowledge of the TCP/IP stack implementation, far beyond what should be necessary.

This design requires the S-ICS to be almost entirely protocol dependent instead of what should have been 95+% protocol independent.

The bulk of S-ICS cannot be re-used for other transport providers which means that the cost to develop and maintain a cluster based TCP/IP stack and other protocol stacks will be more than what I believe is acceptable.

In order to route messages, there must exist some mechanism which can contact the cluster middleware for route updates. Since TCP and IP are in the middle of the stream stack, they are not allowed to sleep and a request to a potentially different node would cause serious problems for the stack's execution, especially if the packet processing occurs while still on the interrupt control stack.

Splitting at this level results in many distributed stack instances within the cluster, i.e. one per connection.

The second alternative is to split the stack at the IP/DLPI level, keeping the TCP and IP modules together on each node at all times. This is illustrated in FIG. 3B. The advantages of this design are:

The design is 95+% protocol independent. We do not need to know much beyond understanding that a streams-based TCP will speak TPI (Transport Provider Interface) which is spoken and understood by a variety of other transport provider stacks— SNA, OSI, Netware, Appletalk, etc. which also all utilize the DLPI linked under their transport provider modules/drivers.

The bulk of the S-ICS can be re-used for other protocol stacks and potentially made sufficiently generic to be completely protocol independent. This leads to a lower cost solution, more flexibility in the transport stacks that may be ported to the cluster environment, and faster time-to-market of new technologies.

Depending upon how things are implemented, the number of distributed stacks will be less with the split at the IP/DLPI level. If IP is implemented as multiplexor, it will really have only one DLPI instance per I/O card. If the split is done at this level, then each remote DLPI will be linked (in reality the S-ICS will be the linked driver but will record sufficient information to understand which DLPI instance it is communicating with on the remote node for the correct/predictable message routing to be perform) under IP and any number of connections will flow through this single link. If the split is done at the TCP/IP or UDP/IP level, then there will exist one interconnect per TCP connection and this setup, which will occur more often within the cluster than with the split at the IP/DLPI level, will degrade cluster performance and increase migration costs.

DLPI is also stateless so if we wish to migrate a stack, the DLPI portion does not need to migrate.

If a DLPI instance were to fail, the TCP/IP portion could be migrated to a new DLPI instance. The new DLPI would just (ARP) the node and the remote so that the low-level address is understood. If the card is local to the stack, the new DLPI instance is simply informing a new or existing DLPI that it now has the following additional IP addresses assigned to it. If the DLPI is a remote instance, the fail-over uses the same process but now has the S-ICS being used as its DLPI instance.

This could be accomplished by having all DLPI instances be linked within the cluster for each node or the configuration code could select which DLPI will be used as fail-over components—this is strictly implementation dependent.

The disadvantages are:

The S-ICS requires more thought and time to develop due its protocol independence but this effort is more than recouped by being able to re-use the same design for different stacks.

If the default TCP queue requires a route processing module, this will need to be created which adds cost. Of course, this code would just be a subset of the S-ICS code so the design could heavily leverage the S-ICS code and keep the costs within acceptable limits. This, of course, is the majority of the 5% protocol dependency that we may not be able to eliminate.

My recommendation is to use the second alternative shown in FIG. 3B based on examining the advantages and disadvantages. The next section discusses how one problem (global port mapping) associated with the single-system view of a cluster may be solved using the second alternative and how this solution may be applied to other protocol stacks.

Note: There are three numbers (1, 2, 3) marked with FIGS. 3A and 3B. These numbers refer to the following comments on FIGS. 3A and 3B concerning potential performance optimizations that could be employed if additional precautions occur.

1. If one can envision a cluster with multiple versions of alternative 2 (FIG. 3B) running and then add in the possibility that applications which access the TCP/IP stack portion can migrate from node to node, there will exist the possibility that packets could be routed to a node before all cluster-wide routing has been updated to reflect the new locations of stacks. In such a case, this would be found out when the IP uses its fan-out table and determined that the correct TCP or UDP instance is not on this node. In such a case, the packet would need to be routed back through the S-ICS and sent to the new node. Since IP would have already processed the packet, there is no reason to repeat this processing nor to worry about any effects/recovery that processing might present to the stack if we were to just reroute it to the correct node and back into IP. So, due to the controlled nature of the cluster, the packet may be successfully sent directly to the specific TCP or UDP instance on the new node. As stated, this eliminates any IP reprocessing problems while also improving the overall stack performance. How this rerouting is accomplished is discussed in just a moment, but briefly the fanout table will contain a set of TCP/UDP target queues. This is accomplished by changing the TCP or UDP target queue (read queue) to be the S-ICS write queue and when the putnex( ) is executed, it would invoke the S-ICS put routine instead of the TCP or UDP put routine. This removes any need to scan the message or modify IP code; it does require understanding this fundamental IP implementation design and requires the generation of code which can correctly modify this fanout table (this is the major place where we actually have to understand how a streams-based IP is implemented which is also why the design can only achieve, at most, a 95% protocol independence).

2. As with the previous , the first alternative does lend itself to place messages directly from the S-ICS to and from IP as a performance improvement. This, again, requires implementation dependent knowledge. In addition, it requires the implementation to deal with the possibility that the S-ICS determines that the remote node has gone down and might require additional preventative code be added.

3. Again, as with 2, it might be possible to improve performance by pushing messages directly to and from S-ICS to DLPI. The same concerns apply as before. In either case, the fact that messages would not need to flow through the stream head nor a potential context switch to the controlling kernel thread yields a good performance boost. This performance versus added complexity and preventative code can only be made on a protocol-by-protocol implementation basis. I recommend considering such a optimization if possible.

Figure 4:
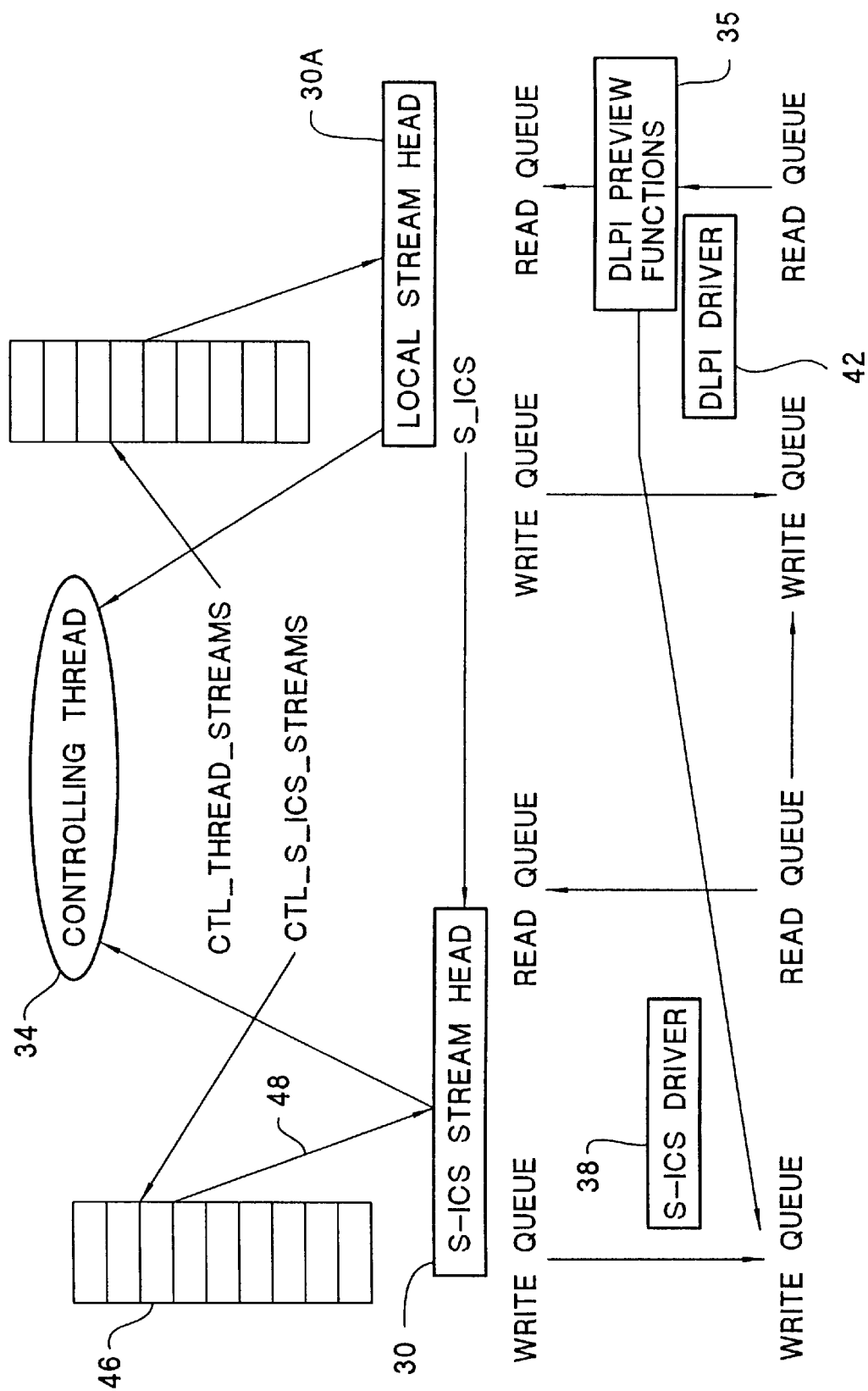
FIG. 4 is a diagram of the data structure packet routing process in the configurations of FIG. 3B.

FIG. 4 illustrates how packets are routed if the second alternative of FIG. 3B is implemented (a more detailed explanation is found within the S-ICS Routing section). The controlling thread 34 accesses the local S-ICS 30 and the local stack instance 30, 32, 44 by using a hash function to determine the stream head address which it stores in its local data structures 46. The local stack instance also has a pointer 48 to the managing S-ICS instance 38 which it can then redirect messages directly to without going through the controlling thread. Similarly, the S-ICS does not need to access the controlling thread to send data to the DLPI driver 42.

2.3.3 Global Port Mapping

In order to create the illustrated configurations, one may implement a global port mapping facility. This facility would control the assignment of TCP ports throughout the entire cluster instead of just on a per-node basis. One way this could be implemented is to simply divide up the port space with port-space-size/number-nodes-in-cluster ports per node. While simple to implement, it does not offer sufficient flexibility nor does it adapt well to what each node within the cluster may be executing.

Figure 5:
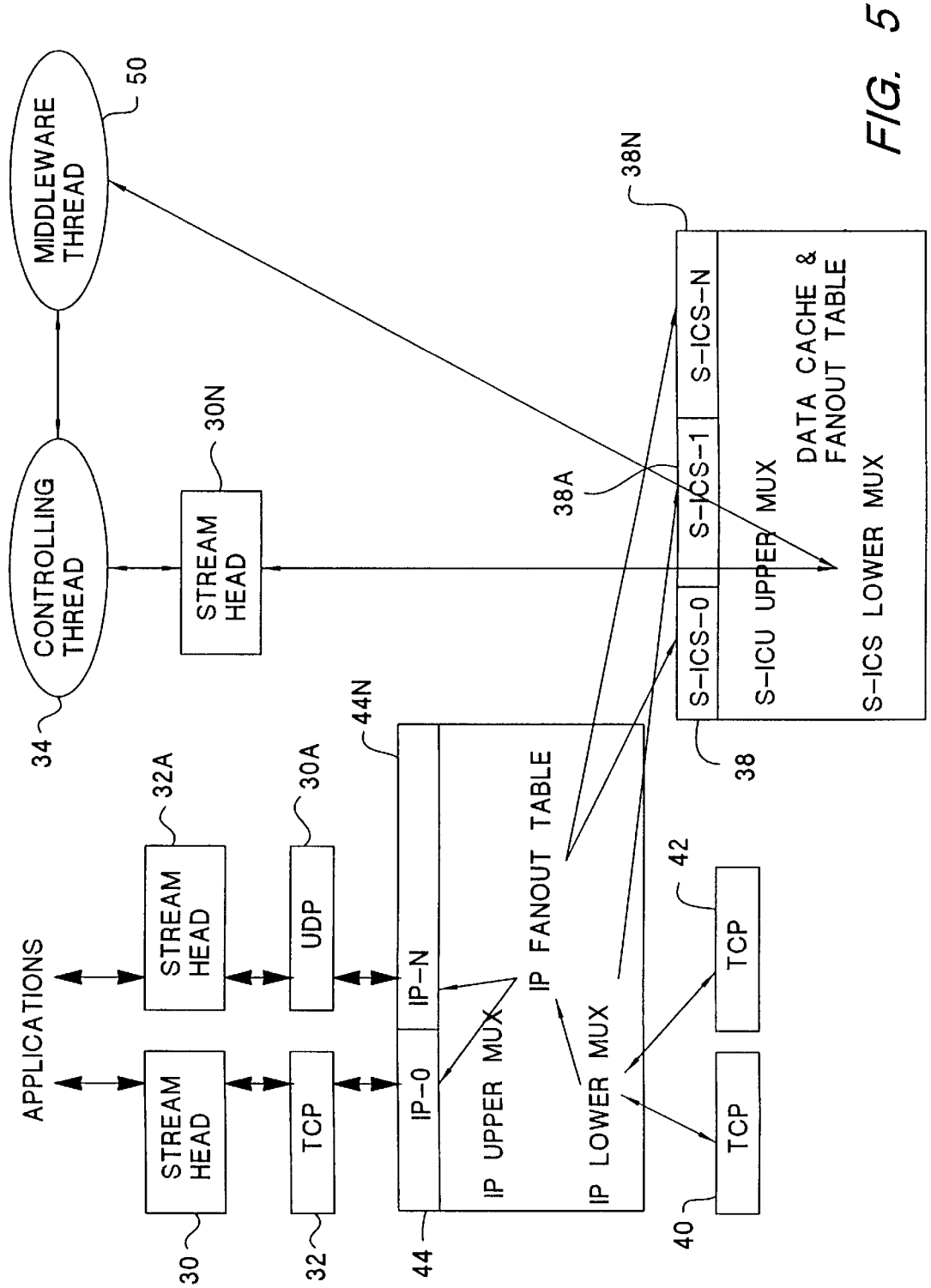
FIG. 5 is a diagram similar to FIG. 3B showing the packet routing process in multiple instances for global mapping of multiple ports under control of a middleware thread.

A more optimal solution is to create a cluster middleware control thread 50, as shown in FIG. 5, which maintains a list of what ports are active, what are available, and potentially where the ports are actually in use within the cluster. This approach allows the number of ports per node to fluctuate based on need while still allowing an application to migrate to any node within the cluster without having to worry about a duplicate port being in use. Note: FIG. 5 illustrates both the non-split stack and the split stack operations. A TCP or UDP instance could be executing over a local DLPI link 40 or over a remote DLPI link 42 and the algorithm is essentially the same. Side note: For a TCP/IP cluster implementation, it might be best to just link all DLPI instances under each IP at cluster initialization. This would allow faster recovery should a card fail and the S-ICS on each node will automatically know how to route the bulk of the packets between the nodes when migration occurs, which eliminates having to update the S-ICS and might eliminate the need for route failure error recovery.

For each node within the cluster, the following setup will occur. The Middleware may exist on a separate node but is shown in FIG. 5 to illustrate that the S-ICS may probe it for packet routing if its data cache does not have sufficient information. The S-ICS, of course, always maintains the option of simply dropping packets. If the S-ICS routes to another node, then the packet will be placed directly on the TCP or UDP read queue and will not go through IP again.

A packet coming into IP would flow as follows: The packet would arrive at the IP lower mux. IP would examine the packet and utilize the IP fanout table 52 to determine which queue to send it to. The fanout table is nothing more than a <port, queue> mapping function. If the packet is bound to a local TCP or UDP instance, then IP will putnext (tcp-queue, mp) or putnext(udp-queue, mp) directly. If the packet is not for a local endpoint but has a fanout table entry, the packet will be putnext(S-ICS-0 queue, mp). If there is no fanout table entry, then IP will either drop the packet or it may forward the packet to the S-ICS lower mux if IP forwarding has been enabled. The S-ICS would examine the packet for embedded routing information and then reference its data cache to determine the route. If S-ICS is a mux, then it may also use the knowledge of which S-ICS instance sent it the data to find a route.

In essence, there are three components to this solution: a set of augmented scanning functions, a controlling thread to manage this effort, and a middleware thread though the middleware thread could, in fact, be the controlling thread since the controlling threads are involved in nearly all aspects of management. The only disadvantages of doing so would be that the controlling threads might not be as protocol independent as one would like and it might be simpler and faster to design middleware threads which are specific to the protocol stacks involved while the controlling threads are kept completely protocol independent. Regardless of how this is actually implemented, the associated functionality and high-level implementation is described below.

1. When a transport endpoint is created, in this example either a TCP or UDP endpoint, we use STREAMS Dynamic Function Replacement as described in U.S. Ser. No. 08/545,561 to augment the put, service, and close routines associated with both the read and write queues (see a later section as to how this is initially set up). These functions are augmented to preview messages which are being sent to and from the stack. For the put and service routines, we are interested in M_PROTO messages which may contain TPI T_BIND_REQ and T_UNBIND_REQ messages for the write queue function and T_BIND_ACK, T_UNBIND_ACK and T_ERROR_ACK messages for the read queue function. For the close routine, we are interested if it is invoked and the endpoint has not been unbound yet, in which case, we have some work to do. These functions scan for a particular message type or activity and then take action if the conditions are met. By using STREAMS Dynamic Function Replacement instead of a module which has been pushed onto the stack (this is an alternative to using this technology), we eliminate the extra set (read and write) of put routines being invoked on every message which improves performance. Note: all other messages are immediately processed using the original put or service routines, so the performance cost is the function call overhead and the single if statement within the given preview function.

2. The controlling thread, which is the same thread that has been discussed previously, optionally works with the middleware and works with the augmented functions. Continuing with the example, the endpoint has been opened and the functions have been augmented. When the application sends a T_BIND_REQ TPI message to the TCP/UDP module, the augmented write put routine senses this occurring and temporarily redirects the message to the controlling thread. After message redirection, it returns to allow processing to continue. This is possible because the application request will really not complete until it has received either a T_BIND_ACK or a T_ERROR_ACK TPI message is returned to the application—this is an asynchronous event and all TPI implementations and transport providers support this behavior.

3. The controlling thread extracts the bind information, in this case the associated port information, and probes the middleware thread which may be executing on a different node within the cluster.

4. The middleware thread examines the bind information and determines if the specified port is available or not. If the specified port is not available, it returns an error to the controlling thread which will take appropriate action. If the port is available, then it marks this port as "in use" and then informs the rest of the cluster, i.e. the rest of the controlling threads within the cluster, that this port is now in use and by which node.

5. Rather than just have each controlling thread maintain this knowledge which makes it implementation dependent, we do something different. Each node's controlling thread issues a bind request to IP, which should succeed. For this bind, we augment the fanout table <port, read queue address> to actually have the read queue address be the S-ICS write queue address. The S-ICS will also be informed of the bind also and will update its data cache to reflect this new routing information. So, in essence, each node now has an IP instance which has the bound port address and this address will be used to route any packets which arrive at a node which the application is not currently executing upon (potentially due to application migration or recovery should the DLPI component's node failing at some point and a new instance is started on a different node).

6. Once the cluster has completed the bind operations on each node, the middleware thread will inform the controlling thread of success or failure. If successful, then the controlling thread will use the in-kernel STREAMS interface to put the original bind message on the write queue of the transport module—TCP or UDP. This module and its IP instance will perform the necessary bind operation and will generate either a T_BIND_ACK or a T_ERROR_ACK. If a T_ERROR_ACK occurs, then since we already know we were processing a bind operation, we inform the controlling thread that the bind failed and it will inform the middleware thread which will unbind all of the other nodes instances for this port address. If the bind succeeded, then the stream stack operates normally—whether its components have been distributed or not, i.e. we can apply the above technique to a stream which is created normally and has all of its components executing on the same node.

7. At some time later, the application will either close the stream instance or issue an unbind operation. When either of these operations occurs, the augmented routines will sense this happening and take action. If the application closes the stream stack, the close routine just sends a message to the controlling thread which will note the activity and inform the local S-ICS instance to clean up its cache. In addition, the controlling thread will inform the middleware thread which will inform all other nodes within the cluster and issue an unbind operation to the appropriate IP instance. This will also result in each nodes S-ICS instance cleaning up its data cache. If the application had issued an unbind request instead of a close, the above algorithm would be the same except that the augmented function would sidetrack the message just like the bind operation did and wait until the controlling threads on all nodes had performed the unbind operation before continuing just like before. Sample bind preview code:

```
tpi_bind_w_preview(q, mp)
{
    union T_primitives *tpi;
    if (mp>b_datap->db_type != M_PROTO)
        (q*->q_qinfo->qi_putp)(q,mp);
    else {
```

```
        tpi = (union cast it)mp->b_rptr;
        if (tpi>PRIM_type == T_BIND_REQ ||
            tpi->PRIM_type == T_UNBIND_REQ) {
            /* Route the message to the controlling thread*/
            route_msg(tpi_ct_endpoint, mp, write_queue);
        } else
            (q*->q_qinfo->qi_putp)(q,mp);
    }
}
```

Within the controlling thread, it will be listening to multiple communication points and one of these will be the one associated with this activity. The controlling thread performs the necessary tasks as described and then invokes a streams_putmsg( ) to place the message on the correct queue. If the operation fails, then the controlling thread will create a T_ERROR_ACK and perform a putnext(tp_read_queue, mp). If the operation on the cluster succeeds, then the controlling thread performs a putnext(tp_write_queue, mp) of the original message. On the read side, the preview function would be:

```
tpi_bind_r_preview(q,mp)
{
    union T_primitives *tpi;
    if (mp>b_datap->db_type != M_PCPROTO)
        (*q->q_info->qi_putp)(q,mp);
    else {
        tpi = (union cast it)mp->b_rptr;
        if (tpi->PRIM_type == T_ERROR_ACK) {
            /* The bind operation failed, so inform the controlling thread
             *so it can perform any clean up operations.
             */
            route_msg(tpi_ct_endpoint, mp, read_queue);
        } else
            (*q->q_qinfo->qi_putp)(q, mp);
    }
}
```

For close processing, the following augmented close function would be executed:

```
tpi_close(q, mp)
{
    mblkP mp;
    /* Create a close message to inform the controlling thread */
    mp = create_close_msg();
    route_msg(tpi_ct_endpoint, mp, read_queue);
    /* Await a message from the controlling thread indicating the cluster
    is cleaned up */
    recv_msg(q, mp);
    /* Invoke original close routine */
    (*q->q_qinfo->qi_putp)(q, mp);
}
```

This function will perform a handshake operation with the controlling thread. The controlling thread will inform the other controlling threads that the port is freed and that all S-ICS should have their route tables updated to reflect that a close is occurring and the given queue is no longer valid. If there is a race condition, the S-ICS will contact the controlling thread which should see that the port is now available so it will tell the S-ICS to drop all messages for this port for the moment.

2.4 Port Map Optimizations

In the previous discussion, the controlling thread was used to pass the bind request to the middleware thread and return the result. While this message passing does allow the controlling thread to remain protocol independent, it does somewhat slow down the port mapping facility and if there are many connections being made, such as a web browser, then the speed of establishing these connections becomes important. To solve this problem, the controlling thread could become somewhat protocol dependent by having it recognize that it is performing a bind operation and it should invoke a protocol-specific handler function.

In our example, a TCP/IP handler function is defined as follows: There are 64 K ports available for an application to use. Of these ports, approximately 5 K are reserved for applications which allow the protocol to perform the port determination. The handler function would take this into account to make a local optimization. If the application requested any port, then it would allocate ports from a local pool of any ports which were divided among the cluster gateway nodes. In this case, there is no need to coordinate the port assignments between nodes and the remote, just need to note which port is now in use and establish a late bind, i.e. we perform lazy binds throughout the cluster to handle the routing issues if necessary. I say necessary since the application may provide a "life" duration via an option which it may set during initialization. For example, a web browser will make potentially many connections per multi-part document and each connection will be short-lived. A good browser would inform the transport that these connections will be short-lived which clustering can take advantage of to reduce the port management overhead. In the event that a node exhausts its pool of local "any address" ports, it posts a request to borrow ports from other nodes, or invokes a protocol to rebalance the available ports within the cluster.

For the rest of the port space, the controlling threads must coordinate port assignment and routing information as well as clean up on connection unbind or close. The following high-level algorithm illustrates how all of this will work:
if the bind address is for "any address"{
  if the current node does not have an available port{
  Initiate a group notify operation to rebalance the port space for which the initiating node will be guaranteed to obtain at least one port if there are any ports available within the cluster.
  If no port is available, then inform application of bind failure by issuing a T_ERROR_ACK with a port in-use error condition by performing a putnext (OTHERQ(transport provider write queue), mp). This will prevent the local transport provider from ever seeing the bind request.
  }
If the connection is not known to be short-lived or there is a policy to always inform all nodes caring about ports of all bind-related activity, then inform the remote nodes of the port and node address so they may take appropriate action. This should be accomplished using a reliable multicast protocol.
} else {<for a specific port>
We need to coordinate the port assignments among all nodes which care about ports. To do this we can use a group notify operation. A group notify allows a low-latency packet to be reliably sent to a set of nodes and each node will respond back to the initiator. In this example, the request would be the requested port address and the associated node; the response would be the acceptance or rejection of this request. When a node returns an accept, locally, it will: (1) mark the port in-use, (2) if the connection may be long-lived, then it will create a bind instance to update the fanout table, and (3) it will update the route information. If a node returns a reject, the requesting node will assume that the port must be in-use. No further assumptions about the rejecting node execution may be made.
}

In this scenario, there is a potential race condition since two nodes may attempt to bind the same port address. This is indicated by the group notify showing only partial success for each initiating node. If this occurs, then the implementation may optionally fail the bind operations or it may perform a random back-off algorithm and re-attempt the bind operation. A random backup can be accomplished by using the same random number generator but with a node-specific key to allow some predictability. This should allow one application to successfully bind and the other to fail.

Upon failure, the initiating node will inform those nodes which acknowledged the port acceptance of the failure and they will perform the necessary clean up. If the interconnect is unable to state who failed the node, then the initiating node must inform all nodes that it does not have the port bound and the remote nodes will examine the initiator address and the port to determine if clean up is necessary.

If there was partial acceptance, then a race condition exists between one application and another for binding to the same port. If this occurs, there are two possible solutions:

Each node could examine the ratio of accepting versus rejections, and if a node has a majority of nodes accepting the connection, then it should win the port. The loosing node will issue a T_ERROR_ACK with a port in-use error condition to the application and a error message to the nodes which accepted it as the port owner to clean up their tables and any allocated resources. The winning node will wait a sufficient amount of time to inform the other nodes, i.e. (N*time to process error)+(N*time to send error clean up completed messages), and then will initiate the bind request to the originally failing nodes.

The other alternative is to have each node inform all accepting nodes that the bind failed and to clean up. Then each node will wait a node-specific random amount of time (use a random number generator with a node-specific key so there is a predictable pattern for each node that can be re-created if need be for debugging or testing purposes). When the timer pops, the bind operation is initiated again and the results are checked. If there is another collision, then utilize a maximum collision counter to determine if another attempt should be made. While this could result in both applications failing to bind, the probability should be very low.

In case it isn't obvious, TCP/IP needs to have a larger port space if a cluster is going to handle thousands of connections simultaneously. This would require a protocol change approved by the IETF. Hopefully, something can be done in the future to remedy this problem but until this occurs, there may be an artificial limit to the number of connections a cluster have at a time.

2.4.1. Further Port Map Optimizations

It may be possible to further optimize the port mapping solution by performing binds only when an application has migrated. In the example cluster, there is at least one IP address per DLPI driver which means that there is no possibility that packets might arrive at other nodes or interfaces other than the one that the application is currently using. This holds true for the connection lifetime unless the application migrates to a new node. In such a case, the S-ICS must create a new forwarding route and the local IP fanout table must be updated to have a <port address, S-ICS write queue> entry so that any packets which arrive at this node will be forwarded to the new node. If all of this holds true, then, aside from informing other nodes of what port is in-use, there should not be a need to create a fan-out table entry for each bound application nor to perform additional cleanup upon unbind or a close operation other than informing the cluster that the port is now available for use.

2.5 STREAMS Dynamic Function Replacement Usage

Within a cluster, a stream stack instance may operate in the following modes:

- The stream stack might not be aware that it is part of a cluster at all. It may operate just as it did on any stand-alone node and not be aware of nor being necessarily capable of directly taking advantage of the cluster facilities, though something such as migration may be possible.
- The entire stream stack may execute on a single node but may be aware that it is part of a cluster and is capable of taking advantage of cluster facilities such as the global port mapping facility previously described. This does not imply that the stream stack's implementation has been directly modified, only potentially augmented.
- The stream stack's components may be executing on two or more nodes within the cluster such as described in the TCP/IP/DLPI splitting example.

For the later two modes, it will be necessary to augment the different stream functions associated with each module or driver. STREAMS Dynamic Function Replacement allows either all instances of a module or driver to be augmented or the augmentation may be performed on a per stream queue basis. For the example global port mapping facility shown in FIG. 5, it is probably easiest to augment the functionality at the (TCP or UDP) module level by using an application (potentially the controlling thread) via the SAD driver to perform the function replacement steps—the details of how this is accomplished are given in U.S. Ser. No. 08/545,561. This change could be accomplished as part of system/cluster initialization.

On the other hand, we might have a cluster facility which does not want all instances of the stream stack to be modified at all times. In such cases, we would need to apply the augmentation at a later time based on some cluster-specific information. To accomplish this, we could just augment the open routine for all instances of a module or driver. The new open would be able to probe (such probes are allowed since a STREAMS open routine is allowed to sleep) the cluster for specific information and determine whether the entire stack or a particular module/driver within the stream stack being created required further augmentation.

An example of this would be the TCP/IP/DLPI stack being split at the IP/DLPI level, as shown in FIG. 3B. This example shows a potential performance improvement where messages are sent from DLPI to the S-ICS directly without needing to go through the local stream head and then being redirected by the controlling thread to the remote node. This may be accomplished in two ways: (1) the DLPI read queue q_next field might be redirected to point to the S-ICS write queue—such redirection would complicate the S-ICS implementation but it is possible; (2) the DLPI stream head read queue put routine would be augmented to perform the redirection after providing some previewing of the data. The second way is the preferred way for the following reasons:

- No queues are redirected or altered which keeps the basic functionality and flow of messages the same, i.e. the messages flow from the DLPI driver to the stream head just like before, and reduces potential support and debugging issues.
- If the first way is implemented, the S-ICS would need to determine if a message should be reflected or redirected to the controlling thread for processing. Some messages such as a M_SETOPTS might necessitate modifying the local stream head parameters as well as the remote stream head's parameters. This not only complicates the S-ICS design and implementation, but it also increases the amount of protocol-specific information that the S-ICS must know.
- Using the second way allows the controlling thread to select the type of previewing to be performed on a per module/driver basis. This could be implemented in two ways: the cluster designer could write classes of previewing functions based on where stacks are split such as a general DLPI class, or each module/driver developer could define a protocol-specific stream head preview function. In either case, the previewing code would be focused on the immediate needs of the stack which allows faster design and development and greater flexibility while keeping the controlling thread fairly protocol independent. An example is if the DLPI driver detects a hardware problem and it will generate a M_ERROR message. If the DLPI stream head preview function does not require anything special be invoked to handle this condition, the message would be forwarded just like any normal message to the S-ICS. But, if the cluster designer has decided that for the DLPI class of drivers or just for this particular driver type such as DLPI over ATM, the controlling thread must be involved to perform some for high availability recovery scheme ala migrating the DLPI instance to a new card or even a new node, then the preview function would invoke the stream head put routine and give the message to the controlling thread. The controlling thread would then decide if it even needs to forward the message to the application based on what it has been configured to perform for this message type and this class of stream module/driver.
- For messages which would never require STREAMS framework action such as M_DATA or M_PROTO, the preview function would automatically execute putnext( ) on the S-ICS write queue. This avoids having to enqueue the messages on the stream head and have the controlling thread be context switched and examine the message only to find out it didn't need to be involved.

A preview function could be coded as follows:

```
dlpi_sth_read_preview(q, mp)
{
    switch(mp->b_datap->db_type):
    case M_HANGUP:
    case M_ERROR:
    /* The controlling thread may initiate local ioctl operations so these
     * acks must be routed through it even though the it may just
     * forwardthe request.
     */
    case M_IOCACK:
    case M_IOCNAK:
    case M_ERROR:
        /* Invoke the standard stream head read put routine and
         * allow the controlling thread to decide what to forward or to
         *invoke a recovery scheme for the M_HANGUP/M_ERROR
         *case.
         */
        (*q->q_qinfo->qi_putp)(q, mp);
        break;
    case M_DATA:
    case M_PROTO:
    case M_PCPROTO:
```

```
           -continued default: /* Any message type not listed is automatically
  forwarded */
    if (canput(q->q_ptr->s_sics->write_queue)
      putnext(q->q_ptr->s_ics->write_queue, mp);
    else
    /* The upper S-ICS mux instance is flow-controlled, deal
       with it */
      initiate_flow_control_recovery(q, mp);
    }
  }
}
```

The s_ics pointer would be stored within the private data structure (q→q_ptr) which defines the stream head associated with this DLPI instance. The s_ics pointer is the stream head address of the S-ICS associated with this instance and the message will be placed upon the S-ICS write queue which will send it along to the remote node. Note shown in this sample function is how the routing information is embedded within the message.

3.0 Controlling Thread Design

In a previous section, an overview of the controlling thread 34 was given. This section will flesh out this thread in greater detail with the caveat that the final design details may be implementation specific depending upon: the target operating system, the STREAMS implementation, and the platform distributed STREAMS is implemented upon. This section will further clarify the high-level-design, how the thread is created, the data the controlling thread should track, and how the controlling thread will interact with the other components discussed in this solution. The controlling thread design and interactions for distributed stream creation, stream migration, and policy management are detailed in later sections since it is only one part of the solution.

Note: In a previous sections, the controlling thread 34 was shown operating directly over the P-ICS and the S-ICS. These two drivers have completely different interfaces and potentially different operating characteristics—one could be sender-managed while the other might be receiver managed communication. Such differences could lead to increased design complexity and potential performance trade-offs. If the differences are large, then I recommend that the controlling thread, while viewed as a single thread of execution with a shared set of data, be implemented using two threads. One thread would manage the STREAMS-related activity while the other managed the cluster management activity such as the port space and device driver management. This implementation will increase the protocol independence of the STREAMS-related drivers and code.

3.1 Controlling Thread=Middleware

One question that comes to mind is: "Can the controlling thread 34 replace the middleware component 50 within a cluster?". The answer to this question is "yes". The controlling threads basically become a distributed middleware implementation in addition to the stated functionality. This has already been illustrated in the global port mapping optimization discussions (FIG. 5) and, within the subsequent sections, the necessary enhancements to handle this functionality will be noted wherever possible.

3.2 Creation

The controlling thread 34 is created as follows:

If the controlling thread must be executing before the system completes its initialization, then the thread must be created as part of the standard system initialization effort. This may be the case if the node is being self-configured based on what the system needs. For example, if the system must load a particular networking subsystem and this subsystem is part of or relies upon the cluster facilities, then the controlling thread must be operational before this subsystem is initialized.

If the controlling thread is not needed to bring up the system, then it can be started via a cluster start-up command at any time with the following caveat: If a cluster facility involves a subsystem which may be brought up at system initialization, then either these subsystem instances are not affected by clustering, or, if they are, they must be converted in some fashion that the controlling thread is capable of communicating with them. An example of this would be a node which has NFS services executing which have bound a set of ports. Assuming that the NFS is operating over a streams-based transport provider, then the port knowledge must be communicated to the middleware thread and the appropriate ports must be bound on the other nodes within the cluster in order to ensure that packets are properly routed to this node or, if the application migrates, may be correctly forwarded. In addition, the function replacement activity previously described for the put, service, and close routines would need to take place.

In general, the controlling thread should operate as a real-time thread of execution in order to ensure that the cluster facilities that utilize this thread receive timely responses to requests. Typically this is done as part of creation, i.e. how the thread is started or via a set priority command.

The death of this thread will result in STREAM-related clustering activity ceasing on this node unless some steps are taken at creation time to allow the thread to be restarted. These steps are: (1) A well-known data structure is allocated within the kernel and its address is stored in a kernel global variable. (2) Within this data structure, the controlling thread must cache the following information: the address of all stream heads which have been opened or assigned to this controlling thread, the address of the middleware interface device (the structure that we communicate to the middleware through such as a file pointer or interconnect descriptor), and any policy information which has been communicated to the thread. (3) If sender-managed communication is used to communicate to the middleware threads, there will also need to be some mechanism for preserving the user-space structures. This may entail informing the cluster connection management subsystem how to preserve this data and how to restore it for a new controlling thread.

The node structure will depend upon how nodes are addressed and how routing is accomplished within the cluster. The proposed structure contains what are viewed as essential fields—others may be added as the implementation is performed. The given flags are the minimums needed.

```
#define NODE_INACTIVE        0x0000
#define NODE_ACTIVE          0x0001
#define NODE_IN_ERROR        0x0002
struct node_t {
  int32 node_flags;                    /* Remote node's status flags */
  node_address_t node_address;         /* Remote node's address */
  node_route_t node_route;             /* Route from local node to remote
                                          node */
```

```
                        -continued
    struct node_t *next, *prev;    /* Next/prev nodes within the list */
}
#define NODE_HASH_SIZE 1024
```

The following structure contains structure types that are P-ICS specific, i.e. it is not possible to illustrate the contents of these structures without knowing what the P-ICS is capable of and how it wishes to be communicated to. At a minimum, the structure should contain an endpoint definition sufficient for message processing—should include status flags and generic function vectors which may be invoked blindly by the S-ICS to invoke an operation—i.e. the S-ICS stays as ignorant of the P-ICS implementation as possible, a migration policy if the S-ICS needs to migrate from one P-ICS instance to another, a recovery policy to define how to recover from P-ICS errors or interconnect failures, etc.

```
    struct p_ics_endpoint_t {
        uint32 p_ics_state;
        uint32 p_ics_flags;
        int32 (*p_ics_memory_alloc)();
        int32 (*p_ics_memory_free)();
        int32 (*p_ics_open)();
        int32 (*p_ics_close)();
        int32 (*p_ics_attach)();
        int32 (*p_ics_detach)();
        int32 (*p_ics_ctl)();
        int32 (*p_ics_send)();
        int32 (*p_ics_recv)();
        int32 (*p_ics_misc)();
    };
    typedef p_ics_endpoint_t P_ICS_ENDPOINT;
    struct p_ics_data {
        P_ICS_ENDPOINT pics_endpoint;
        P_ICS_MIGRATION_POLICY p_ics_migration_policy;
        P_ICS_RECOVERY_POLICY p_ics_recovery_policy;
    }
``` p_ics_endpoint defines the P-ICS endpoint and the vector of functions representing the set of operations possible.

p_ics_migration_policy is a policy structure which defines what the policies are, when to invoke them, and a set of function vectors to execute the policies.

p_ics_recovery_policy is a policy structure which defines what the recovery algorithm should be when a remote node fails, when the local P-ICS instance fails, and the function vector to execute the policies.

```
    #define CTL_S_ICS_TBL_SIZE 64
    #define CTL_STH_HASH_SIZE 512
    #define CTL_HASH_FUNC(dev) do { \
        &ctl->ctl_thread_streams[((unsigned)major(dev)^
        (unsigned)minor(dev)) &
        (CTL_STH_HASH_SIZE);
    } while (0);
    #define CTL_S_ICS_HASH_FUNC(dev) do { \
        &ctl->ctl_s_ics_streams[((unsigned)major(dev)^
        (unsigned)minor(dev)) &
        (CTL_S_ICS_TBL_SIZE);
    } while (0);
```

The underlying assumption for this implementation is that the stream heads may be linked together via a sth→sth_next field. If this is not the case, then the implementation will require a different hash bucket management strategy.

```
    struct thread_management {
        struct sth_s * ctl_thread_streams
            [CTL_STH_HASH_SIZE];
        struct sth_s * ctl_s_ics_streams
            [CTL_S_ICS_TBL_SIZE];
        struct inter_con_descriptor * ctl_middleware_descriptor;
        struct policy * ctl_known_policies;
        struct preserve policy * ctl_preserver_policy;
        struct node_t ctl_cluster_nodes[NODE_HASH_SIZE];
        struct p_ics_data *ctl_p_ics instance;
        struct driver_management_policy_t *ctl_driver_policy;
    }
    struct thread_management ctl_thread_global_data;
``` ctl_thread_streams are the stream head pointers representing the distributed components operating on this node—a distributed DLPI instance, for example.

ctl_s_ics_streams are the stream head pointers representing the local S-ICS instances.

ctl_middleware_descriptor is self-explanatory.

ctl_known_policies are the set of policies describing how this controlling thread is to operate. These structures are where the controlling thread may hide underlying protocol specific requirements.

ctl_preserver_policy is the self-preservation policy previously described.

ctl_cluster_nodes is the node table which is created at a controlling thread initialization. This data may be derived from the interconnect driver which was downloaded this data as part of its initialization process.

ctl_p_ics_instance is the P-ICS data necessary for the controlling thread to communicate with the other controlling threads within the cluster.

ctl_driver_policy describes driver classes and how they should be handled. This data is downloaded during controlling thread initialization. Example policies would be how to determine where a driver should be opened or whether a stream stack will require a split between nodes.

Once the thread is created, it would access any existing cluster facility policies and set up the appropriate infrastructure. Policies are used to dictate how specific tasks are to be performed such as how and where to download cluster-wide information, how to determine which node is the current cluster management node, etc. This information should be stored in a well-known place on each node or it could just be downloaded via broadcast to any executing middleware thread within the cluster.

If the cluster node is a multi-processor system such as a SMP and if the node will be managing many distributed streams, it may be necessary to create multiple controlling thread instances. Each instance could be responsible for just an individual protocol stack, a subset of each protocol stack's instances which may be too large a space for single thread to handle, or could be tailored to different cluster facility aspects such as one controlling thread handling strlog( ), one handling SAD, one handling protocols, etc. How things are split up and whether MP-scaling of control threads is a requirement is strictly implementation dependent.

Figure 6:
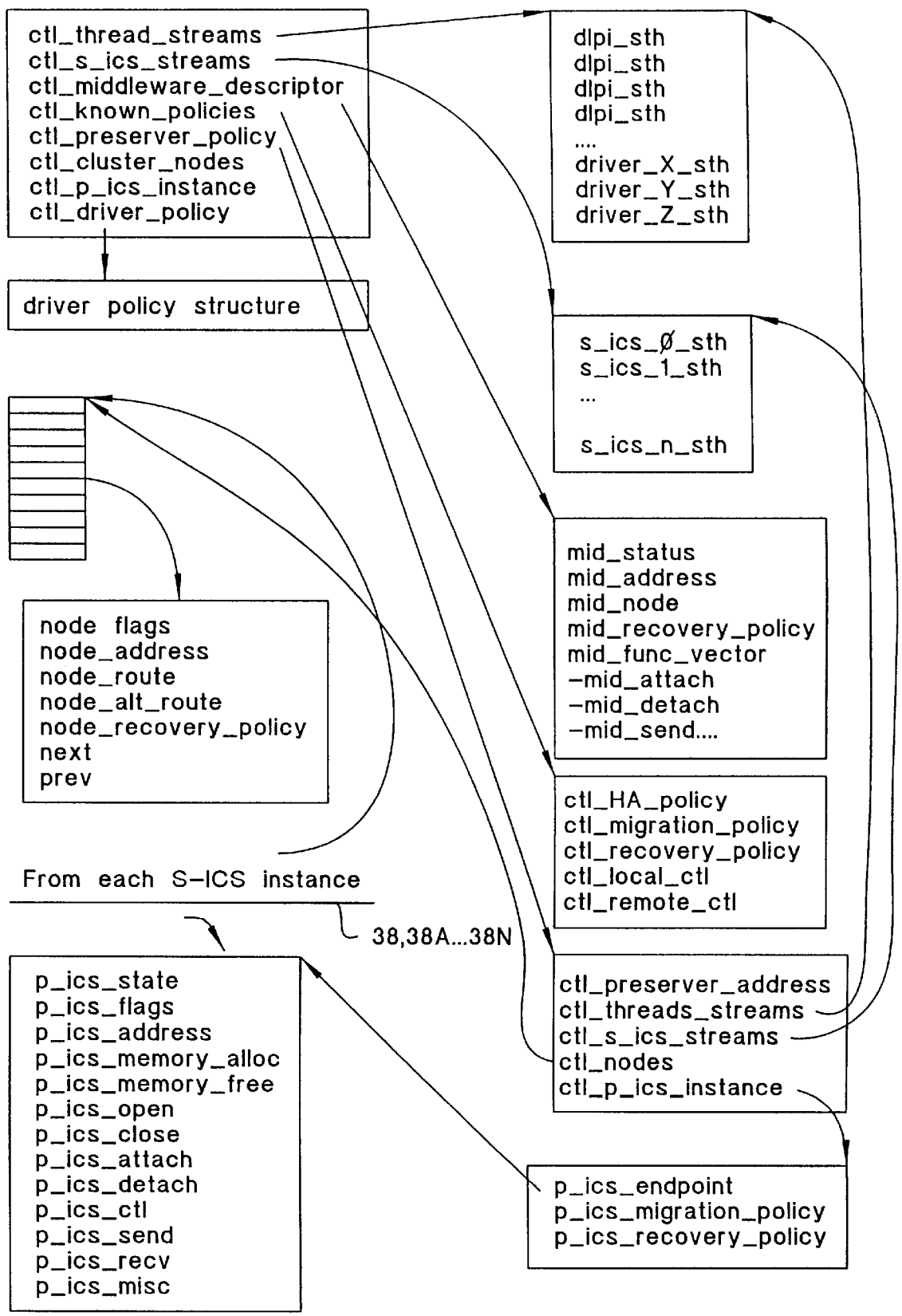
FIG. 6 is a diagram of a data structure used to implement the packet routing process of FIGS. 4 and 5.

FIG. 6 illustrates the data structure layout and interconnection. Note that the S-ICS 38 will point into these data structures from its private data structure area.

3.3 Controlling Thread Configuration

The controlling thread 34 may be configured using any of the following techniques:

At a minimum, the controlling thread must have a default mechanism to communicate with the P-ICS 36 (FIGS.

3A and 3B). This communication mechanism will be P-ICS implementation dependent and may entail hard-coding an initialization protocol.

Instead of broadcasting, the controlling thread 34 may resort to the less sophisticated but less error-prone mechanism of reading boot-strap configuration data off of the file system. This data would dictate how the thread is to operate, where to find middleware if it exists, and any other initialization steps that need to be taken. Of course, the configuration file could also contain everything that the thread needs to know. Such files could be administered from a single management node and just distributed throughout the cluster.

Another mechanism would be to boot-strap the thread 34 to the point that it can communicate with other similar controlling threads or a middleware. The controlling thread would find other threads or the middleware 50 by performing an "ARP" to identify itself and its current state. From this point on, the controlling thread would react to what is sent to it. For example, when it opens the S-ICS or a local stream component, it can probe these components for the data and policies it needs to meet their needs. This capability would allow the controlling thread to stay fairly implementation independent but still adapt to the local needs.

3.4 Component Interaction

The following sections detail the interaction between the major components in the distributed STREAMS solution that interact with the controlling thread. Each section also contains examples to illustrate how some problems are solved via these interactions.

3.4.1 Middleware Interaction

The amount and timing of interaction with the middleware 50 (FIG. 5) will depend upon the services that are provided by the middleware and the policy requirements for the distributed STREAMS stacks. This is a design decision in order to keep the distributed STREAMS solution middleware independent. At a minimum the following areas will require interaction: stream creation, stream distribution, and error recovery.

To illustrate how the interaction would work, let's examine the previous cluster usages—hardware sharing, load balancing, high availability, and single-system view.

Hardware Sharing. When a cluster is defined not all nodes within the cluster may be active at a given time, i.e. the available cluster hardware is in flux and no single node can be relied upon to exist. This, in turn, implies that the cluster hardware configuration must reside within a software entity which may exist on one or more nodes within the cluster and that there must be a dynamic (no static binding possible) protocol to determine where and when information. Now, this could be accomplished within the controlling threads, but this would complicate the design and the implementation and data may not be easily utilized for other cluster facilities which are not streams-based. This is where middleware come into play.

Figure 7:
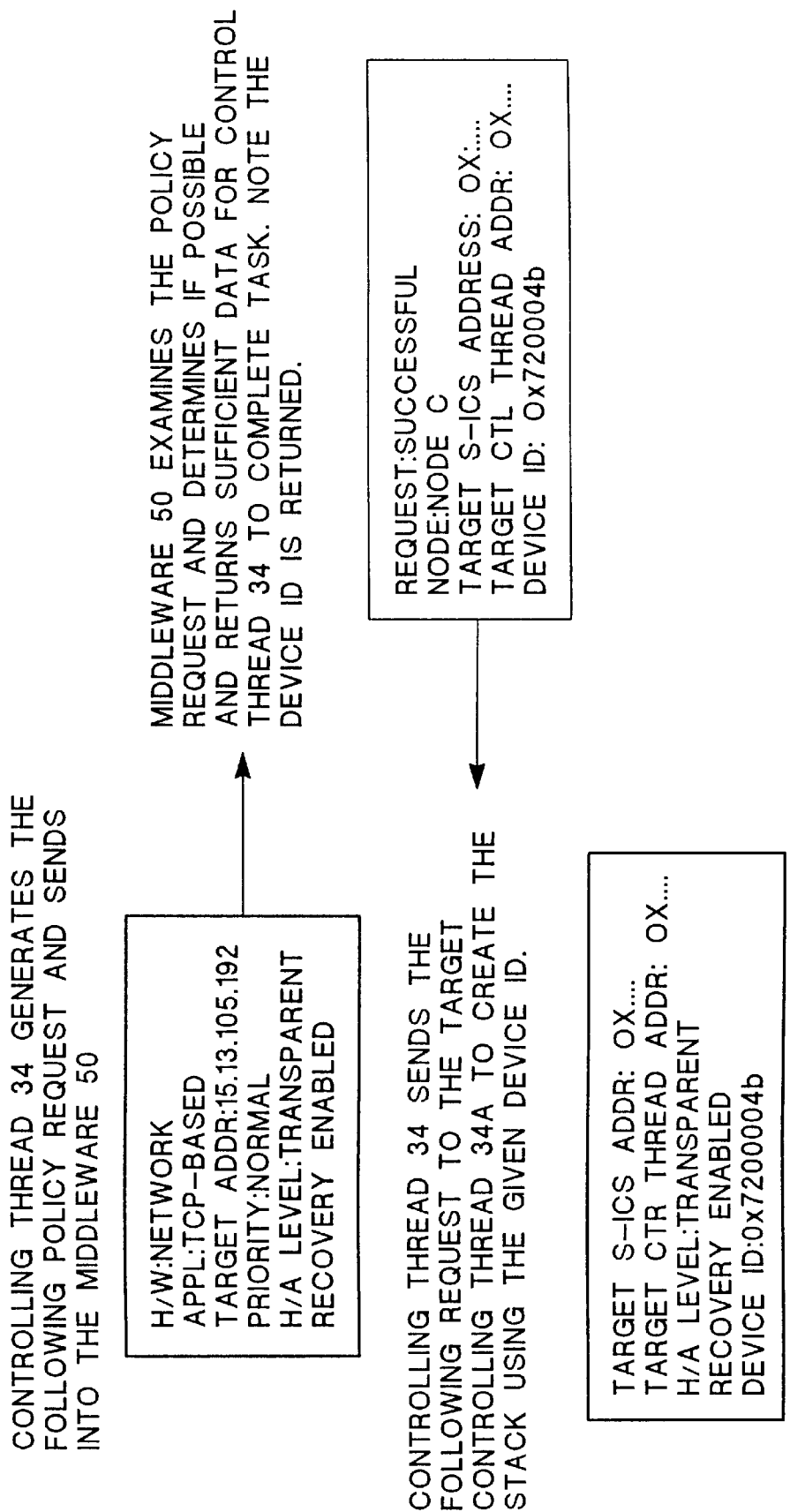
FIG. 7 is a diagram illustrating a portion of the flow of messages between the controlling thread and the middleware in the process of FIG. 5 showing how the controlling thread informs the middleware that a connection has been made.

The hardware sharing example illustrated had the entire stream stack existing on nodes C and D and relied upon function shipment to exchange data between the TCP/IP stack and the application running on nodes A and B. In order for the application to open a TCP/IP instance (a detailed algorithm is described in a later section for opening distributed streams), the controlling thread must be contacted which in turn will contact the middleware thread. The controlling thread 34 will probe the middleware 50 by sending a message which indicates the type of hardware being accessed, the type of application being executed, and any additional qualifiers such as remote target network addresses and the priority of the application. This information is used to create a middleware policy request. The middleware examines this request and determines if the request may be satisfied and upon which node. This algorithm is illustrated in FIG. 7.

The actual content of these messages, while being middleware dependent, does not preclude the controlling thread from being middleware independent. To maintain independence, the controlling thread may hide all of this information by creating a vector of functions which may take generic messages and actions and convert from/into middleware specific messages. This technique has been used in STREAMS and many operating systems and is quite common in applications which are object-oriented. For distributed STREAMS, at a minimum the following operations should be supported:

To obtain middleware locations and middleware failure recovery policies.

To obtain a cluster node configuration and associated hardware. Node configuration includes items such as where STREAMS drivers and modules are located, the controlling threads executing on that node, what STREAMS services are supported, etc.

To obtain a cluster node routing table.

To obtain a active cluster node list—this list will be dynamic so the controlling thread may periodically probe for this information or the middleware may update all controlling threads of changes.

To obtain policies for determining how to perform node failure recovery and other activities associated with high availability.

To obtain policies specific to the STREAMS stacks being executed. For example, where a stack may be split—if at all, whether a stack may migrate, should dynamic function replacement be used to boost performance, etc.

If the above is to be accomplished without using a middleware thread, then the controlling threads will need the following configuration data:

Which nodes contain STREAMS drivers and modules

What nodes are currently active and fully operational and have the necessary resources and capabilities to meet the initiator's requirements.

How to access the device files and map them back into dev_t structures.

How to address protection/security issues for applications requesting driver access.

What is the current system load on the potential set of target nodes and what is the criteria for selecting a specific target. A round-robin scheme could be used but without load data, an individual node could become overloaded.

What are the addresses of all S-ICS within the system and what are their capabilities.

What controlling thread should be communicated with to satisfy this request.

Load Balancing. Load balancing requires that threads, and hence, stream-based stacks be able to migrate in whole or part to different nodes. The controlling thread utilizes the middleware to determine the migration policies, where to split the stack, the target node, etc. The majority of this information will be determined at the time that the stack is created—the when to migrate and the migration target are usually the only dynamic elements. FIG. 8 illustrates the potential message exchange between the controlling thread 34 and the middleware 50.

High Availability. For high availability, the controlling thread, not the middleware, is the initiator of the recovery. This is necessary since the recovery may be a result of the middleware failing and the controlling thread needs to re-establish a new middleware contact. If middleware failure occurs, then the following steps, depending on how the failure was detected, should be taken.

1. If the controlling thread were initiating a request or a pending request timed out, then it will examine its middleware recovery policy to determine the next action—this may vary with the middleware implementation. Example policies are: (A) Broadcast a message to controlling threads on other nodes and determine if they detect the failure also or if this a node-specific failure, in which case, the controlling thread will need to inform the middleware via one of the other controlling threads and initiate recovery. (B) Walk a list of nodes and determine if the middleware is operating there. If so, then re-establish communication, else move on to the next node. If no node is executing the middleware, then examine an alternative middleware node list and inform that node to initiate middleware recovery and proceed.

2. The controlling thread may be informed of middleware failure by a new middleware instance which may have been the result of the previous step. In which case, the new instance is simply informing all known controlling threads of the change to prevent them from initiating a recovery process.

3. The controlling thread may also be informed via the S-ICS that it can no longer find the middleware, in which case, the controlling thread will initiate its recovery mechanism. Once recovery is complete, it will inform the S-ICS of the new instance and the S-ICS will continue its processing. Note: It might be simpler for the S-ICS and controlling threads to be designed such that until recovery is complete, the S-ICS will forward all middleware requests to the controlling thread. This simplifies the S-ICS since some activities are inherently easier to design above the stream head rather than within the stream stack.

If a stream stack component fails, the recovery mechanism and interaction with the middleware will depend upon who informs it of the failure and where the failure occurs. The following steps should be taken:

1. The controlling thread 34 may be informed by the middleware 50 that a node failed. This may be the case where the middleware is taking a pro-active approach to failure recovery. In our example TCP/IP/DLPI configuration shown in FIGS. 3A or 3B, if the node where the upper portion of the stream is executing, whether that is TCP or TCP/IP depending upon where the stream stack is split, fails, then the recovery policy might be to just close the DLPI instance and update all S-ICS and controlling thread data structures. For a different stream stack, the recovery policy might be to re-attach this stream component to another node such as if one end of a streams-based pipe were to be re-attached to a new application instance in which case the middleware may have included a new attachment point within the message sent—for streams-based pipes this may be one way to implement application migration.

2. The controlling thread may be informed by the S-ICS that it can no longer route requests to the remote node. The controlling thread would enact its recovery policy which had been downloaded at the time the stream stack was created. This policy may be to contact the middleware and determine a new remote node. Of course, the S-ICS could also do this but this depends on where one wishes to implement the recovery. Doing recovery within the S-ICS may be faster since there is no context switch to the controlling thread but may create timing problems between the S-ICS and the controlling thread depending upon how data is partitioned and reflected within each component.

3. The controlling thread may be informed by the stream stack component itself that there is a problem. For example, if the component sends up a M_HANGUP or M_ERROR message, then the stack is basically useless until the problem is fixed. If a M_ERROR message occurs, it may indicate that the driver cannot communicate with the hardware. The controlling thread may, if it knows the hardware has been replicated on the local node, simply create a new instance of the stream component and update related data. The controlling thread may also attempt to initiate a new instance by examining its hardware knowledge policies and performing the algorithm for opening a distributed stream. Or, it may probe the middleware for alternative hardware and initiate the same algorithm. In any event and depending upon how the data is partitioned and reflected, the controlling thread will need to inform the middleware, the other controlling threads, and the S-ICS of the new stack component's location.

Single-System View. If a cluster is to maintain a single-system view of cluster-wide resources, then there must exist a middleware mechanism which can convert a generic resource criteria list into a specific resource identification list. In the previous hardware sharing exchange, a criteria message was generated by the controlling thread and sent to the middleware. The middleware interpreted this message and respond with a specific resource instance which would meet this need. The controlling thread was then able to proceed with the operation. The section dealing with opening a distributed stream will illustrate how these messages are generated and the processing involved.

3.4.2 S-ICS Creation and Interaction

The controlling thread will be responsible for creating, managing, and destroying S-ICS instances via the in-kernel STREAMS interface. The controlling thread creates an S-ICS instance, which, for this sample code, is a clonable streams-based driver:

```
/* Determine the device identifier for the S-ICS driver */
if ((open_dev = str_dev_lookup("/dev/s_ics" &err)) && err) {
  /* log error and exit since the device file does not exist. If the
operating
   * system supports dynamic loadable kernel modules, then initiate a
   * subsystem load explicitly of this driver.
   */
}
/* Using the device identifier, open the driver and find the stream head
*/
if ((sth = streams_clone_open(open_dev, O_RDWR, &error)) ==
NULL)
  /* log error and attempt error recovery such as finding the real
   * major/minor number of the S-ICS driver.
   */
/* Using the stream head address, hash a bucket entry
   *and store the address */
struct sth_s *bucket;
bucket = CTL_S_ICS_HASH_FUNC(sth);
bucket->sth_next = sth;
```

If the S-ICS is implemented as a non-clonable driver, then the streams_clone_open( ) call is replaced with a streams_open( ) call; the rest of the code will apply as is.

Each controlling thread may create one or more S-ICS instances.

The number of instances created will be based on the following:

If a controlling thread has been assigned a specific task such as handling module and driver strlog( ) activity for a node, then it will only need to create a single S-ICS task.

If the majority of the messages between the distributed stream components are primarily M_DATA and M_PROTO, for which the controlling thread does not become involved, then the controlling thread may wish to create at least one S-ICS per processor or per cluster interconnect card in order to improve bandwidth throughput/efficiency and to improve the MP-scaling of the distributed STREAMS solution. The distributed stream components being managed could be assigned S-ICS instances based on something as simple as the target node they are communicating to or based on the I/O hardware card, which in our example would be the DLPI instance, is managing. This could lead to better utilization of the system cache and to better performance.

If the implementation of the S-ICS cannot be implemented to be protocol independent, e.g. while nearly all streams-based transport providers all speak TPI from the applications view and speak DLPI from the hardware interface view, there may be corner situations which cannot be solved in a generic way, then it will become necessary to have a S-ICS implementation per special protocol stack. This does not mean that the bulk of the S-ICS design cannot be re-used, only that some portions of the S-ICS, such as the route cache may be best if implemented on a per protocol basis. The only advantage that springs to mind as a result is that some aspects of the S-ICS may be simplified or not be dealt with. For instance, not all protocol stacks may need a high-availability solution or may have a different routing scheme which could result in a simplified design. Note: with some imagination even these problems can be solved in a generic way by using the STREAMS Dynamic Function Replacement to provide functional augmentation of the S-ICS. One could even use STREAMS Dynamic Function Registration[3] to assist in interpreting messages and deciding what preprocessing/post-processing could be done via the S-ICS to embed or remove information which assists the S-ICS in its processing.

The controlling thread may pre-stage a number of S-ICS in a quick-reference cache with any additional needs being dynamically allocated. Pre-staging would allow the controlling thread to react faster to remote requests and stack migration. For each S-ICS created the following steps should occur:

1. The controlling thread will communicate cluster infrastructure data, e.g. cluster node table, a node routing table, middleware communication endpoint, etc. The S-ICS will utilize this data to create is data cache. In addition, the controlling thread may communicate additional S-ICS specific information if the S-ICS has particular operating characteristics which have been discussed previously.

2. The controlling thread will determine the S-ICS read and write queue addresses. It will then communicate this information to each distributed stream component's stream head preview functions which this S-ICS will pass data for. This will allow the stream head functions to bypass passing data through the stream head, such as M_DATA and M_PROTO messages—see the previous example preview function, to the controlling thread if it chooses and send these messages directly to the S-ICS write queue.

3. Likewise, the controlling thread will communicate each distributed stream this S-ICS will communicate with the stream's stream head address and its sth→wq→q_next and sth→rq→q_next addresses. The S-ICS will build a fanout table using this data. The fanout keys will be the node identifier and the stream head address which are embedded in the messages and provide a unique, cluster-wide identification tuple. Steps 2 and 3 are used to improve performance by eliminating the need to involve the controlling thread unless necessary.

4. In order for the above performance improvements to be made, the controlling thread must also set up flags within the stream head which will be used during close processing to ensure that all components involved with this bypass operation are made aware of the pending dismantlement and can disable the stacks and cancel any pending activity. If this code is not provided within the STREAMS implementation, the system will have a race condition which will result in a system panic.

5. If the controlling thread detects that the middleware has failed, then it will initiate recovery and inform the S-ICS of the new instance. Likewise, if the S-ICS detects middleware failure, then it will inform the controlling thread which will initiate recovery and update the S-ICS of the new middleware instance.

With the S-ICS created and initialized, the interactions between the controlling thread and the S-ICS now depend upon the capabilities the cluster facilities will provide and to what level each component of distributed STREAMS has been implemented. The following is a list of potential controlling thread/S-ICS interactions along with some high-level qualifications on how they may be implemented and under what circumstances.

If a stream stack is being opened and its components are distributed between two or more nodes, then the controlling thread will communicate to the remote target node's controlling thread to create the remote stack components and to initialize the S-ICS data cache. In order to accomplish this, a communication protocol will need to be applied between the two thread instances and between the threads and the S-ICS instances. In addition, the controlling thread will need to coordinate any middleware knowledge and updates. Since this is rather complex, a separate section is dedicated to this subject.

Some of the performance tuning ideas illustrated in this design are technically violating the ideal of how STREAMS modules and drivers should be implemented and how messages should flow within a stack. This is not unusual since many modules and drivers are usually poorly designed and therefore have to resort to such violations in order to accomplish their goals with the minimal effort—common examples are networking protocols which were originally implemented in a non-STREAMS stack and are then coerced into a STREAMS stack. Within this design, by enabling the routing of messages from one stack to/from the S-ICS stack, we are, in essence, violating how messages would normally be routed, i.e. only through the stream heads. One of the main reasons to not allow this violation is the close race condition.

When a stack is being closed, the individual components are "popped" off the stack in a top-down fashion from below the stream head down to the lowest driver. Before each module/driver is popped, their associated close routine is called, which allows each component to perform any clean up of private data (that pointed to via the q_ptr) and to flush any current messages. The STREAMS framework will also cancel all outstanding put and service routines in order to ensure that there are no outstanding references to any queues or messages before the module/driver structures are freed; if these routines were not canceled, they might reference what are now invalid pointer addresses which would result in the system crashing.

By allowing one stream stack's put or service functions, whether the original or the augmented ones, to place a message on another stream stack and invoked the put or service routine of that queue instance, there is a possibility that if a close were also in progress, the pointers being referenced, such as the target queue's address, would now be invalid and the system will crash. To prevent this, a close protocol will need to be developed for the two stacks. In this case, that means that the S-ICS, the controlling thread, and the stream head preview functions which perform the routing will need to be coordinated.

The following close protocol is proposed using the example TCP/IP/DLPI configuration with the split occurring between IP and DLPI as shown in FIG. 3B.

If the DLPI stack is being closed, the close race condition can only occur if a message is being sent directly from the S-ICS read queue via its put or service routine to the DLPI write queue. To prevent this, the controlling thread, which would be the initiator of the close operation, must inform the S-ICS that a close is pending and to cancel all pending messages and to confirm that any current operations to the target DLPI instance have completed before the close can be started. The S-ICS is informed via an ioctl since this will not complete until the S-ICS has completed all clean up. The S-ICS performs this clean up by using a "active" counter and a "close" flag within its private data structure associated with the target DLPI instance. This counter is incremented whenever a put or service routine is started and decremented when it has completed. When the counter goes to zero, the S-ICS can be assured that all pending activity has completed and can now safely flush all messages from its queues that target this instance. The following is sample S-ICS read put routine illustrating these changes. Note that the counter is controlled via the STREAMS framework synchronization mechanism so there are no extra spinlocks to be added. The close flag also does not require any spinlocks since it may be set at any time and is never cleared.

This structure is one part of the S-ICS private data structures which will be stored in each S-ICS instance q→q_ptr.

```
struct target_queue_t
  queue_t * target_read_queue;
  queue_t * target_write_queue;
  int32 target_pending_actions;
  int32 target_flags;
  /* Any other additional information */
}
/* Sample put routine modifications */
int32
s_ics_read_put(q, mp)
{
  struct target_queue_t * targe_queue;
  struct s_ics_q_ptr * s_ics_data
  /* Derive local S-ICS data */
  s_ics_data = (struct s_ics_q_ptr *) q->q_ptr;
  /* If M_DATA or M_PROTO, immediately forward to correct
  instance
  */
  if (mp->b_datap->db_type==M_DATA || mp->b_datap->
db_type==M_PROTO) {
    if ((target_queue == find_target(mp, s_ics_data)) ==
    NULL) {
      /* initiate error recovery */
    } else {
      if (target_queue->target_flags & TARGET_CLOSING) {
        freemsg(mp);
        return;
      }
      target_queue->target_pending_actions++;
      putnext(target_queue->target_write_queue, mp);
      target_queue->target_pending_actions--;
    }
  } else
  /* For all other message types, determine if the message should be
   * forwarded or sent to the controlling thread. The "if" check is
   * performance purposes since a switch statement is slightly slower.
   */
  switch (mp->db_type) {
  case M_PCPROTO: /* Execute check and process message */
  break;
  case M_IOCTL:/* Execute check and process message */
  break;
  case M_FLUSH:/* Execute check and process message */
  break;
  .... /* Add as many cases as are necessary for the S-ICS to handle */
  default:
    freemsg(mp);
    return;
  }
}
```

If the S-ICS instance is being closed, then all of the DLPI instances that it was managing will need to be informed to ensure that all current and pending actions are either completed or prevented from referencing an invalid queue address. Since the routing to this queue address only occurs if the stream head read put routine has been augmented to preview and forward the data, then the solution is quite simple—either remove the augmented function from the stream head or, if migrating the DLPI instance from one S-ICS to another, update the augmented functions target queue information. To remove the functions, we utilize the exact technique which is documented in STREAMS Dynamic Function Replacement. We do not need to keep any counters or close flags since the stream head does not have a read service routine; therefore, when the stream head is acquired to perform this activity, we can be assured that any active invocation has completed and all pending activity will be executed using the updated stream head put routine.

There are at least three other areas of interaction that must be dealt with for any implementation of distributed STREAMS: splitting an existing stream, dealing with the flow control problems within the cluster, and the distributed stream head and how to perform remote stream head manipulation. These subjects are also quite complex and so further discussion is deferred to other sections.

3.4.3 Local Stack Component

It is responsible for passing messages between the components and performing the necessary flow-control.

3.4.4 In-Kernel STREAMS Interface

The controlling thread will utilize the in-kernel STREAMS interface to communicate to the S-ICS and the various module/driver stacks that it is controlling. The controlling thread will use the following in-kernel interface operations:

streams_open( ) and streams_close( ) will be used to create/destroy the S-ICS instance and the distributed streams components.

streams_read( ) and streams_write( ) may be used to send messages which are generated by the controlling thread. These routines will generate M_DATA mblks via allocb( ) and have built-in bufcall( ) recovery which means the controlling thread does not have to deal with this issue. However, M_DATA messages as a communication facility for distributed stream management is of limit use since all M_DATA messages would need to be scanned to determine the originator.

streams_putmsg( ) and streams_getmsg( ) are used to send messages which are mblks that the controlling thread creates. The downside, of course, is the controlling thread must now deal with allocb( ) failure, though it may make use of a new routine called allocb_wait( ) which will only return once the memory is allocated or it may maintain a pool of mblks which it will manage itself. This pool would be very small, just a few messages since the controlling thread will only need an emergency supply. Its primary allocation scheme will really be mblk re-use since the majority of messages being sent to it will be mblks.

By using mblks, the controlling thread directly communicates to the S-ICS or a remote S-ICS via M_CTL, M_DELAY, M_RSE, M_PCRSE, M_STARTI, M_STOPI, or M_HPDATA messages without causing performance problems. This is possible since most modules and drivers make limited, if any, use of these message types which allows the S-ICS and the stream head preview functions to only examine messages in this specific subset, automatically forwarding all other message without adding any further performance penalties. In addition, these utilities would allow the controlling thread to view messages such as M_ERROR directly and take appropriate action, possibly executing a recovery mechanism and never forwarding the message to the application.

streams_ioctl( ) is used for all ioctl processing. The in-kernel interface defines a new set of kernel ioctls and how to use them. Most of the standard STREAMS defined in streamio(7) are supported—see the interface definition for potential exceptions.

4.0 S-ICS Design

From the previous discussions, the following should have been discerned about the S-ICS:

- It is a streams-based driver, preferable a clonable driver.
- It is a software driver since there it is does not control a physical hardware device.
- Even though the controlling thread is shown communicating via the in-kernel interface, communication can occur using the standard system-call interface. The only trade-offs are performance and potentially security. In addition, if there are more than one-controlling threads working together, load-balancing the S-ICS between them and sharing data will be more difficult since this will probably require additional code and a shared memory segment be created. This does not effect the S-ICS design except that the node table and the P-ICS instance data must now be maintained within the S-ICS instead of the controlling thread.
- The S-ICS communicates to the P-ICS using the P_ICS_ENDPOINT structure which will contain the function vector describing the P-ICS-specific handling functions. By confining communication to these functions, the S-ICS will remain basically P-ICS implementation independent.
- The S-ICS will maintain a routing table and several data tables which will be used to route messages between itself and the target queues it is managing. The other use is to improve performance by eliminating the need to move the majority of messages through the controlling thread, leaving it for exception situations only. Depending upon how these routing tables are updated, the S-ICS may not require much error handling since the tables can be updated such that they are never out of sync.
- As such, the S-ICS must be involved in all distributed STREAM creation and migration where components are split among nodes.

The rest of this section will detail these aspects of the S-ICS with some aspects (distributed stream creation and migration) being explained in later sections.

4.1 Creation and Destruction

This is discussed in the controlling thread's S-ICS Creation and Interaction Section.

4.4.1 Driver Open Routine Design

As with all drivers, the S-ICS 38 will have an open routine. Since STREAMS-based drivers are allowed to sleep during open, the S-ICS will perform the following steps, some of which may result in a sleep occurring:

1. If the S-ICS is implemented as a clonable driver (recommended), then it will need to acquire a new minor number that will be returned as part of a dev_t structure. This minor number is normally just an integer which is an index into an array of potential S-ICS device structures. If such, then the array element will be marked as IN_USE and the open routine will initialize it accordingly. If the S-ICS is implemented as a non-clonable driver, then if it is already active and does not allow multiple opens to occur at a single time, an error should be returned.

2. If the P-ICS dev_t may be obtained either through a default value or via a well-known function call which will return a dev_t structure, then the S-ICS may attach itself to this hardware driver using the implementation-specific P-ICS protocol (use data hiding to make this a generic function call for all subsystems accessing the P-ICS). It is recommend that attachment only be done during open if the P-ICS sleeps during this operation; otherwise, it is easier and more flexible to have the controlling thread probe the middleware for the best P-ICS instance for this node (this allows the middleware to load balance multiple P-ICS (if present) among the various other subsystems executing over it for each node).

3. At this point, the S-ICS should allocate all private data structures, locks, etc. and store the controlling address in its queue's q_ptr field. A potential layout of this information is given in a subsequent section.

4. If there are no errors, return the minor number. The following is a sample S-ICS open routine which covers the above steps. The actual implementation details are left to the individual developers of this driver.

```
int32
s_ics_open(q, devp, flag, sflag, credp)
{
    int32 minor;
    struct p_ics_attach attach;
    /* Find available minor number */
    if ((minor = find_minor_num(q, devp, flag, sflag)) == 0)
        return(0);
    /* Determine P-ICS and perform attachment if present */
    if(streams_P_ICS) {
        if ((error = p_ics_attachment(DERIVE_DEV_T
            (streams_P_ICS),
            &attach)) {
            release_minor(streams_number(minor);
            return(error);
        }
    }
```

-continued

```
/* Allocate and initialize private data structures and S-ICS fanout
     table */
    if ((q->q_ptr = allocate_s_ics_structures(q, minor,
     flag)) == NULL) {
         if (streams_P_ICS)
             detach_p_ics(attach);
         release_minor_number(minor);
         return(ENOMEM);
    }
    return(minor);
}
```

4.1.2 Driver Close Routine Design

The S-ICS driver close routine is nearly the reverse of the open routine. When the S-ICS is closed, it is assumed that any module or driver queues which were being directly communicated with, i.e. bypassing the stream head, have been informed of the pending closure and have had the augmented stream head functions properly adjusted and all pending requests are now canceled or redirected to another S-ICS instance. Therefore, the close routine simply un-does what the open routine performed. The following sample code illustrates the steps involved.

```
int32
s_ics_close(q)
{
    int32 minor;
    struct s_ics_data *sp;
    /* Cast the private data into a known S-ICS structure */
    sp = (struct s_ics_data *)q->q_ptr;
    minor = sp->minor;
    /* If the P-ICS is still attached, then detach it */
    if (sp->p_ics_attached)
        detach_p_ics(sp->attach);
    /* Free the private data structures */
    free_s_ics_structure(sp);
    /* Release the minor number */
    release_minor_number(minor);
}
```

4.1.3 Write Put Routine Design

In a previous section, the read put routine design was laid out at a high-level; this will now be illustrated for the write put routine design.

```
int32
s_ics_write_put(q, mp)
{
    struct target_queue_t *target_queue;
    struct s_ics_q_ptr * s_ics;
    struct rem_s_ics_descrp *target_s_ics;
    struct p_ics_data_t *p_ics_data;
    /* Derive local S-ICS data and source queue */
    s_ics = (struct s_ics_q_ptr *) q->q_ptr;
        /* If M_DATA or M_*PROTO or not from controlling thread, derive
        * target S-ICS and send immediately
        */
    if (mp->b_datap->db_type==M_DATA || mp->b_datap->
        db_type ==M_PROTO ||
        mp->b_datap->db_type == M_PCPROTO ||
        !from_controlling_thread(mp)) {
        /* Find target S-ICS instance derived from the mblk */
        if ((target_s_ics == find_s_ics(mp, s_ics_data)) ==
            NULL) {
            /* initiate error recovery, inform source via M_ERROR */
            mp->b_datap->db_type = M_ERROR;
            set_m_error(mp, ENXIO);
            target_queue = target_queue_index[mp->b_datap->
                source_queue index];
            /* pending actions updated to protect against close
                race condition */
            target_queue->target_pending_actions++;
                putnext(target_queue->target write_queue, mp);
            target_queue->target_pending actions--;
        } else {
            if(p_ics_s_ics_status & S_ICS_FLOW_CON-
                TROLLED) {
                p_ics_s_ics_flw_ctl(target_s_ics, mp);
                return;
            }
            mp = s_ics->p_ics_instance->p_ics_memory_alloc
                (mblk_header_size);
            CONVERT_mblk(mblk, mp);
            db = s_ics->p_ics_instance->p_ics_mem-
                ory_alloc(dblk_size);
            CONVERT_dblk(dblk, db);
            rem = P_ICS_CREATE_HEADER(remote_node,
                remote_s_ics);
            (*s_ics->p_ics_instance->p_ics_send)(rem, mp, db);
            /* If no send errors detected, free the message */
                freemsg(mp);
        } else
        /* For all other message types, take the appropriate actions. For
        * example for M_IOCTL messages, the controlling thread is most
        * likely updating infrastructure data and this should be reflected in
        * the local s_ics_data. Other messages will depend upon what
        * protocol has been worked out between the controlling thread and
        * the S-ICS. Note: the utilize M_DATA or M_*PROTO messages to
        * communicate with the S-ICS since this might confuse the routine.
        */
        switch (mp->db_type) {
        case M_IOCTL: /* Execute check and process message */
        break;
        case M_FLUSH: /* Execute check and process message */
        break;
        ..../* Add as many cases as are necessary for the S-ICS to handle */
        default:
            freemsg(mp);
            return;
        }
}
```

4.2 S-ICS Private Data

Each S-ICS instance 38, 38A . . . 38N (FIG. 5) will maintain a private data structure off of its queue in the q_ptr field. A proposed layout of this and its associated structures follows:

```
#define MAX_FREE_FUNC 10
#define MAX_FREE_ARG 10
struct target_queue_t {
    struct sth_s *target_sth;
    struct dev_t dev;
    uint32 cluster_route_id;
    uint32 target_queue_index;
    queue_t *target read_queue;
    queue_t *target write_queue;
    queue_t *local_read_queue;
    queue_t *local_write_queue;
    int32 target_pending_actions;
    uint32 target_flags;        /* Current target status/capabilities */
    short free_func_index[MAX_FREE_FUNC];
    short free_func_arg_index[MAX_FREE_ARG];
    target_recover_t rem_target_recovery_policy;
    struct target_queue_t *next, *prev;
                            /* Next item that hashed to same
                                bucket */
#define TARGET_HASH_SIZE 1024
                        /* Max hash array - minimum collisions */
``` target_sth is the stream head associated with this queue instance. This address is maintained in the event the S-ICS needs to perform an update of the stream head such as updating the sth_cluster_route_id.

dev is the device identifier associated with the target stream head. The device identifier is initially sent within the mblkduring a system or in-kernel streams interface call. It is then extracted and the stream head is updated with the cluster route identifier.

cluster_route_id is the index into the S-ICS routing table.

target_queue_index is the index into the target_queue_hash which will uniquely identify this target queue.

target_write_queue and target_read_queue are the local queue addresses for where we wish to place the message.

local_read_queue and local_write_queue are the local queue addresses which indicate where a message originated from. These addresses are used to hash a remote target index in the event that the cluster_route_id was not defined within the mblk This can occur if the mblkwas created by a module or driver for local communication. An example would be during the configuration of a DLPI driver under IP, there may be many control messages that will occur and the S-ICS needs to understand which IP sent the data in order to know which DLPI to forward the data to.

target_pending_actions is a counter used to prevent a close race condition.

free_func_index and free_func_arg_index are described in the mblk_header description.

rem_target_recovery_policy is a policy structure which will be return as part of the distributed stream initialization so that the remote will understand what steps, if any, should be taken if this target goes away or cannot be found do to the route table becoming out of sync. The route table can become out of sync during migration so the policy may be as simple as just contacting the controlling thread to probe for the new location of the remote component.

When a request comes in from a remote node, it will contain a target queue index which will be used to find the correct S-ICS instance, should the target queue have migrated between S-ICS, and the associated real target queue address which is a local node address. This avoids pointer coercion or worrying about if the nodes are 32-bit or 64-bit based since all we have is a table index, i.e. a uint 32 value.

```
struct target_queue_index_t {
   struct s_ics_q_ptr s_ics_instance;
                                   /* Back reference if diff S-ICS processing */
   struct target_queue_t *target_queue;
                                   /* Pointer to real target */
}
#define TARGET_MAX_INDEX 65536
```

The route table is an array of structures which define a remote route entry. There will be one entry per remote target queue. The index to this entry will be stored within the cluster_route_id within the target_queue element and within the initiating stream head. Each entry will contain, at a minimum, the following fields:

```
#define REMOTE_INDEX_ACTIVE      0x0000
#define REMOTE_INDEX_INACTIVE    0x0001
#define REMOTE_INDEX_MIGRATING   0x0002
#define REMOTE_INDEX_IN_ERROR    0x0003
#define REMOTE_INDEX_IN_FLUX     0x0004
struct s_ics_rem_route_t {
   int32 remote_index_state;
   int32 remote_target_index;
   struct node_t *remote_node;
   struct rem_s_ics_descrp *remote_s_ics;
   struct sth_s *source_sth;
}
``` remote_index_state will reflect the current known state of this element. The normal state will be active so no additional checks need to be made when routing a message. If the element is in an "in flux" or "migrating" state, then the operation may need to be suspended for a short period of time. This suspension can be accomplished by nonenabling the module/driver and by imposing a flow control situation so no messages may go forward. The pending message will need to be cached for a short period of time—this can be off of the S-ICS or the stream head preview function and when the condition is removed, all processing will proceed normally.

remote_target_index is the index into the remote target_queue_index array which will define the actual remote target queue read and write queue addresses. This index will be exchanged when a distributed stream is created, migrated, or closed—in which case the route table will be updated to reflect the current state.

remote_node will point into the node table being managed by the controlling thread. This information will be used to create a P-ICS header to route the messages to the remote node.

remote_s_ics points to a structure which defines the remote S-ICS address and how to get to it via the P-ICS. This structure may be pointed to by many remote index elements.

source_sth is the stream head address of the local stream component. This address is maintained so that any error processing may be redirected to the appropriate stream head instance.

```
#define REM_S_ICS_ACTIVE 0x0000
#define REM_S_ICS_INACTIVE 0x0001
#define REM_S_ICS_IN_FLUX 0x0002
struct rem_s_ics_descrp {
   P_ICS_S_ICS_ADDR p_ics s_ics_address;
   int32 p_ics_s_ics_state;
   P_ICS_DATA_BUF
   p_ics_s_ics_data_buf;
   int32 p_ics_s_ics_offset;
}
``` p_ics_s_ics_address will point to a structure which describes the P-ICS implementation specific address information. This structure will contain a set of functions which can be used to create and manage P-ICS headers to target a remote S-ICS.

p_ics_s_ics_state is obviously the current state of the remote S-ICS.

p_ics_s_ics_data_buf is a data buffer description structure. If the P-ICS is using a receiver managed paradigm, this could be pre-staged pool of memory that the P-ICS will manage. If a sender managed paradigm is used, then this will be the remote target address range and the p_ics_s_ics_offset will be the offset into this memory pool to actually place the data. This buffer pool will be effected by the functions defined within the P_ICS_ENDPOINT structure.

The S-ICS private data structure will contain structure types which cannot be known until the driver is implemented. At a minimum, the following defines and structure elements should exist.

```
#define S_ICS_INACTIVE          0x0000
#define S_ICS_ACTIVE            0x0001
#define S_ICS_CLOSING           0x0002
#define S_ICS_MIGRATION         0x0003
#define S_ICS_IN_ERROR          0x0004
#define S_ICS_MIDDLEWARE_ERROR  0x0005
#define S_ICS_ORPHANED          0x0006
#define S_ICS_OUTBOUND          0x0007
#define S_ICS_INBOUND           0x0008
#define S_ICS_FLOW_CONTROL      0x0009
struct s_ics_q_ptr {
    int32 s_ics_flags;
    struct p_ics_data *p_ics instance;
    struct middleware_t *s_ics_middleware;
    struct target_queue_index_t
      target_queue_index_hash[TARGET_MAX_INDEX];
    struct target_queue_t target_queue_hash
      [TARGET_HASH_SIZE];
    struct node_t *node_tbl_ptr;
    struct sth_s *s_ics_sth[S_ICS_HASH_SIZE];
    struct s_ics_rem_route_t remote_route_tbl
      [TARGET_MAX_INDEX];
    struct s_ics_rem_route_t s_ics_route_tbl
      [REM_MAX_INDEX];
    S_ICS_MIGRATION_POLICY s_ics_migration_policy;
    S_ICS_RECOVERY_POLICY s_ics_recovery_policy;
    S_ICS_CONTROL_POLICY s_ics_control_policy;
}
``` s_ics_flags is simply the state of each S-ICS instance and what it may be doing.

p_ics_instance is the P-ICS instance data as defined by the previous structure.

s_ics_middleware describes how to contact the middleware and how to handle middleware migration/failure via a set of policies and standard functions.

target_queue_index_hash is an array of indices which are used to locate the real target_queue structure. This is not a hashed array so there really is only one element per index.

target_queue_hash is a hash table containing all of the target_queue elements. There may be more than one target_queue per bucket so the functions to find elements and update this hash must be capable of following the doubly linked list.

node_hash_tbl is a hash table containing node definitions—potential multiple nodes per bucket.

s_ics_sth is a hash table which contains all of the local stream head addresses associated with each upper mux S-ICS instance. This is tracked in order to find queue addresses which will be stored within the stream head upon a plumbing operation being performed.

remote_route_tbl has been described already.

s_ics_route_tbl is the S-ICS routing table. This table describes where all S-ICS instances exist within the cluster and how to get to them. This is necessary if a message must be routed due to a different node should an application or streams component migrate. If a node failed, then the S-ICS would probe the controlling thread or the middleware to update its routing table. These updates could also be initiated by the S-ICS within the system to pro-actively update all other S-ICS of changes instead of being reactive to route error problems—see the S-ICS routing section for a more detailed discussion. Note that this structure uses the same definition as the remote_route_tbl with only the index values not being used.

The remaining three elements are policy structures. The content of these structures is S-ICS implementation dependent and is not detailed here. At a minimum, for each policy there should exist a function vector which the S-ICS can invoked somewhat blindly to handle a specific situation.

In order to exchange data between two nodes, the S-ICS must be able to convert mblk header to and from a byte string which will be transmitted as part of a message send. This means that the various non-pointer related fields must be assembled into a new structure. The following structure describes the proposed layout:

```
#define PROT_NORMAL        0x00
#define PROT_ROUTE_ERROR   0x01
struct mblk_header {
    unsigned short protocol_msg_type;
    unsigned short b_flag;
    unsigned char b_band;
    unsigned char db_ref;
    unsigned char db_type;
    unsigned short db_flag;
    unsigned int db_size;
    unsigned int free_func_index;
    unsigned int free_func_arg_index;
    unsigned int source_queue_index;
    unsigned int target_queue_index
}
``` protocol_msg_type indicates whether this is just a normal exchange between S-ICS, error recovery, etc. Error recovery may occur if the target queue index embedded within the mblk being sent cannot be found. The error return message will include both source and target queue index and the S-ICS will need to examine the message and determine if it needs to probe for a new route or issue an error or drop the message b_flag, b_band, db_ref, db_type, db_flag, and db_size are just the extracted values from the mblk and will be used to reconstruct the mblk header on the remote node.

free_func_index is an index into an negotiated array of free function addresses. The source node will examine a remote node mapping index and embed this into the header. This is necessary to deal with the esballoc( ) and its variants where a driver or module may define an alternative free function for their data. free_func_arg_index is a similar set up but it may require protocol-specific interpretation since the argument being passed into esballoc( ) may be an offset pointer into the encapsulated data or it may be a pointer to a structure which provides the real arguments for the free function. This will require more thought and investigation to create a good design.

source_queue_index may be interpreted in two ways. When a mblk is created as part of a stream head related routine such as for a system call, the routine will embed the sth_cluster_route_id within this field. This field will be normally be the S-ICS route table index so that the route look up is quick. The exception is when the S-ICS has not been able to update this field, in which case, the field will have been initialized to be the device identifier, dev_t, associated with this stream head. The routing function will be able to determine the route table entry using this field. During error recovery, the source_queue_index within the mblk will always be the correct route table index and not the device identifier.

target_queue_index is the index into the remote target queue hash table.

Data structures dealing with policies and such may contain function vectors that will be executed via the S-ICS. These function vectors will allow the S-ICS to remain protocol independent which means that the component designers will need to develop new functionality if they wish to take advantage of these capabilities. If a function is not defined, then the S-ICS should either drop the message, if this is the problem, or shut down the distributed stream and issue a M_HANGUP or M_ERROR message so the application is informed that there is a problem.

Figure 9:
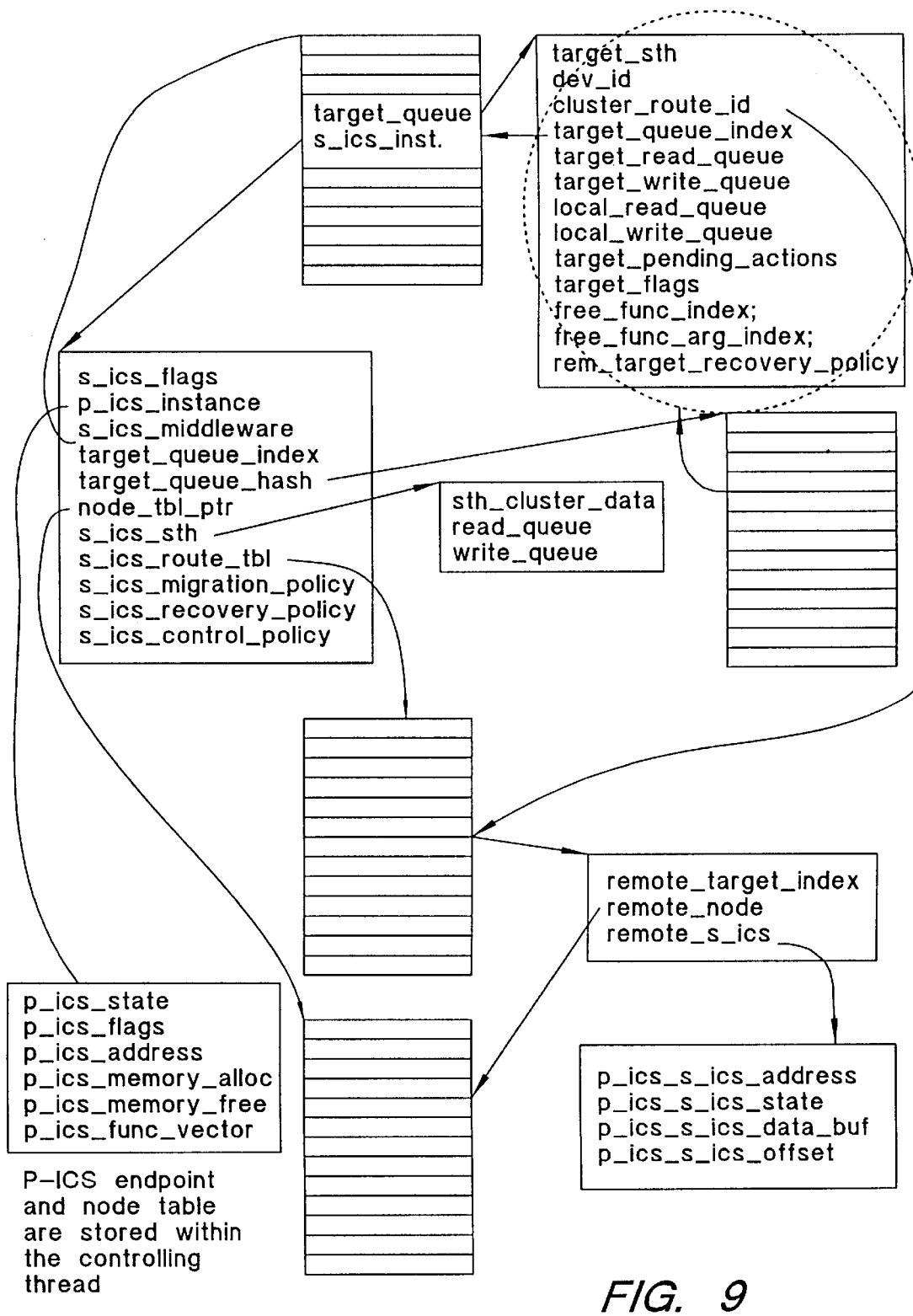
FIG. 9 is a diagram of an example of a data structure used to implement the S-ICS of FIGS. 4 and 5 and showing how routing can be accomplished in the present invention, including a route recovery mechanism that can be used in the system of FIG. 2B.
Figure 10:
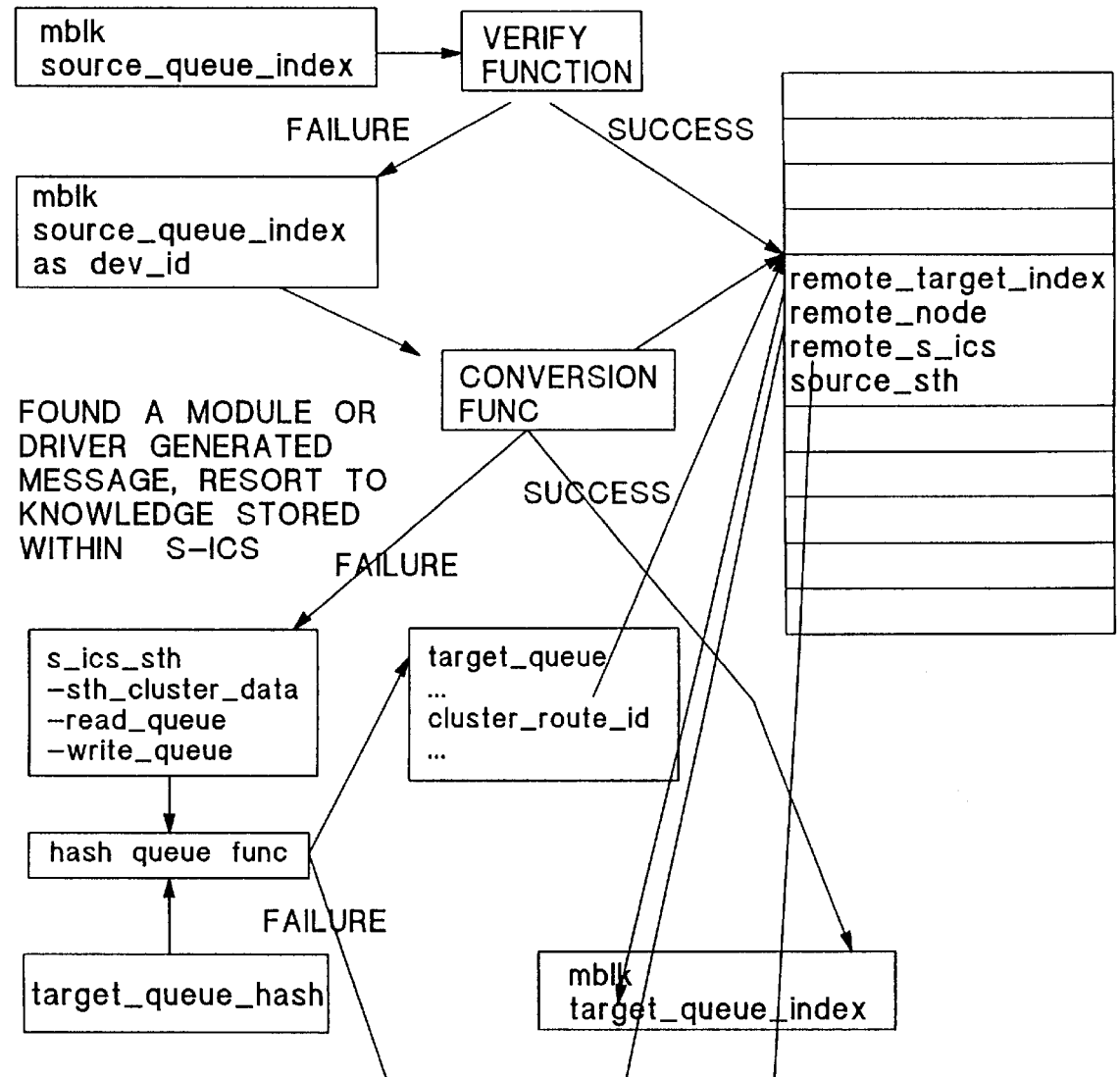
FIG. 10 is a state/flow diagram of a process for locating a remote index using the data structure of FIG. 9.
Figure 11:
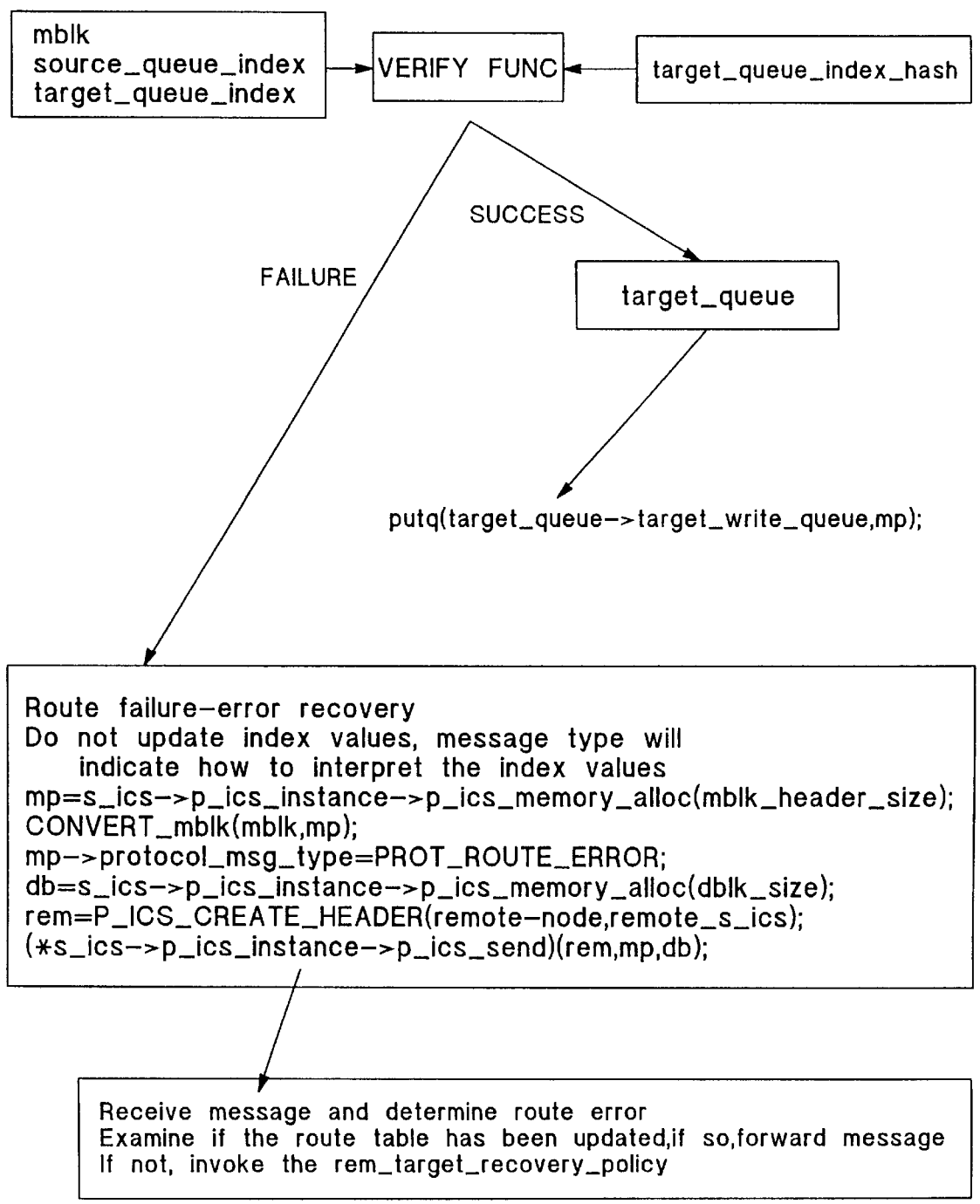
FIG. 11 is a state/flow diagram of a process used by the S-ICS of FIGS. 4 and 5 to locate the target queue in the data structure of FIG. 9.
Figure 12:
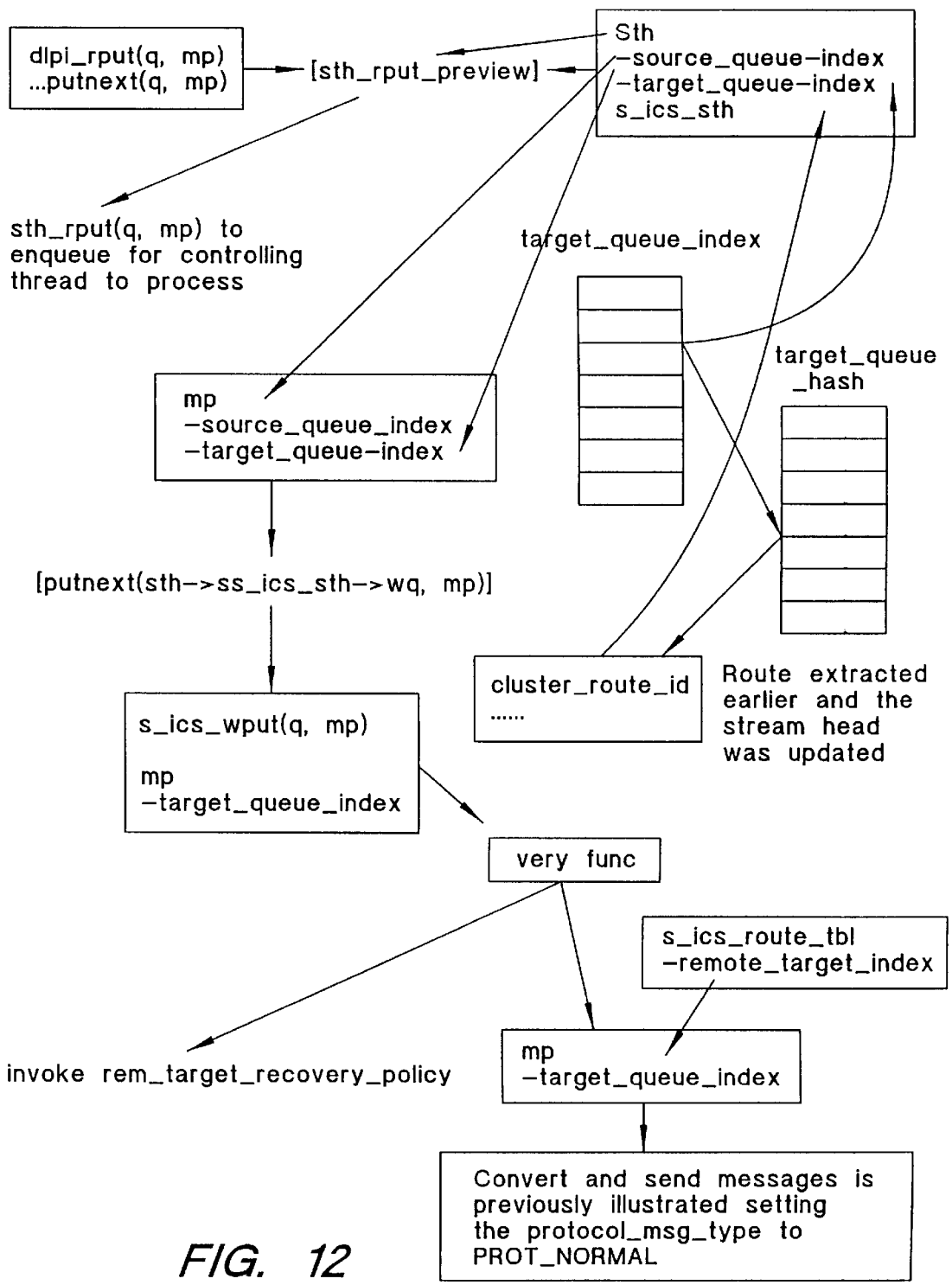
FIG. 12 is a state/flow diagram of the process for locating the target queue index using the data structure of FIG. 9 to implement the preview function of FIG. 2B on Node D.

FIG. 9 illustrates the S-ICS data structures. It also illustrates the data structure interaction with the controlling thread.

4.3 S-ICS Routing

The S-ICS 38 routes messages using a unique, cluster-wide addressing scheme. This scheme is discussed in the following text and a set of diagrams illustrating the different route points. First, for outbound messages:

For each outbound function call being made which will pass through the stream head—write, putmsg, putpmsg, ioctl, streams_putmsg, streams_write, and streams_ioctl—after each mblk is allocated via allocb( ), or for streams_putmsg which will receive the mblk from the calling function, STREAMS will store the sth→sth_cluster_route_id within the mblk header in the mp→b_datap→source_queue_index. The route identifier will be initialized to the sth→sth_dev when the stream is created. The underlying S-ICS routing algorithm will understand either form. The framework will finish processing the mblk and then send it downstream.

2. When the S-ICS receives the mblk via its write put routine, the S-ICS will examine the mp→b_datap→source_queue_index and apply a hash function. This hash function should just be a range check to verify if the route identifier corresponds to an array index into the route table. If this fails, a different hash function will be applied which will treat the index as a dev_t and this should result in a route index. If this fails, then an error recovery mechanism will be applied—see the diagram corresponding to this step for further details.

3. Once the route index is determined, the mp→b_datap→target_queue_index will be updated with the remote_target_index. The source_target_index will remain so that any error processing for this message initiated from the remote can occur. The mblk is then sent to the P-ICS where it is converted into an implementation dependent form and sent to the remote S-ICS. The remote node and S-ICS identifiers are also derived from the route table and also sent to the P-ICS.

4. The remote P-ICS will examine the data that has arrived and determine if it is for the STREAMS subsystem. If this is not the case, then it will give the message to the correct target subsystem or thread such as the controlling thread. Note: if using sender managed communication, the target address is well-known and all the P-ICS needs to do is inform the correct subsystem of the message arrival if the application has informed it to do so. If an interrupt routine is utilized, then the interrupt routine will convert the message into a mblk and determine which S-ICS to invoke.

5. The remote S-ICS (via the read queue put routine) will examine the target_queue_index and determine if the index is valid or if the associated queue has been closed or migrated to a new node. If valid, it will forward the message to the target queue.

The S-ICS can only hash queues that have been registered with it on every node. These queues are combined with the node table to create a set of mappings from one end of the stack to the other. For example, in the TCP/IP/DLPI stack split, the messages would flow to and from IP and DLPI via the S-ICS. Since the S-ICS was involved in setting up this configuration, it knows which identifiers and queues correspond to each other. Note: Streams-based stacks which fragment packets usually do so by using dupb( ) to duplicate the mblk header and simply adjust the b_rptr and b_wptr to reflect the fragment location. Since the identifiers are stored as part of the mblk header, fragmentation is not a problem. The same applies to creating duplicates for retransmission purposes.

For inbound messages, i.e. those messages generated by a remote component such as a remote DLPI instance, routing is done as follows:

1. For each inbound message, the stream head read queue preview function will determine if the message should be routed to the controlling thread or directly to the associated S-ICS. If the message goes to the controlling thread, then the preview function invokes the sth_rput(q, mp) function and framework processing occurs just like in the non-clustered environment. If the messages goes to the S-ICS, the preview function will find the stream head corresponding to the S-ICS within its local sth_cluster_data field and use this to route the message.

Before the preview function actually performs the putnext (s_ics_sth→wq, mp), it will embed an index value within the mblk Within the source_queue_index it will store the sth→sth_cluster_route_id which will be the actual route table index that it was informed of at the time the distributed stream was created. Depending upon implementation, this route index should never change so there is no need to have mechanism to update this component's stream head—any route changes should just be route table updates which will automatically be taken care of by the S-ICS.

3. The rest of the processing should be basically the same as in the previous routing discussion since the S-ICS really does not concern itself as to where a message originated but only in the source and target index values.

Error recovery. If a S-ICS (read queue put routine) determines that a target_queue_index is not valid, then the following would occur:

A target_queue_index will always be valid unless either the stack has closed or the stack has migrated, in either case, what we have here is a race condition between the sending S-ICS and the local S-ICS. When a close or migration occurs, the S-ICS will inform all remote S-ICS of the route changes. It can do so in one of two implementation dependent ways: The S-ICS could simply broadcast the message and assume that all nodes are informed and all S-ICS will be updated; the problem is there is no guarantee that in-transit messages will be correctly routed using the new information. The second way is that the S-ICS could inform all S-ICS that a route update is about to occur and that all should complete what they are doing and await the route update. When all have responded, the S-ICS updates the routes and awaits confirmation. In essence, the S-ICS is using a two/three-phase commit protocol to ensure that all S-ICS are in sync at all times. Obviously the second way eliminates the need for error recovery with the tradeoff that route updates take more work and time which may be acceptable if the routes are not updated that often. (This does not apply to stream creation since the necessary S-ICS are informed such that they are always in sync.) So, the trade-off is where to add the complexity and how much time should be spent in each area.

If the broadcast (really a multicast since only the S-ICS involved in the route need to understand the changes)

mechanism is used, then the S-ICS will need to generate a error response to the initiating S-ICS. In addition, it will also need to keep some information around for a period of time—the amount of time to ensure that all route tables are updated—so that it can inform the remote S-ICS what was the failure. This is optional since it could just always return a route failure message and force the S-ICS to re-examine its route table and potentially probe the controlling thread for status on this distributed stream. The controlling thread may, in fact, be performing error recovery such as for a node failure and might have the S-ICS give it the message. The controlling thread would then hold onto the data and flow-control the initiating stream until the recovery is completed. This will be discussed later.

The only potential problem with these routing solutions is if a module or driver generates outbound messages itself such as a M_CTL message which is used for inter-module communication or M_PROTO/M_DATA messages which might be used to issue hardware driver bind requests. In such cases, the message will not contain source and target index values. There are two ways to solve this problem: The first and best way is to simply prevent it from ever happening by not splitting a stack across a cluster between stream components that communicate in this fashion. While possible, it may not be practical. The second way is to modify the STREAMS framework plumbing routines (the routines associated with the autopush(1M) facility and with the I_LINK, I_PLINK, I_PUSH, and I_POP ioctls—see <streamio(7)>) to record additional information. In addition, depending upon how the stream stack is plumbed, it may be necessary to implement the S-ICS not as just a straight streams-based driver but as a Nx1 multiplexing driver with multiple S-ICS instances feeding into a lower multiplexor which resides above the P-ICS. This is illustrated using the TCP/IP/DLPI example as follows:

The IP component may be implemented as a multiplexor with one or more DLPI instances being linked underneath it. If the stack is split, as recommended, at the IP/DLPI level, then we will record the IP read and write queues associated with this DLPI instance. This may occur if the stream is initially created as a distributed stream during the I_LINK operation or if the stream is being split after creation, then it will occur when the IP and DLPI read and write queues are updated to reflect the S-ICS being interposed. The split after creation is discussed in more detail in a later section. In any case, the queue addresses are recorded in the S-ICS private data structure and utilized as hash keys to determine the correct route. This is possible because there is now a one-to-one mapping between IP and S-ICS instances.

Sample code is as follows with the macro being used to determine which S-ICS instance this is based on its stream head since the private data should be accessible to all multiplexor instances:

```
s_ics_private_data = (struct s_ics_data *) sth->wq->q_ptr;
RECORD_QUEUE(upper_sth s_ics_sth s_ics_private_data);
```

The conditions under which the S-ICS should be implemented as a multiplexor will depend upon how the S-ICS is being used, how many different protocol stacks are being supported by a single S-ICS and how well the S-ICS is capable of maintaining protocol independence, how much load is being seen (MP-scaling and throughput issues), etc. This is a judgement case, but whether it is implemented as such or not, the overall concepts and design remain the same.

Following is sample code of how the S-ICS would handle the outbound and inbound cases for routing messages. This function takes a message pointer and extracts the source queue address index. If this index is not found, then the S-ICS must initiate an error recovery algorithm and find the route differently. If the source is found, then the S-ICS uses it as a hash key to find the target queue index. This target queue index is embedded within the message. The function then uses the target queue index to find the remote node (this operation becomes a simple look up if the data structures managing the indices are cross-linked). Using the node address, the corresponding S-ICS instance address can be determined and used to send the message to the remote.

```
struct s_ics_instance *
find_s_ics(mp, s_ics_data)
{
    struct target_queue_t *target_queue;
    uint32 source_queue_index;
    struct node_t *node_address;
    struct s_ics_instance *s_ics;
    struct sth_s *sth;
    mblkP update_mp;
    uint32 route_index;
    /* Extract source queue address */
    source_queue_index = mp->b_datap->
    source_queue_index;
    if (!VALIDATE_INDEX(source_queue_index)) {
        if (route_index = VALIDATE_DEV_ID(source_queue_index))
        {
            /* Need to update the stream head with the correct route
             * index
             * In this example code, this is done using a M_SETOPTS
             * message to send the updated route. We use the normal hash
             * function to find the local stream head address for this stack
             * and then place the message directly upon the stream head
             * read
             * queue where the sth_rput() will process and update the
             * sth->sth_cluster_route_id.
             */
            update_mp = allocb(sizeof(struct stroptions));
            mp->b_datap->db_type = M_SETOPTS;
            sop = (struct stroptions *)update_mp->b_rptr;
            sop->so_flags = SO_CLUSTER_ROUTE_UPDATE;
            sop->cluster_route = route_index;
            sth = STH_HASH(source_queue_index);
            putq(sth->sth_rq, update_mp);
            goto route_msg;
        } else {
            /* May be a module/driver created message. Use the local
             S-ICS
             * data to determine what is the source queue and then find
             the
             * target_queue element by examining the local_read_queue
             or
             *local_write_queue field.
             */
            if (!(remote_index =
                FIND_TARGET_QUEUE(s_ics_data))) {
                /* Cannot route the message, probe controlling
                   thread or drop it */
            }
        }
    }
route_msg:
    /* NULL returned on error, else the remote_s_ics structure address
    */
    return(&s_ics_data->remote_route_tbl [remote_index]
    remote_s_ics);
}
```

This function takes a message pointer and extracts the local target queue address. This address will be used to hash a target_queue structure which can then be referenced to handle the close race condition.

```
target_queue_t *
find_target(mp, s_ics_data)
{
  uint32 target_queue;
  /* Extract target queue index and return a validated target queue
     or NULL*/
  target_queue_index = mp->b_datap->
  target_queue_index;
  return(VALIDATE_TARGET_QUEUE(target_queue_index));
}
```

FIND_TARGET_QUEUE may fail if a migration or close operation has occurred and the message was in transit before the originating S-ICS could be updated (a potential timing problem). Each local S-ICS instance will be considered current for all operations at the time mapping functions are applied. Each S-ICS instance will be updated whenever a close or migration operation occurs. The timing window will occur if a packet is "in-flight" and the updated information cannot be applied. Therefore, we rely upon the receiving S-ICS instance to resolve the address and take appropriate actions based on the success or failure of this operation.

So, for the S-ICS to route messages within a cluster, it must be informed of where module and driver instances exist and when these locations are modified. In the global port mapping example, the S-ICS might be informed at the time a bind, unbind, or close operation is initiated or if at the time that a distributed stream is created, either opening the stream as such or via splitting the stream at some later time. This allows the S-ICS to be sufficiently informed of all routes that it should not, in general, need to probe the middleware to update its routing cache under most circumstances.

Figure 13A:
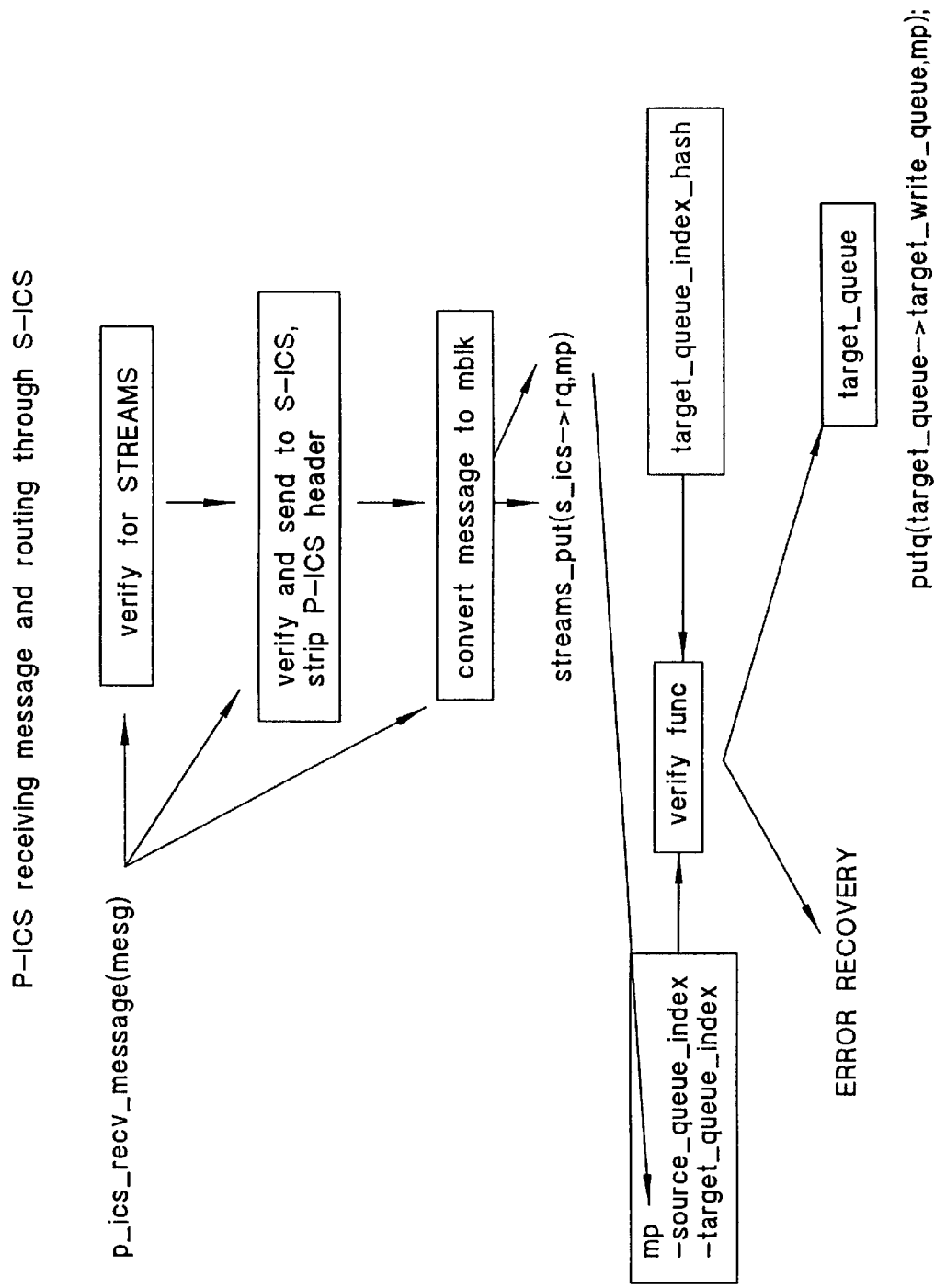
FIGS. 13A and 13B are a flow diagram of message routing through the P-ICS and S-ICS to the DLPI or IP in the system of FIGS. 2A and 2B.
Figure 13B:
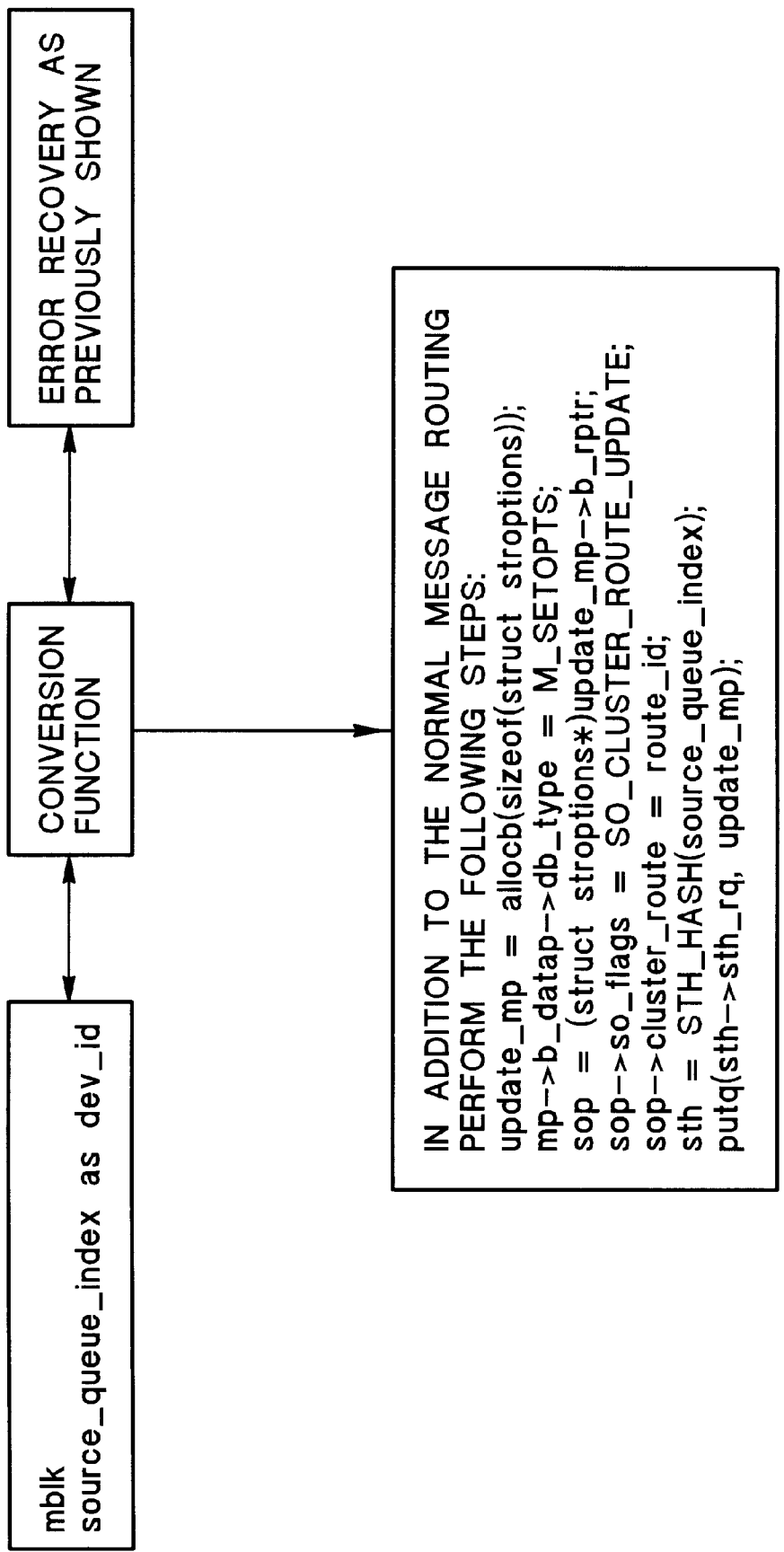

FIGS. 10–12, 13A and 13B illustrate message routing within the cluster. In routing, if source_queue_index was a device id, then the stream head needs to be updated so the routing function does not fail. This is done as shown in FIG. 13B. Optionally, the stream head could be modified to understand M-CTL if the STREAMS implementation does not want to use M_SETOPTS.

4.4 S-ICS Related STREAMS Data Structure Modifications In the previous sections, several functions were defined to extract routing information from mblk header. This information is embedded within the header to reduce the amount of information that must be accessed and distributed throughout the cluster. To facilitate this, the following data structures will need to be modified:

The datab structure will be modified to add the additional routing addresses. Currently, as of SVR4.2 DDI/DKI, the datab structure has been reduced such that for maintaining cache-line alignment of the data, it has several words of padding. These pads will be replaced with the following values:

```
uint32 source_queue_index;
uint32 target_queue_index;
```

These fields will be re-used to pass the stream head route identifier on outbound messages. The route identifier will always be stored within the mblk generated at the stream head even though this identifier will be defaulted to sth→sth_dev when the stream head is allocated. This will be done by:

```
if((mp = allocb(size, pri)) == NULL) {
    /* Perform error recovery usually a bufcall() */
}
mp->b_datap->source queue_address_index =
   sth->sth_cluster_route_id;
```

The performance penalty is minimal, i.e. one load and store; it is not worth maintaining a stream head flag to see if this should be done since the checking cost outweighs the cost of assignment. However, we will maintain a stream head flag to indicate if the framework should record specific queue addresses within a given structure during plumbing operations.

```
#define F_STH_CLUSTER_INTERCONNECT 0x2000
#define F_STH_CLUSTER_CTL_CHECK 0x4000
struct sth_cluster_data_t {
    queue_t *read_queue;
    queue_t *write_queue;
}
```

The read_queue and write_queue will updated during a framework plumbing operation to reflect the actual queues above this S-ICS. For example, since IP is a multiplexor and it may generate messages directly to the driver, we need to know which IP set of queues is being used to generate the message so that we can determine the remote DLPI target. In some cases, this may be obvious but for those that are not, such as when IP is sending a message via its inbound fan-out table to a remote DLPI via the S-ICS, the S-ICS cannot just view the q_next to determine which IP sent the message since this may not be accurate or sufficient enough to find the right DLPI depending upon the IP implementation.
Within the stream head, add

```
struct sth_s {
...
    struct sth_cluster_data_t *sth_cluster_data;
}
```

Now the question to ask is how do we coordinate the queue addresses which exist on different nodes within the cluster? In a way, we don't, but we do. The addresses themselves are not exchanged but an index into a structure which can be used to find the actual address is exchanged. For example, when a message is sent to the S-ICS with a source_queue_address_index defined, the S-ICS will use this index to find the remote target queue address index. This target queue address index will be an index into the remote's table defining queue locations.

4.5 Component Interactions

The previous components have described much of the interactions which can occur between the S-ICS and them. In the following sections, we will examine these interactions in greater detail from the S-ICS perspective and how these interactions may be designed. In addition, we will examine how the S-ICS 38 interacts with the P-ICS 36 (FIGS. 3A and 3B).

4.5.1 Controlling Thread Interaction

Much of the interaction between these two components has already been discussed. So, in this section, I'll just re-emphasize some key points:

The S-ICS 38 is just a streams-based driver as far as the controlling thread 34 is concerned and so the controlling thread is nothing more than a streams-based application. Communication will occur using the standard message paradigm. When the S-ICS needs to send a message to the controlling thread, it will use the standard message types. But, when the controlling thread wishes to send a message to the S-ICS, it cannot use the standard message types since the S-ICS will not be able to distinguish between who is the sender due to the bypassing of stream heads.

The controlling thread uses the in-kernel STREAMS interface to communicate to the S-ICS. This allows it to dictate what the message types are since the ones being used would not normally be accessible from user space. If the controlling thread were implemented as a user-space application, then all S-ICS communication would need to utilize transparent ioctls to pass data since these are the only ones guaranteed to be unique enough to distinguish from inter-module communication.

The S-ICS will derive its node table and P-ICS access information directly from the controlling thread data structures. The S-ICS will learn the addresses of these structures during its creation. By having the S-ICS access the same information, read-only, the controlling thread may update this data without locks and without needing to directly communicate the new information to all S-ICS. So, route updates or node status can be automatically reflected in all S-ICS. If the controlling thread is implemented in user-space this will not be possible. In such an implementation, there must exist a message exchange protocol for dealing with these updates. Note: the S-ICS could directly update a node's status to indicate it is "down" or that the route to it has failed since it will usually be the first to notice. This write would not require any locks since the node's status is a 4-byte quantity and 4-byte writes in some architectures such as PA-RISC are atomic.

Within the routing algorithm, the S-ICS has the ability to probe the controlling thread in the event that a message route operation is failing. This failure will occur on the local node where the message was generated. The failure is the inability to take a source_queue_index, because it is not defined (invalid), or the local S-ICS local_read_queue or local_write_queue information and derive a remote_target_index. At the moment, I'm not sure what to do to solve this problem. The most that the S-ICS can do, is inform the controlling thread that a route failure has occurred and provide some data and the message that was being sent. In most cases, this problem should never occur if the S-ICS has been implemented as a multiplexor such that each upper mux instance is unique to the distribution point.

4.5.2 Middleware Interaction

The S-ICS will only interact with the middleware 50, if it exists at all, when it requires routing information that might not exist within the controlling thread 34. For example, if the S-ICS detects that a node has failed, it may invoke a recovery policy which will allow it to automatically create a new remote instance on another node. This recovery does not require the local controlling thread to be involved since the S-ICS could just probe the middleware for an alternate route. The probe exchange would look the same as the controlling thread probing the middleware for an address except that the S-ICS would provide the bad route information so that the middleware is updated and does not return this same route as an alternative.

Could all of this be implemented within the controlling threads? Yes and depending upon what services are being provided via STREAMS and how the S-ICS is implemented, it might be simpler to do so.

4.5.3 P-ICS Interaction

The P-ICS 36 is a cluster-dependent technology which the S-ICS is design to treat as a "black box". Communication should occur using a well-defined API with operations being confined to a small "glue" layer which translates generic S-ICS operations into specific P-ICS operations. The following operations, at a minimum, should be provided:

Data must be able to be sent and received from any S-ICS endpoint within the cluster given specific node and route data. This implies that interconnect headers should automatically be generated by the P-ICS and are not the S-ICS responsibility.

The P-ICS 36 must support scatter/gather. Scatter/gather will improve performance and simplify the sending of a mblk header and the associated data by eliminating re-ordering as a problem, i.e. the data arriving and then the header and the S-ICS would have to try and determine what went with what.

Following from above, the data buffers must be treated as a set of contiguous bytes. This will allow the S-ICS to avoid copying data into and out of mblks. For outbound, the S-ICS would create a small buffer area defining a mblk header so that it can be re-created on the target node. In addition, the P-ICS would be given the mp→b_rptr address and a length (mp→b_wptr—mp→b_rptr) which it would treat as the raw data to be sent and the second portion of the scatter/gather message. For inbound, the S-ICS would allocate a mblk via esballoc( ) and assign the mblk header pointers to point to any data being sent in the second portion of the message. It would fill in the mblk header with the header information contained within the first portion of the message. For inbound and outbound, the mblk being sent may be a set of messages linked via the b_cont pointer. For outbound, the mblks should be all of the same message type, so, this should become nothing more than defining a set of scatter/gather data portions and allocating a small data block for each mblk header and sending all of the header data and the user data. On inbound, as the set is interpreted, a mblk header would be allocated for each portion and each data portion would be esballoc( ).

If scatter gather is not supported, then performance will suffer but the above algorithms remained essentially the same except that a protocol header will need to be modified and the out-of-order receive problem will need to be addressed. The mblk header representation might look as follows:

```
struct mblk_header {
    unsigned short b_flag;       /* Original b_flags */
    unsigned short b_band;       /* Original b_band */
    unsigned short db_type;      /* Original message type */
    unsigned short m_flags;      /* mblk header flags to interpret the
                                    data */
    int32 data_size;             /* Actual data difference */
    int32 target_queue_index;    /* Index into target queue index table */
    int32 mblk_seq_number;       /* Sequence number which will match
                                  * the data */
}
```

The data will now require a protocol header to be added to it (this might necessitate either using a stream head write offset to pre-allocate the header space so the header may be added—a common STREAM action—or actually copying the data into a new buffer with the protocol header accounted for—this will slow performance. The protocol header might look like this:

```
struct data_header {
    int32 mblk_seq_number;   /* Sequence number which matches the
                                *mblk */
    unsigned short data_flags;
```

If the P-ICS cannot guarantee packet delivery, such as dealing with congestion control, then the controlling thread and possibly the S-ICS will need to establish a recovery protocol. This recovery protocol may rely upon the upper protocols to recover from messages being lost. For example, if a IP fragment is loss, then IP will timeout and it will perform its normal error recovery based upon the transport provider requirements. When possible, this should be done, but for messages such as port updates between the controlling threads, the controlling threads will need a timeout facility and error recovery mechanism. Of course, if the P-ICS were sender managed, this problem would not occur.

4.5.4 Flow Control

At some point, STREAMS modules and drivers may invoke flow control in order to regulate how much data is being sent to or from a software component or card. STREAMS contains a built-in flow-control facility and several DDI routines to determine the state of flow control. Within a distributed STREAMS environment, these flow control and status functions should work as the developer intended, without module or driver modifications. For this to happen, the S-ICS and the stream head preview functions must reflect each local stream component's view of the next module in the stack (if the stack is not split across nodes, then flow control will be just as in the non-clustered environment and no changes are needed). Again, this will be illustrated using the TCP/IP/DLPI stack with the split between IP and DLPI. Let's start with flow control with respect to DLPI.

DLPI has flow control in both directions (in case the reader is not aware, a streams-based module/driver does not need to deal with flow control, but may rely upon the components in each direction to perform proper flow control). For the outbound case, DLPI cannot overrun the hardware, so it will set its high and low water marks to reflect what the hardware is capable of while keeping the number of back-enabling to a minimum, i.e. the ratio of high and low-water marks is equivalent to many packets worth of data and not just one or two. Such a low ratio will result in excessive flow control situations and potentially the majority of the data being processed through service routines which have additional overhead in terms of path and scheduling.

DLPI does not do anything to initiate flow-control except to not remove messages from its queue so that the high-water mark is exceeded and the upper module will have canput( ) fail and enqueue the message locally. In a cluster, the S-ICS would have to put the message somewhere and then inform the remote node that the DLPI instance is flow controlled to stop message transfer. If this S-ICS instance is a one-to-one mapping with the DLPI, then the S-ICS may enqueue the message locally and continue to receive messages until its high water mark is exceeded. The setting of the S-ICS high-water mark is critical to avoid control message exchange between the S-ICS. The following must be done:

1. When the S-ICS high-water mark is reached, any in-transit messages will continue to be received and enqueued upon the S-ICS.

2. The S-ICS will send a low-latency message to the remote S-ICS to indicate flow-control and to update the route table p_ics_s_ics_status to be flow controlled.

3. The remote S-ICS upper-mux instance will also be placed into a flow control state by enqueuing a mblk which is guaranteed to exceed its high-water mark on its write queue via putq(q, mp). The mblk can be a zero-length mblk whose (b_wptr—b_rptr) indicate that the mblk contains a large amount of data (high-water—large-water+1) but there really isn't any data present. This mblk is pre-allocated at S-ICS creation and stored locally to avoid dealing with bufcall( ).

4. With the remote now flow-control, the local DLPI will drain its queue and the local S-ICS queue, if any. When the local S-ICS low-water mark is reached or perhaps when the S-ICS senses that it has been back-enabled, the S-ICS will send another low-latency message to the remote S-ICS that flow-control is no longer and the remote can begin to send messages.

5. The remote S-ICS begin to send messages until its control mblk is found, in which case, it will remove it (storing it locally) and then back-enable the module/driver instance above it.

If the water mark values are chosen carefully, the number of control messages being exchanged between the S-ICS should be minimal. Now, let's examine the inbound direction, i.e. from the local DLPI to the remote IP. For the inbound direction, DLPI will putnext( ) the message to the upper stream component. In this case, that will be a local stream head and not the remote IP. If DLPI performs a canput( ), it will be able to determine if the local stream head may receive a message and not the remote IP. But even this is not accurate since only messages which must be seen by the controlling thread will actually be enqueued upon the stream head while all others will be directly forwarded to the S-ICS. This is solved as follows:

1. When the driver performs a canput( ) or any of its variants, it will be returned the status of the local S-ICS write queue or the remote IP. This will be accomplished as follows: (a) when the stream head preview function will perform a canput( ) on the S-ICS write queue. (b) Regardless of whether the canput( ) succeeds, the preview function will always place the message on the S-ICS write queue. (c) When the canput( ) fails, the preview function will modify the local stream head QFULL flag. This will cause all future DLPI canput( ) to fail. (d) When the S-ICS is no longer flow-controlled, it will inform the local stream head via the target_queue→target_sth. This is possible whether the S-ICS is designed with a one-to-one mapping or with a many-to-one, in which case, the S-ICS walks the target_queue_index for target_queue_index→s_ics_instance which map to it and updates the target_queue→target_sth directly.

2. The local S-ICS 38 will only become flow-controlled if the remote S-ICS 38A has become flow controlled. The remote S-ICS will be flow-controlled when the upper mux instance's canput( ) fails. When this occurs, the remote S-ICS will enqueue the message on its read queue. The remote S-ICS will may choose to inform the local S-ICS that it is experiencing flow control or it may continue to receive messages until its high-water mark is reached. Again, choosing this high-water mark is critical to keeping the number of control messages being generated between the S-ICS to a minimum and to keep the application receiving data as fast as it can take it.

3. When the local S-ICS receives a flow-control message, it may choose to force local flow control using the same mblk technique used on the outbound path. I would recommend doing this since, in this example, DLPI is designed to handle this situation and the mechanism is capable of ensuring that already received messages will be sent when flow control is relieved.

4. When flow control is relieved on the remote IP, IP will back-enable the remote S-ICS which will, in turn, either immediately generate a control message to the local S-ICS to relieve flow-control or wait until its low-water mark is reached. The advantage of immediately generating the message is the amount of time necessary to drain the local messages is probably much less than the time to generate the message and send it and begin data transfer again. So, doing so hides this latency from the stack and the application.

Here are some other key points to remember:

As can be seen, the control messages between the S-ICS instances must be low-latency and must be reliably sent between the nodes. If these messages are lost, then the stacks will remain flow-controlled and the application will hang. If the P-ICS drops messages due to congestion control, the S-ICS will need a request-reply protocol to deal with this situation (this, of course, reduces performance). This protocol will also require time outs be used to retransmit the request should the reply not come back quickly enough.

S-ICS control messages should be low-latency. If the P-ICS does not support such a concept, then a control message could be blocked behind a bulk data transfer. If this is possible, the S-ICS high and low-water marks must be set such that they do not allow the S-ICS to consume too much memory. Also, the S-ICS design complexity may be increased.

If the P-ICS provides sender-based management of data, then their should never be a congestion control problem since the control messages can always be sent if the sender has available buffer space. In addition, sender-based management, in general, will almost certainly allow low-latency messages since it can partition the receive buffer or have dedicated buffers for these tasks. In case you haven't guessed, distributed STREAMS is much easier to implement using sender-based interconnects.

While not part of flow-control, the DDI routines noenable( ) and enableok( ) are used to control whether a module/driver may process messages. These routines examine the QNOENB flag. Normally, this flag is used only on the local queue being accessed and not for the next queue in the stack so there is nothing special for that case. If used for remote access (not recommended), then the S-ICS will need to use a similar control message logic as for the QFULL flag.

5.0 Creating a Distributed Stream

In a previous section, a distributed STREAM falls into one of four categories: (1) a STREAM which exists on a node but makes use of cluster-wide facilities, (2) a stream which executes on a different node from the application, (3) a stream which has its components split among two or more nodes, and (4) a streams-based pipe with each pipe end executing upon a different node. This section will discuss how each of these types are created.

5.1 Cluster-wide Facility Stream

This type of stream was illustrated in the global port mapping example. This stream has various components of its stack augmented to communicate with the controlling thread or possibly the S-ICS, depending upon the what services are needed. For this to occur, the controlling thread must be informed when a stream is being created so that it may perform the proper augmentation. This is accomplished as follows:

1. An application opens a streams-based driver by opening a file. This file will be of the form: /dev/driver_name. If the cluster provides a single-system view of the file system, the open code will derive a node specific dev_t structure. dev_t defines the major and minor number of the device which is being opened. By examining this structure, the STREAMS framework will execute the corresponding driver open routine which is stored within the qinit structure of the driver's streamtab entry.

2. When clustering is enabled via the creation of a controlling thread, a global structure within the STREAMS framework, will be set to TRUE and the master controlling thread address data will be valid. During open processing, the framework code will examine this global. If FALSE, then the open proceeds just as before as in the non-clustered environment. If TRUE, the open code will contact this controlling thread and pass it the dev_t that is being opened and await the controlling thread to respond.

3. The controlling thread will examine the dev_t and compare it with the drivers it is suppose to handle. If the driver requires no special processing, then it simply returns and the open code proceeds as before. If special, then the controlling thread will invoke the associated driver open policy.

4. The driver open policy will indicate how the open is to be accomplished, whether the stream is to be created as a split stream, and what functions must be invoked once the stream has been created and all modules have been auto-pushed. For this stream, this policy will indicate that the open is to be performed locally and that the following function must be invoked once the stream stack has been completed.

5. For the global port mapping example, a function would be called to augment the TCP and IP code. This function will be invoked (without the controlling thread understanding any specifics, i.e. this function is implementation independent of the controlling thread), right before the framework returns from completing all of its open tasks.

As can be seen, this stream type does not require any modification of the drivers or module implementations and the controlling thread may remain completely ignorant of the underlying protocols being implemented by this stack.

5.2 Different Node Stream

Figure 14:
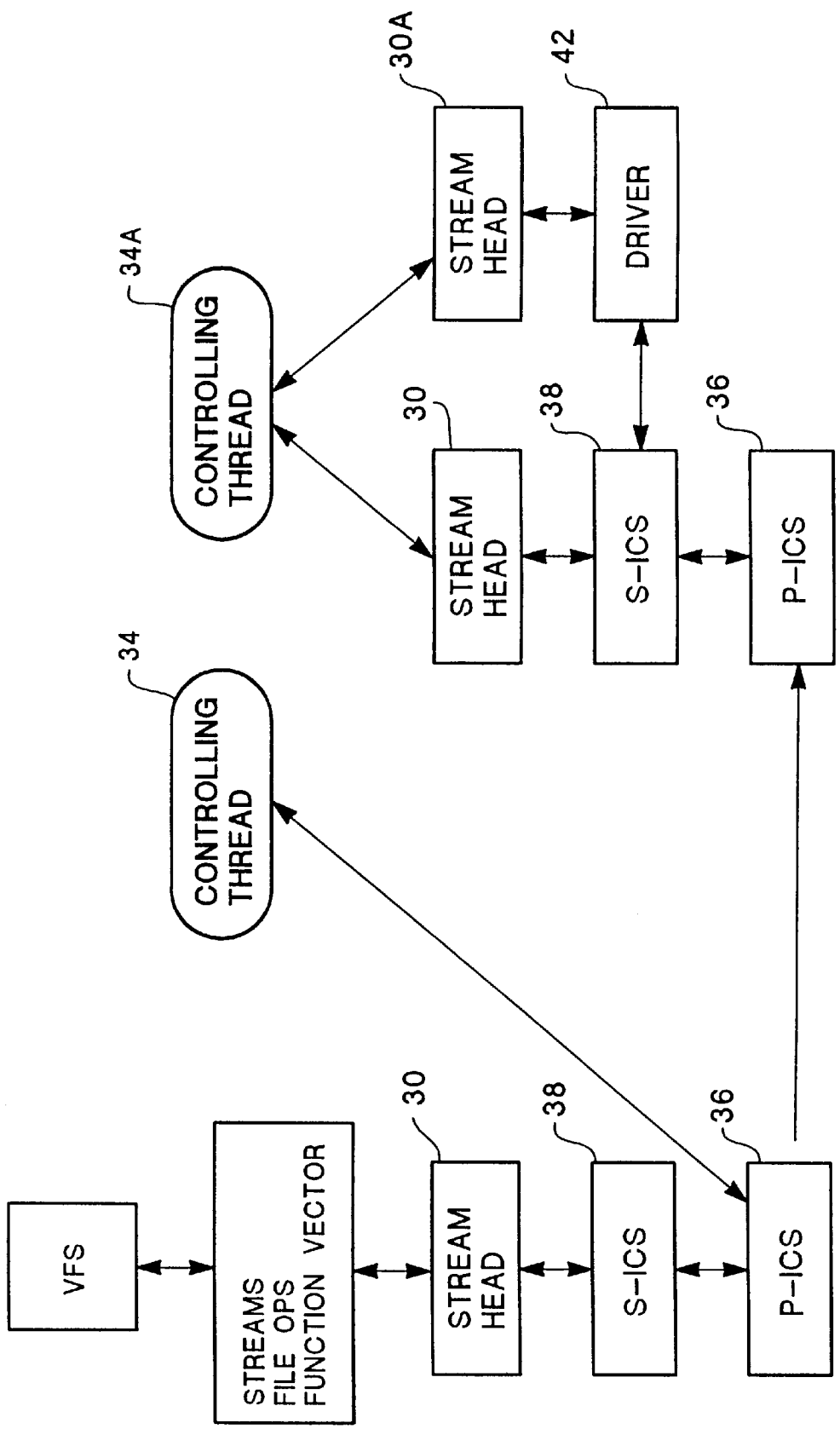
FIG. 14 shows one alternative process for opening a driver in a STREAMS framework, the process being distributed over two nodes in the cluster of FIG. 1 with a recovery mechanism.

If a stream stack will exist on a different node from where the application is executing, the controlling thread 34 must be able to determine where this node is and establish an interconnect. Referring to FIG. 14, this is accomplished as follows:

1. The open code proceeds as before, but the dev_t that is returned by the VFS will be that of the local S-ICS. In addition, this dev_t will use a special device major number similar to the clone major number. As with a clone device, the minor number is the encoded major number of the real device driver being opened. The controlling thread will see that the S-ICS is being opened and will derive the real major number by using the minor(dev_t) call.

2. The controlling thread 34 then examines the major number open policy to determine how it should go about determining which node to perform the open upon. The policy could be any of the following: probe a local data structure to find the corresponding node identifier which could have been built during the controlling thread and cluster initialization step, broadcast a request to other controlling threads to determine which one has the requested driver and which is the best choice in terms of load, or contact a middleware entity who should have similar data. In any case, the controlling thread can determine a target node address, a remote controlling thread address, and a remote S-ICS address—depending upon implementation.

3. The controlling thread 34 will contact the remote controlling thread 34A and pass it the driver name—the dev_t with the minor number now being the major number.

4. The remote controlling thread will perform an in-kernel streams_open( ) of the given driver. This open will perform the configured autopush activity just as in the non-clustered environment. When the remote controlling thread has completed the open, it will return a message with the remote S-ICS address and the associated remote_target_index to be used.

5. The controlling thread now knows that the open can succeed and performs the open to the local S-ICS driver, flowing through the standard framework open code.

6. Just as before with the function augmentation, the controlling thread will have stored a function vector to be executed once the before the open finally returns. The functions invoked will sending messages to the local S-ICS, using the remote_target_index. This will serve two purposes. First, it will allow the local S-ICS to change what is currently the associated dev_t in sth→sth_cluster_route_id with the correct route table index. Second, it will allow the remote S-ICS to update its routing table, if necessary, to signal that messages may now be sent between the two nodes for this stream. The open has completed.

The advantages are:

The STREAMS system calls do not require any modifications to work. This is an important point to remember—no modifications are necessary. No added complexity. No additional coordination between nodes. No potential new timing problems. Even select( ) and poll( ) work just as before which they cannot possibly do with the alternative. For those implementing other operating system components, a S-ICS analog could be built to provide the same type of function shipment. If this is not done, the file_ops could be remapped at open time to be the STREAMS file_ops as is done for the non-clustered environment, and the other components could operate as in the alternative configuration.

The configuration does not impose any performance degradation when the system calls are executing in the non-clustered environment.

The configuration utilizes existing functionality and algorithms so there is no additional work to support it.

Synchronous system calls do not cause undue complexity or modification to any component since the actual waiting occurs on the local system and not the remote. For example, if an application has posted a read for 2000 bytes and only 1000 bytes have been received, then the system call will sleep until the remaining 1000 bytes or an interrupt occur. With the alternative described below, the migration software will need to extract the local stack frame variables and record this information so that the system calls can be restarted in the same state. By having system calls occur on the local node via the S-ICS, these system calls never need to be restarted and operate as before.

Node failure detection and recovery may be easier to implement transparently to the application due to the system call execution occurring locally. This means that local stack frame variables could be re-used to restart the system calls once the stack is re-created; the next configuration may not be capable of this.

getmsg( ), getpmsg( ), putmsg(), putpmsg( ), poll( ), and select( ) do not require modification to work within this configuration. They work as though the stack were local. These are singled out since only select( ) goes through the file_ops function vector and rest operate as normal system calls.

The disadvantages are:

There are potentially more components for data to flow through which may cause performance problems.

The configuration is not identical for STREAMS and non-STREAMS devices which means there are two ways system calls may be being processed. This is not necessarily bad, but it does mean that troubleshooting will need to recognize this situation.

Figure 15:
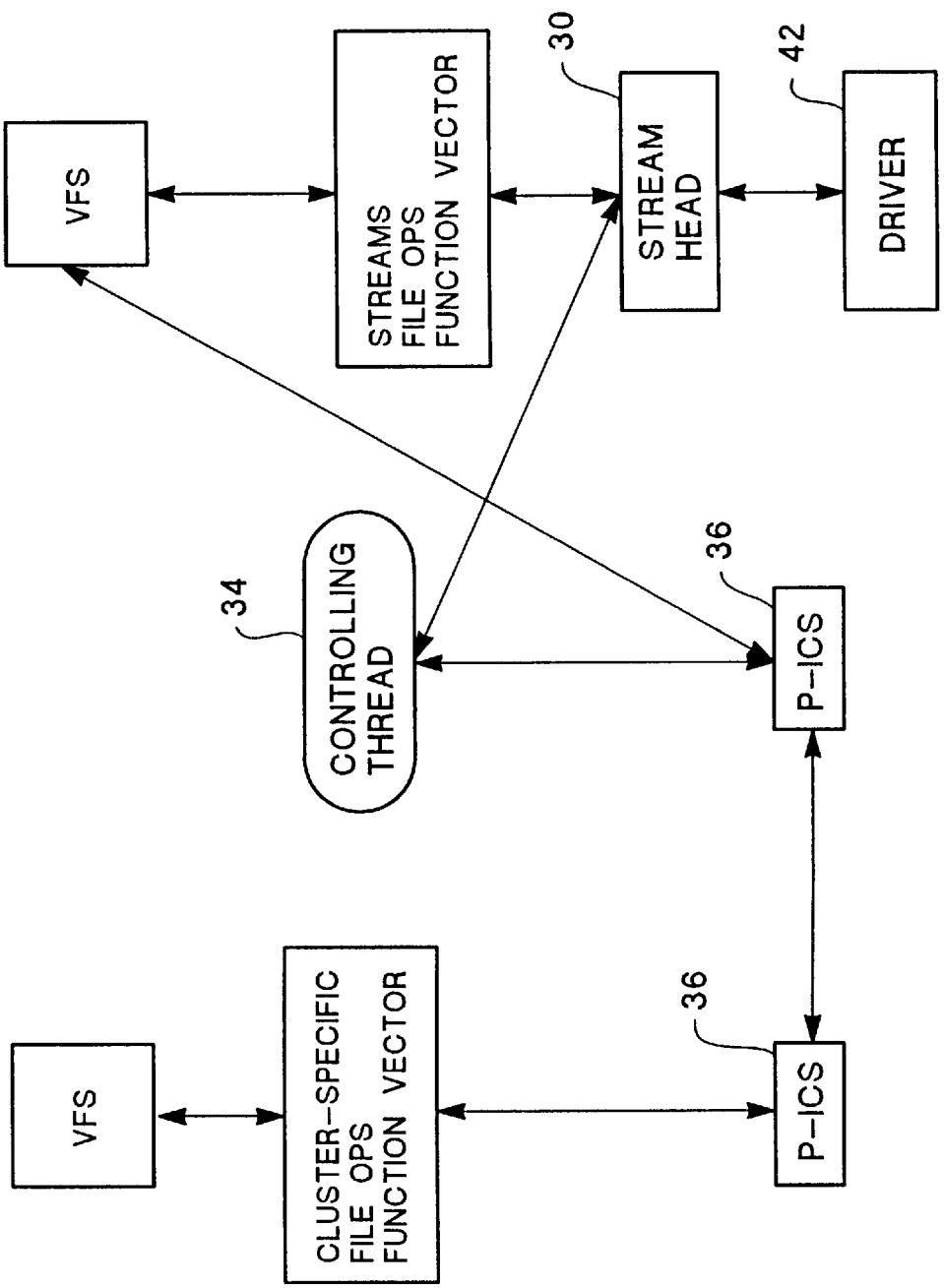
FIG. 15 shows a second alternative process for opening a driver in a STREAMS framework only on a remote node in the cluster of FIG. 1 without a recovery mechanism.

An alternative. The above scenario and configuration is not the only way to implement this configuration. Using FIG. 15, we will examine an alternative configuration and algorithm.

This configuration is created as follows:

1. VFS will need to be modified to understand that the target device will exist on a remote node and a mechanism will need to be created to redirect the open to that node.

2. On the remote node, there must exist a kernel thread, similar to the controlling thread, which will perform the actual open.

3. For the most part, the open proceeds normally with the controlling thread being involved only if the local components need to make use of the cluster-wide facilities.

The advantages are:

There are fewer components involved in sending a message, at least on the surface.

The configuration and implementation may be leveraged for non-STREAMS drivers.

The disadvantages are:

All STREAMS system calls and handler functions will require modification to deal with the movement of data going to intermediate structures for routing to the remote node. For example, read( ) and write( ) use copyin( ) and copyout( ) to move data via the uio structure from user to kernel space. This structure contains user space addresses which must now be changed to be kernel space addresses and the copyin( )/copyout( ) must be replaced with lbcopy( ) with the kernel sid.

A new kernel thread will need to exist to process all synchronous requests which may result in excessive context switching which will reduce performance. This is necessary since the P-ICS cannot be held up until all of the data necessary to satisfy a request can be processed by the local stream stack.

This configuration requires that a distinct middleware entity be involved for migration and management issues. The previous configuration only needs to rely upon the controlling thread to perform these tasks.

Unless the VFS function vectors are replaced with a cluster-specific function vector instead of making the decision down at the specfs layer (special file interface code), the non-clustered environment will suffer a performance penalty of determining if this is a cluster or not.

Which configuration to use depends upon the rest of the operating system modifications for clustering and what the real performance turns out for each. As a first step, I would recommend implementing the first configuration since it requires less work and coordination with the rest of the operating system. The rest of the operating system could decide to create a S-ICS analog to handle this situation and thus avoid all of the problems that will be encountered. If this is not done, then the non-clustered environment will suffer performance degradation and any degradation is unacceptable.

5.3 Split Component Stream

A split component stream is just a special instance of the different node stream configuration and, as such, its open processing will just be a special instance of this. The steps will be as follows:

1. Step one is identical
2. When the controlling thread examines the major number open policy, it will see that the operation is to create a split-stream configuration. The controlling thread will contact the remote target node and pass it the driver name—the dev_t with the minor number now being the major number. As with the previous step 4, the remote controlling thread will open the driver and perform the configured autopush activity. When this is complete, the lower portion of the stream stack should be built.
3. As before, the local controlling thread will open the S-ICS the only difference here will be that the upper portion of the stack, i.e. any local modules, will now be pushed upon the S-ICS and the stack will be complete and the associated messages will be generated and processed.

So, there really is not much difference. An example of doing this would be to split the TCP/IP/DLPI stack not at the IP/DLPI level but at the TCP/IP level. This would allow IP to be opened where the hardware is and to have the local DLPI directly linked underneath it. I've already mentioned that such a split is not recommended, but the fact that we have multiplexor is of interest. Using the recommended split at the IP/DLPI level, we will have a multiplexor whose components exist on different nodes.

To accomplish this, we must first remember that a multiplexor is created by opening two devices and linking them together using the I_LINK or P_LINK ioctl call. In this case, we have one component which is local, IP in our example, and one that is remote. So, all we do is apply the previously described open sequences. For IP, the open will occur on the local node; for DLPI, it will occur on the remote node with the local stream head really being for the S-ICS. Once the opens have completed, the application will perform a normal link operation and communication may now occur between components.

5.3.1 Creating a Split Stream from a Single Stream Stack

At some point, due to load balancing and potential hardware sharing, it may be necessary to split a stack into components which execute on different nodes. For the most part this is accomplished by utilizing parts of the open algorithms already described and by using the migration facilities. The basic approach is as follows:

1. The controlling thread will be informed that the stream stack needs to be split into its components. The message indicating the split will also indicate the nodes (could be local and remote or even both being remote) where the components will reside.
2. The controlling thread will issue a STREAM framework specific ioctl via streams_ioctl( ), I_SPLIT_STACK using S' encoding, to the stream head using the in-kernel STREAMS interface. The ioctl will result in the stream being frozen and the invocation and creation of all of the necessary components depending upon where the split is to occur. If the split is between IP and DLPI, then all that would need to be gathered is the TCP or UDP module private data and state. The ioctl will return a migration structure, defined later, containing this information. Note: for a split at the IP/DLPI level, IP will eventually become flow-control on the inbound path, in which case, it will either start dropping packets or will inform DLPI to stop sending to this address.
3. When the ioctl returns, the controlling thread will migrate the components to their respective nodes.
4. In the case of hardware sharing, some components may remain local while the upper components migrate, e.g. TCP/IP could migrate to a new node while the DLPI portion remains or perhaps the local hardware card failed and the DLPI will be recreated on a new node. In these situations, there are a number of additional steps which must be taken.
5. If the DLPI is being migrated, the IP will need to have DLPI linked underneath it. This will require the controlling thread to replace the old DLPI with a S-ICS instance which can communicate with the new remote DLPI. This can be accomplished in two ways: an unlink/link operation could be performed by the controlling thread, in which case one needs to be aware of any IP-to-DLPI initialization messages and take appropriate actions, or the controlling thread, could issue an ioctl to the S-ICS to modify the framework structures on IP to now point to the S-ICS for this route. The first approach is probably safest and simplest to implement. Note: once the DLPI is migrated, an ARP must be issued so that the remote driver will understand the new physical to logical address mapping.
6. If the TCP/IP is migrated, the controlling thread will perform similar steps as were seen in the global port mapping example. It will create a S-ICS upper mux instance to ensure a unique route can be determined. It will then perform a local bind operation to update the IP fanout table to point to this S-ICS. This will allow all inbound packets to be correctly routed, via the S-ICS, to the remote TCP/IP.
7. With this complete, the controlling thread performs a message exchange to the remote to activate the route and confirm the remote_target_index and closes the local TCP/IP stack and frees their current resources. It is assumed that when TCP/IP is migrated, the rest of VFS was updated by the VFS migration software. If it was only the connected, then the Socket or whatever was accessing TCP or UDP will migrate their instance specific data and re-create their state on the target node. This will then require cooperation between the controlling threads and the VFS or Socket migration software at least to the point of re-establishing the stream head mapping structures.
8. In the event an error occurs, since the stacks still exist until the final confirmation messages, the controlling thread will clean up any allocated resources and simply unfreeze the TCP/IP components. This will allow the connection to continue to execute just as before.

5.4 STREAM-Based Pipe

Streams-based pipes create a problem not experienced with normal streams drivers—they do not contain any driver information which could be utilized to find a remote node address. This makes it impossible to transparently open a pipe with each end on a different node without outside intervention. Two approaches exist. The first approach is to create the pipe normally and then migrate one end to another node. The second approach will be to remap the pipe routine to a cluster-specific function which will open a pipe end on each node. In either approach, there must be an outside entity to interrogate for node data and to perform the appropriate work. One question that must be asked concerning the second approach is: is this even a worthwhile approach or task? My recommendation is to use the first approach since it makes use of the given migration capability and most applications using pipes are used to receiving both ends and then passing or broadcasting the one end to other applications or processes. So, this design will assume that the pipe( ) code will create two file descriptors, two file pointers, and two stream heads with their corresponding read and write queues cross-linked together. At this point, I will defer further discussion until the pipe migration section.

6.0 Migrating a Stream

STREAM migration is the migration of a stream stack, either in its entirety or on a per component basis, from one node to another. The following sections will discuss different migration aspects and will illustrate migration using two configurations: the entire stack exists on a separate node from the application and the stack is split between two nodes.

6.1 Marshalling Functions

For each module or driver that is to be migrated, the developer will be required to write two functions which are entirely module/driver specific. Within STREAMS, each queue will contain a pointer (q_ptr) to a private data structure which the developer may make use of to store implementation-specific data for that queue. Since this data structure may contain state-specific information, i.e. timers, retransmission packets, state, etc., this data must be migrated to the new node and be used to re-establish the module/driver in its original state. Since STREAMS cannot know what is pointed to, the developer will need to write these marshalling functions. These functions must have the following capabilities:

- There will be two functions: one to gather the private data and one to restore the private data. Data stored within mblks will be migrated by the STREAMS framework.
- The functions must be able to be invoked by the STREAMS framework without restrictions.
- The functions must take two parameters: a queue and a pointer to a marshalling data structure. The function will use the queue address to de-reference the q_ptr and the OTHERQ(q)→q_ptr which it will use to extract the private data held within each.
- Each function will MALLOC( ) sufficient memory to hold all of its private data that is not contained within mblks. The allocation should use the M_WAITOK flag to ensure the allocation will succeed. This memory will be released using FREE( ).
- Within this allocated memory, the function should contiguously layout all data using a ABI (Application Binary Interface) format. E.g. if there are four integers and a pointer to a private structure, then the integers would be copied into 4*sizeof(integer) bytes, and the contents of the pointer should be copied into sizeof (struct) bytes. This will allow the data to be transferred as a byte stream and then re-assembled on the remote node.
- The functions must cancel any pending timers and record the remaining time. When the component is migrated, the functions must restart the timers.
- The functions must cancel any pending bufcall( ) operations and re-issue the request on the new node. Since bufcall( ) uses a call-back function, this function must exist on the new node.
- The function addresses will be stored within the queue_t structure.

```
struct queue {
    struct qinit * q_qinfo;     /* procedures and limits for queue */
    struct msgb * q_first;      /* head of message queue */
    struct msgb * q_last;       /* tail of message queue */
    struct queue * q_next;      /* next QUEUE in Stream */
    struct queue *q_link;       /* link to scheduling queue */
    void * q_ptr;               /* to private data structure */
    ulong q_count;              /* weighted count of characters on q */
```
```
    ulong q_flag;               /* QUEUE state */
    long q_minpsz;              /* min packet size accepted */
    long q_maxpsz;              /* max packet size accepted */
    ulong q_hiwat;              /* high water mark, for flow control */
    ulong q_lowat;              /* low water mark */
    struct qband * q_bandp;     /* band information */
    *unsigne4 char q_nband;     /* number of bands */
    unsigned char q_pad1[3];    /* reserved */
    struct queue * q_other      /* pointer to other Q in queue pair */
    int32 (*q_marshall_func)(queue_t *q, struct marshall *marsh_ptr);
    int32 (*q_demarshall_func)(queue_t *q, struct marshall *marsh_ptr);
    QUEUE_KERNEL_FIELDS
};
```

The marshalling data structure will be as follows; note that not all fields will be filled out by the marshalling functions—some will be filled out by the STREAMS framework.

```
struct marshall {
    struct streamtab *str_tab;
    caddr_t str_frame_wk;
    caddr_t q_private_data;
    mblkP read _mp;
    mblkP write_mp;
    mblkP read_mp_private;
    mblkP write_mp_private;
}
``` str_tab is the current streamtab entry for this module/driver. The current streamtab will reflect Dynamic Function Replacement changes. This is filled out by the framework.

str_frame_wk will point to memory which contains all STREAMS framework data for this component. This information includes local stack frame structures for systems calls being processed, synchronization queues, etc.

q_private_data is the pointer to the structure allocated by the marshalling function. This should contain both read and write q_tpr data.

read_mp and write_mp are the mblk chains for messages which are enqueued upon the queues awaiting processing. These are created by the framework.

read_mp_private and write_mp_private are mblk chains which are currently being held by the module/component. These could be messages which are awaiting retransmission. Note: all mblks being migrated are linked together using the b_next/b_prev fields. It is assumed that all mblks being linked via the b_cont pointer are part of a single message.

When this structure has been filled out, the controlling thread will transmit this data to the remote which will apply the reverse function which will re-create the structure locally. The developer will be responsible for re-creating the read and write queue q_ptr structures and for freeing the q_private_data via FREE( ).

6.2 Entire Stack Elsewhere Discussion

In a previous section, I illustrated two configurations of how this might be implemented. In the alternative, there is no local STREAM framework components so migration consists of migrating the stack normally and simply updating the VFS layers on the two nodes. Therefore, the rest of this discussion will focus on the first configuration and how it is migrated. This will be used as a basis for migration in general.

1. The controlling thread will acquire the S-ICS write queue and will force a flow-control situation on the "write"

path to occur on the local S-ICS instance. This will prevent any further messages from being sent from this node to the remote.

2. The controlling thread will inform the remote controlling thread that a migration is to occur and will identify the components using the remote_target_index.

3. The remote controlling thread will disable the driver's local stream head and disable the stream head preview functions. It will also set the QFULL flag within the stream head. Between these two steps, all downstream activity will be prevented from forwarding data to the local S-ICS or to the local stream head.

4. The remote controlling thread will invoke the normal migration algorithm for these components. When this is completed, it will send a message to the initiating controlling thread that migration will now occur.

5. When migration has completed, the remote controlling thread will send a message to the initiating thread confirming the migration status and the new route table data.

6. The controlling thread will then update the S-ICS route table with the new information.

7. At this point, the controlling thread will relieve the flow control and allow the S-ICS to send messages. Relieving flow control will also result in a message to the remote S-ICS that it may now forward messages from the stream stack.

6.3 Migration Algorithm

In this section, I will detail the migration steps just discussed. Hopefully, it should become apparent that there really are no differences between migrating an entire stream stack and migrating a distributed component. The steps are:

1. The controlling thread will acquire the S-ICS write queue and will force a flow-control situation on the "write" path to occur on the local S-ICS instance. This will prevent any further messages from being sent from this node to the remote. To do this, the controlling thread will utilize the flow-control mblk which is stored within each S-ICS instance. It will perform a putq(wq, mp) upon the S-ICS write queue and note this state within the S-ICS.

2. The controlling thread will inform the remote controlling thread that a migration is to occur and will identify the components using the remote_target_index. The remote_target_index is determined by deriving the route table entry. To derive the route table entry, the controlling thread will need to identify the S-ICS instance managing this stream stack. The S-ICS address will be found within the local component's stream head along with the cluster_route_id. These two components will be used to index into the correct route table entry and derive the data.

3. The remote controlling thread will disable the driver's local stream head and disable the stream head preview functions. The remote controlling thread identifies the associated stream head by find the corresponding target_queue entry based on the remote_target_index (this algorithm has already been explained). Within the target_queue, the target_sth will be derived. Using the in-kernel streams_ioctl( ), the remote controlling thread will reverse the process to set up the preview functions. This will prevent the lower module/driver from bypassing the stream head and placing the messages upon the local S-ICS.

4. The remote controlling thread will also set the QFULL flag within the stream head read queue; this will prevent lower modules or drivers from attempting to enqueue messages upon the stream head. As they sense this condition, they too will become flow-controlled or will drop messages as part of their standard protocol operation. In any case, the messages will no longer flow upstream.

5. With this performed, the remote controlling thread will contact the target remote node. It will have the target remote controlling thread perform a normal open operation and create the same stack configuration that exists on this node. When this is completed, the target node will respond with the appropriate messages and data to begin data exchange. Note: when the target node controlling thread creates the stack, it will have the STREAMS framework acquire all synchronization queues for the stack instance. This will prevent any activity from occurring on these queues until migration has completed.

6. At this point, the remote controlling thread is now assured that the migration is possible, but not guaranteed. It will now acquire all stack synchronization queues starting with the lowest component. This will quiesce all outstanding service routines into one of two known states: the service routine will have completed its execution or the service routine will be placed onto a "turnover" execution path due to not being able to acquire the needed synchronization queues. When this has occurred, the STREAMS framework may migrate all pending service routines and the associated messages to the target stack. Side note: if the STREAMS implementation executes service routines out of the process u-area, then these must be extracted and migrated. Also, if software interrupts are used to execute service routines, when migration is complete, all service routines will need to be restarted as new software interrupts. This implies that there must be a linked list that service routine requests would be placed upon until the stack is re-started.

7. The controlling thread will now allow all non-blocking system calls to complete. All blocking system calls will be frozen and their state recorded and sent to the new node for restart. If the stack is moving but the application is remaining, then the framework must perform a content switch within the local system. To do this the following may need to be done depending upon the file system implementation: The vnode v_rdev is updated to point to the dev_t associated with the S-ICS. Similarly, the vnode v_stream is replaced with the stream head pointer of the S-ICS instance. These two steps may be accomplished by replacing the associated file pointer f_data field which points to a vnode structure, with the S-ICS vnode instance which was created during the S-ICS open sequence.

8. The controlling thread marshals the STREAMS framework data for this stack. This will include all intermediate system call results, stream head flags, internal system call handling structures, synchronization queue data and pending requests, all queue flags, all Dynamic Function Replacement data, all Dynamic Function Registration data, all messages and their bands, all M_SETOPTS-related modifications, etc. This data is sent to the target controlling thread who will rebuild the stack framework.

9. It will then invoke the marshalling function for each stream component which has one including the STREAM framework functions, generating a marshall structure for each component.

10. This structure will be passed to the target controlling thread who will invoke the marshalling function to reverse the process on this stack. The only concern here is the possibility that the target node will be unable to re-create all of the data and messages due to potential memory constraints. This can be handled in two ways: The migration could just fail and the remote controlling thread would note the failure and restore the state and clean up the allocated resources. It would then await for the initiating controlling thread to select a new target node and begin the process anew. The other way is to have the STREAMS framework create a memory recovery algorithm which while more work reduces the migration complexity for the controlling threads.

11. When the target node has completed the operation, it will inform the remote controlling thread who will, in turn, inform the controlling thread. The remote controlling thread will then tear down the existing stream stack and clean up all resources. The target controlling thread will then release all synchronization queues and allow the stack and any pending system calls to restart.

12. The controlling thread will then update the S-ICS route table with the new data and will relieve the flow control by removing the mblk. This will allow communication to begin with the new node.

If the controlling threads detect an error at any point, they will simply undo what has been done and restart the stack. This is possible since the migration process does not alter any aspect of the stack until the migration is complete. Side note: In many situations, migration may occur due to node or hardware failure. This means that the controlling thread will be the initiating entity and not a cluster management thread. In addition, depending upon the stack configuration, some migration may occur automatically between the controlling thread which detects the failure and the S-ICS resident with the application. Recovery may consist of rolling to a new interface card on the same node or on a new node. Whatever the situation, all of the steps previously described may or may not be involved with every migration situation, so remember to adapt what is useful and discard the rest on a case-by-case basis.

7.0 STREAMS Synchronization

Currently, HP and a number of other vendor STREAMS implementations support different levels of automatic framework synchronization. These levels were created to relieve the module or driver developer from having to create their own synchronization mechanism to data and to control what put or service routines may be executed in parallel. The five levels are: queue, queue-pair, module, elsewhere, and global. These levels are defined as:

The queue synchronization level provides the most concurrency. It serializes access to a queue so that only one instance of this queue's put or service routine is executed at a time. Different queue instances may have either their put or service routines executed in parallel on different processors.

The queue-pair synchronization level serializes access to the read and write queue pair so that only one of the four functions—read put, read service, write put, or write service—are executed at a time. Different queue pair instances may execute in parallel on different processors.

The module synchronization level serializes access to all of a module's queue pairs or instances. In other words only one module instance's read put, read service, write put, or write service routine may execute at a time. Different modules may execute in parallel on different processors.

Elsewhere synchronization provides a group of different modules to execute only one function at a time. This would imply a cooperating task among multiple drivers and/or modules. While rarely used, it can provide a simple synchronization mechanism for a complex application.

Global synchronization does not provide any parallelism. It allows only one module out of those configured for global synchronization to execute at a time.

Again, the most important feature shared by all synchronization levels is that each level also provides a different level of how much and to what extent information may be shared without requiring additional locking mechanisms. For example, elsewhere allows disparate modules to easily share data without having to coordinate a set of spinlocks and such. The framework provides a simple identifier to indicate who may access and then all access is automatically serialized without additional spinlocks or semaphores.

The actual implementation of these synchronization levels is accomplished by manipulating parent synchronization queues which are stored at different locations within the stack or the kernel. For example, queue and queue-pair synchronization stores the parent synchronization queue local to the queue while module stores the parent synchronization queue address within the fmodsw table. Elsewhere and global are also unique to only the local kernel instance. As such, a cluster configuration may only distribute those drivers and modules which support either queue or queue-pair synchronization. Now this does not eliminate the other levels from operating, but they may only operate within a local node. For example, the Streams-based TCP ARP module uses module level synchronization and cannot be distributed. For the most part, this is not a problem since IP, which communicates with ARP would on the same node and being a target driver would not be distributed either.

8.0 Driver and Module Switch Tables

When a module or driver is loaded into a system, its streamtab structure and configuration data will be stored within a global switch table for quick and easy access by the STREAMS framework. In most implementations drivers are stored in a dmodsw table while modules are stored in a fmodsw table. For the most part, these tables do not need to be synchronized across the cluster since they are self-contained. The exceptions will be if the modules or drivers make use of the module, global, or elsewhere synchronization levels. For module, this usually isn't a problem since most modules do not require data to be synchronized among all nodes, only those instances local to a particular node. Global and elsewhere are a problem. These levels provide disparant modules and drivers to coordinate activities. To support these levels, the STREAMS framework will need to provide a distributed locking mechanism. Such mechanisms are not difficult to implement but they will add latency and complexity to all operations. The following should be considered when creating such a facility:

If a synchronization lock is currently remote and the operation is currently being executed off of the interrupt stack, the request will need to be enqueued upon a STREAMS daemon who will post a acquire request and execute the request at a later time.

If the underlying P-ICS does not guarantee message delivery, the distributed locking mechanism will require the current lock holder to await an receipt acknowledgment message from the target node before it formally releases the lock. This will require the current holder to post a retransmission timer to deal with the potential loss of a message or the node failing.

Periodically, since there is a single point of failure with such a model, the current holder will need to broadcast to the other lock managing threads where the lock currently is and that all is well. This will act as a heartbeat mechanism and allow the other threads to recover if the heartbeat is not detected.

The switch tables may also be used to store and extract additional information which may be useful:

The streamtab structure may be examined to determine if the driver is a multiplexor. This can be fed into an open policy to determine the appropriate node to perform the open. In addition, one can examine cluster configuration data to also determine if the lower mux will also be on the same node and if this is important or not.

The controlling thread could also examine the streamtab and the autopush data stored within SAD to determine what the stack will eventually look like and determine whether it is appropriate to split the stack or create the entire stack on a node.

The switch table entry could be a global repository for the error, H/A, and migration recovery policies. These policies could be updated from cluster management threads similar to how the Dynamic Function Replacement is accomplished.

9.0 Distributed STRLOG

STREAMS provides the log driver to allow modules or drivers to send logging messages. These logging messages are used for error logging or debugging. The DDI defines a standard utility, strlog( ), to perform this task. Within a kernel, strlog( ) will write a message to the log driver's read queue and schedule the log driver to process it. The log driver will store the messages on its stream head read queue until either strerr or strace is executed by a user thread to pull the messages off. In order to not consume all of kernel memory, the log driver will limit the number of messages it will store, freeing all excess messages.

Figure 16:
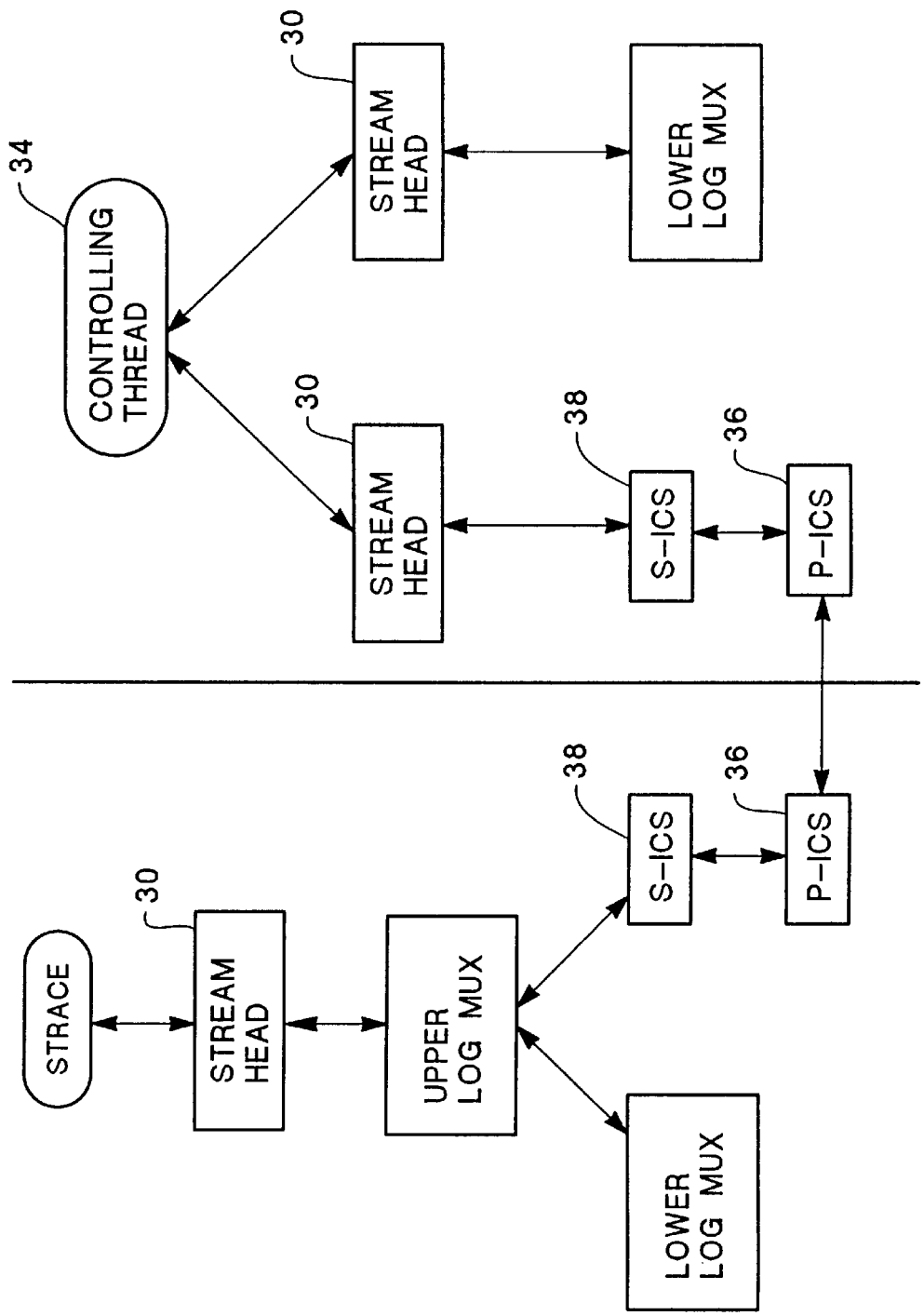
FIG. 16 is a diagram of the system of FIG. 1 showing operation of a log multiplexor in accordance with the invention to present a single system view of STREAMS logging.

Within a cluster presenting a single-system view, if strace or strerr is executed on a node, the cluster should return all log messages for all nodes, noting which node the log messages were generated from for faster fault isolation. The problem is how to deliver the all cluster node messages to a particular node without modifying the strlog( ) definition or usage? The solution is illustrated and explained below with reference to FIG. 16.

When strace is issued, the command opens the log driver and uses getmsg( ) to synchronously pull messages off the driver until it is halted. To do this, the following steps are taken:

1. The log driver implementation is changed; this might be interpreted as a violation of the cluster design rules, but since the log driver is part of the STREAMS implementation, it is an exception (this will also apply to the SAD driver). The log driver is converted into a multiplexing driver. The lower portion is basically the current log driver implementation and should require no changes to work in this environment.

2. Regardless of whether the node is within a cluster, the upper mux will create a lower mux instance using the in-kernel STREAMS interface: str_dev_lookup( ), streams_open( ), and streams_ioctl(I_LINK).

3. The controlling thread, which will note the upper mux being opened, will contact all controlling threads within the cluster that managing the log driver and will establish a separate connection and S-ICS instance per node and link each S-ICS under the upper mux. This will allow the upper mux to prepend a node identifier to each log message before delivering it to the command.

4. When the connections are first made, each node will automatically forward all pending messages to the current node. New messages will automatically be routed via the standard message routing algorithm. Note: components may perform excessive strlog() calls which could result in consuming too much kernel memory. In the non-clustered environment, the log driver will drop messages after N are queued. A similar formula will need to be performed within the upper mux with N*M_node message being allowed and the rest will be dropped.

5. If logging is used often, the controlling threads could pre-stage the S-ICS connections between all nodes and perhaps one or two cluster management nodes. This would allow the cluster to automatically gather STREAM component messages and integrate this capability into a management facility such as HP's Openview.

10.0 Distributed SAD—STREAMS Administration Driver

SAD was created to perform STREAMS driver administration on a node. The primary uses of SAD is to handle autopush requirements and to query a system to determine if a set of modules are present within a system. Within a cluster, applications using SAD will operate either on the local node or on a cluster-wide basis. If operating only on the local node, the application and SAD should not require any changes; for the cluster-wide operation, both will require changes.

Management applications, such as autopush(1m), use ioctls to communicate to the SAD driver. If a single-system view is to be maintained, then the effects of the ioctls must be communicated throughout the cluster. As with the log driver, SAD can be similarly configured into a multiplexor, or, since SAD does not have on-going messages, SAD could just use a single-shot approach to message distribution. Using this approach, the SAD driver would be modified during cluster initialization using Dynamic Function Replacement. The modified put and service routines would communicate the requests to the controlling thread which would take action and return results. Since SAD uses ioctls, the application can safely wait until the M_IOCACK is generated. The communication may take place using the in-kernel STREAMS interface to a well-known stream location, discerned at initialization. For the most part, this task is very straight-forward and could also be made part of a cluster management solution.

11.0 Distributed Stream Head Requirements

When a stream stack is split between multiple nodes, the stream head contents and associated functionality must be reflected between these nodes. The proposed solution is to have the controlling threads examine all stream head-specific messages and take either local action, such as recovering from a M_HANGUP situation, or noting the new stream head write offset and then forwarding the message to the remote node. With this in mind, here is a list of message types and options and corresponding actions to take within the controlling thread.

M_HANGUP—When this message arrives, the sth_rput( ) will place the stream head into an error condition—ENXIO. It will also wakeup any pending system calls and poll events. Within STREAMS, the code should be augmented to verify if the stream head flag F_STH_CLUSTER_CTL_CHECK is set. If this is set, then do not perform any of the normal steps, but enqueue the message and wakeup the controlling thread so that it can perform any error recovery or it may simply forward the message to the remote node and await a response.

M_IOCACK and M_IOCNAK—may be used by the controlling thread or be in-response to an application ioctl. sth_rput( ) should be modified to check if the controlling thread is interested or not. If it is set, the controlling thread will awaken and examine the route data and the ioc_id field to determine whether the ioctl belongs to it or not. If not, it will verify the target route and use streams_putmsg( ) to send the message to the S-ICS who will forward it to the remote node.

M_COPYIN and M_COPYOUT are very tricky messages. They are used to pass addresses to the stream head and a request to copy data in one direction or the other. Since the target address spaces are not aligned due to being on different nodes, the controlling thread and the S-ICS must work together to provide the correct behavior. Since these messages can only be generated during ioctl processing, we can use this information to solve the problem. For either message, the driver will specify a target address to copy data to/from—cq_addr.

For M_COPYIN, the format is one message block with the target address. For this to work, the controlling thread will record the fact that the driver is performing a M_COPYIN operation and will record the target address. It will then forward the message to the S-ICS but as a M_CTL message so the S-ICS will understand this is a special request.

The remote S-ICS will be given this message and it will allocate local kernel memory of cq_size, update the cq_addr, and send up the message as a M_COPYIN request to the local stream head which will perform the copyin( ). When this is completed, the S-ICS will transfer this data back to the originating S-ICS who will send up the data to the controlling thread. The controlling thread will then move the data to the driver's original address which will complete the operation.

For M_COPYOUT, the driver will have supplied the data within M_DATAs. This message chain will be forwarded to the remote S-ICS once the controlling thread has placed it in a M_CTL message so that S-ICS is aware of the special processing requirements.

The S-ICS will update the target cq_addr to reflect the new local address and then forward the message to the local stream head for copyout( ) to occur.

M_IOCTL—These may only come to the stream head for pipes, in which case, a M_IOCNAK should be generated and returned to the remote sending application. Keep in mind that the S-ICS will forward these messages directly to the controlling thread for it to decide.

M_ERROR—As with M_HANGUP, a recovery policy may exist. If the flag is set, then let the controlling thread decide, else process normally.

M_SIG and M_PCSIG are used by drivers and modules to generate signals to the application. If the controlling thread does not use signals, then the messages should be automatically forwarded and not interpreted. Again, check the flag and make the decision to process or not within sth_rput( ).

M_PASSFP—This message may not make much sense since it is suppose to place the file pointer of a pipe from one end to the other so that a I_RECVFD can take place. Once the pipes exist on different nodes, there should not be a need to forward this information, let alone the fact that the file pointers are node-specific and cannot be addressed across nodes.

M_FLUSH—These messages should be processed locally and remotely. The stream head preview functions or the controlling thread should forward the message.

M_SETOPTS—There are quite a few options which a driver may set at the stream head. If this remote driver is setting these options, some will require just reflecting the data while others will require modification to reflect local values. Depending upon the STREAMS implementation, either stream head preview function or the controlling thread can perform the interpretation with local modification values being updated by performing a copyb( ) and updating this message with the correct values while forwarding the modified M_SETOPTS to the remote. The following lists fields and appropriate action.

SO_READOPT, SO_WROFF, SO_MINPSZ, SO_MAXPSZ, SO_MREADON, SO_MREADOFF, SO_ISTTY, SO_ISNTTY, SO_NDELON, SO_NDELOFF, SO_BAND, SO_TOSTOP, and SO_TONSTOP should be forwarded to the remote stream head as is. They should not require local modification.

SO_HIWAT and SO_LOWAT should have the local stream head values updated and then these are forwarded as is to the remote stream head. The values are recorded so that during flow control, the local node will react the same as in the non-clustered environment with respect to the amount of data allowed to be present on the local stream head.

SO_COWENABLE and SO_COWDISABLE may not make much sense within a cluster environment since the driver is remote and any messages being processed will arrive within the kernel. Whether to forward them or not may depend upon whether the remote driver/ modules require this knowledge if they are to take specific actions.

SO_FUNC_DISABLE and SO_FUNC_ENABLE are used to control the Dynamic Function registering. The controlling thread will need to examine the index include within the M_SETOPTS and map it into the remote's function registration array. If the arrays are not set up on both systems to have identical layouts for each modules or driver, then the message will need to be updated. In addition, the functions referenced must exist within the remote kernel image and the driver or module must have been installed via str_install( ) for this to be recognized. These bits must not be interpreted locally since the data conversions or copyin/checksum will occur on the remote node based on the calling application.

12.0 Effects on Copy Avoidance

Copy avoidance and copy-on-write (COW) worked within the distributed STREAMS environment just as before though page remapping may not be possible.

Copy avoidance and copy-on-write can and should be used within a distributed Streams environment and will require no modifications of the current VM implementation. To illustrate why this is possible, let's examine copy avoidance, i.e. page remapping. Page remapping is the ability to remap kernel pages from one space to another, either kernel to user or kernel to kernel. Within a distributed Streams environment, what we really have are two Streams stacks who communicate to drivers. (Note: with the streamstack exists elsewhere configuration, if the functions are just shifted to the remote instead of flowing through the local stream stack as I have recommended, then copy avoidance and COW are not possible and performance will suffer. This should be considered when choosing how to implement the stack.) On the node where the application resides, it is communicating with the local interconnect driver which, since it is a physical driver, it will be creating page-aligned data (when the amount of data is greater than a page) which can be easily remapped into user-space. On the remote node where the actual application driver resides, it too will create page-aligned data when possible. Since the in-kernel thread must send this data down to its local interconnect driver instance, there is no need to remap the data (should there be, we can make use of the kernel-to-kernel page remapping that is currently available).

As for copy-on-write, we always enable this on the application's node since the interconnect driver should be written to always have this feature. On the remote node, since there isn't a user-space block of memory to "lock down", copy-on-write is not necessary. For applications such as Sockets which will probe to determine if the driver supports checksum off-load which would qualify it for copy-on-write, this occurs without modification, but Streams should ignore the result. The simplest way to do this is to have the interconnect driver send up a M_SETOPTS message with a new bit that the stream head will recognize as indicating that the Streams is distributed and one of the actions to be taken is to set the F_STH_COW flag within the stream head.

13.0 MP vs UP-Emulation

HP and a number of vendors STREAM implementations support both (MP) multiprocessor-scalable and (UP) uniprocessor emulation drivers and modules. HP STREAMS does not support a mix and match of MP and UP modules and drivers for a stream stack instance—life is either all one or the other. As such, if a UP module is pushed onto a MP scalable driver, then the driver and all other modules will be converted to use UP-emulation; we do not reverse the process upon popping a UP module off of a stack containing potentially all MP-scalable modules and drivers.

In order to split a UP stream stack, it will be necessary to forward the conversion information which is performed on open( ) or an I_PUSH ioctl, to the remote stack segments. To implement this requires that a new stream head ioctl be created, I_UP_CONVERT. This ioctl is created by using a M_IOCTL message which will be seen by the controlling thread and converted into a streams_ioctl(I_UP_CONVERT) which invokes the already in-place algorithm for converting all currently existing modules and drivers to be UP.

Now, of course the easier solution is to simply not support UP-emulation in such an environment but I doubt that everyone will agree to this.

14.0 Dynamic Function Replacement

Dynamic Function Replacement can be used for a wide variety of tasks. Within a cluster, this functionality requires no modification to continue to work. The only exception is if the stream is split between nodes. When this occurs, the index into the alternative streamtab entries may not be the same across nodes. This is solved by having the controlling thread perform the operation on the correct node with the corresponding index values for that node. This is implemented by modifying the ioctl implementation as follows:

```
case I_ALTSTRTAB_ACTIVE & 0xff:
    /* Allow this ioctl to be called on the lower mux. */
    close_out_check((RWHL_ERROR_FLAGS &
        (~F_STH_LINKED)), sth);
    error = copyin(*(caddr_t *)data, buf, sizeof(struct straltactive));
    if (sth->sth_flags & F_STH_CLUSTER_CTL_CHECK,
        I_ALTSTRTAB_ACTIVE)
        error = func_replace_probe_ctl(sth->ctl_address, buf);
        ioct_dequeue_osr_wakeup(sth, osr);
        return(error);
    }
    error = osr_altstractive(osr);
    break;
case I_ALTSTRTAB_FUTURE & 0xff:
    close_out_check(RWHL_ERROR_FLAGS, sth);
    error = copyin(*(caddr_t *)data, buf, sizeof(struct straltfuture));
    if(sth->sth_flags & F_STH_CLUSTER_CTL_CHECK) {
        func_replace_probe_ctl(sth->ctl_address, buf,
            I_ALTSTRTAB_FUTURE);
        error = func_reg_probe_ctl(sth->c_address, buf);
        ioct_dequeue_osr_wakeup(sth, osr);
        return(error);
    }
    error = osr_altstrfuture(osr);
break;
``` func_replace_probe_ctl( ) will send/receive a message with the buffer being updated to reflect the proper index value. The controlling thread will actually probe the remote controlling thread and carry out the operation on that node and return the results. Note: Since this code is not on the main data path, the performance degradation will not be seen by the application or the rest of the stack. Also, since all of this occurs at the stream head level, the thread is allowed to sleep while awaiting the controlling thread's response.

15.0 Sender-Based Interconnect Requirements

To make distributed streams work within such an environment, there really are not that many changes necessary.

STREAMS operates normally with respect to memory management and usage of allocb( )/freeb( ).

When a message is to be sent, the data needs to just be iomap'ed so that the interconnect has a IOVA (I/O Virtual Address). This mapping operation costs ~12 instructions and could be avoided by creating a few tlb entries which are assigned to the interconnect kernel operations.

Data does not require the pinning operation as would data that existed within user-space since it is always present in the kernel. In the event it is a COW (copy-on-write) buffer, the user data will have already been pinned via the COW call so there should be no differences.

On the receiving side, the S-ICS driver would allocate and pin memory sufficient to meet the distributed STREAMS needs. This memory would be where all user data and the mblk headers would arrive and be esballoc( )'ed. The free function would simply be the interconnect API call to release the memory and acknowledge its receipt to the remote.

Page remapping will not be possible between a local node and an application since the receive buffer area would pinned by interconnect. This problem could be solved by modifying the application to provide a receive buffer area which the S-ICS could be made aware of for this stream instance. To do this would require an additional ioctl to be sent by the application to indicate the address and buffer length. STREAMS would continue to treat allocate mblks using esballoc( ) out of this area but mark them as being already in the user area. The stream head routine would verify this is the case and skip the data movement phase within the routine. To prevent performance degradation and since the stream head routine would be must simpler, we simply remap the STREAMS f_ops to be a cluster-specific vector which understands this behavior. Similar changes could be performed on the write side. Note: for Sockets, all of this could be done in a similar fashion depending upon whether it allows STREAMS to move the data or not.

The only other concern would be the interconnect_ctl_ block but this would be something the S-ICS would set up in kernel memory and the rest of the interconnect API would be modified to understand.

For the most part, a sender-based interconnect implementation offers a number of advantages over the FC4 implementation. It does not suffer from congestion control; it cannot overrun buffers since it is sender managed; it will not drop packets; it has a built-in low-latency mechanism and group notify facility which make the global port mapping and other database synchronization operations faster and simpler to implement. Overall, the sender-based architecture is the best architecture to implement this environment upon; any others would require additional design and complexity to deal with the problems just listed.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A multicomputer system capable of distributed STREAMS operation, the system comprising:

a cluster of two or more nodes connected via a data communications interconnect subsystem, each node including a computer having one or more system processor units, local memory, and input/output subsystem;

an operating system running on each of the system processor units in the cluster, the operating system including a STREAMS message-passing mechanism for use in implementing one or more of networking protocols, client/server applications and services;

a software application operative on the system processor unit of at least one node under control of the operating system to perform a task or solve a problem;

means for creating a distributed STREAMS instance on a first of said nodes (initiating node) which is independent of the application and the message-passing mechanism; and means for migrating at least a portion of the distributed STREAMS instance to a second of said nodes (target node) for execution of a selected task of the software application on the second node transparently with respect to the networking protocols, client/server applications and services on the first node.

2. A multicomputer system according to claim 1 in which:

the STREAMS message-passing mechanism includes a data structure implemented in each computer which provides a bidirectional data path between a user process and a device driver via a module which is an intermediate element that can be dynamically added to or removed from the data path;

the device driver residing in a system kernel of the operating system and operative to control a peripheral device to transfer data between said kernel and said device so that data received by the device driver can travel upstream to the user process; and the STREAM data structure including a stack stored in local memory and containing a set of function pointers for controlling execution of module and driver functions.

3. A multicomputer system according to claim 2 including:

controlling thread means in the operating system for communications with and control of the STREAMS message passing mechanism in accordance with a cluster parameter; and means defining a set of preview functions including a dynamic function replacement function for multiplexing messages between components of the system;

the device driver including a physical cluster interconnect driver (P-ICS) that provides basic communications facilities between nodes in the system under control of the controlling thread and in accordance with the preview functions.

4. A multicomputer system according to claim 3 further including means defining a STREAMS software interconnect driver (S-ICS) for moving messages between two or more of the following system components: the application's STREAMS stack, the controlling thread, the P-ICS, and the preview functions.

5. A multicomputer system according to claim 4 including means defining a middleware thread operative to process and communicate messages between the operating system and the S-ICS software interconnect driver.

6. A multicomputer system according to claim 4 in which the means for creating a distributed STREAMS instance includes:

a file system in the operating system of each node operative upon performing an open function responsive to an open request from the application to initiate opening of the STREAMS mechanism;

means for mapping and saving a device number of the interconnect driver in a first of said nodes (initiating node) to a target device number;

means in the STREAMS mechanism for opening the selected driver on the first node;

means for remapping the saved device number into a node address for a second target node;

means in the interconnect driver for transmitting a message to the target node, the message including the application's open request and the saved device number; and the file system in the target node being responsive to the message to open the target driver.

7. A multicomputer system according to claim 6 in which the target node operating system includes means for returning a message to the initiating node's interconnect driver including a stream head address for the target driver.

8. A multicomputer system according to claim 2 in which the means for migrating at least a portion of the distributed STREAMS instance to a second, target node includes means for communicating at least a portion of the stack on the first node to the second node.

9. A multicomputer system according to claim 8 including:

means for issuing a ioctl representing to the STREAMS mechanism that migration is to occur;

the STREAMS mechanism including means responsive to the ioctl to freeze the stack on the initiating node and forwards a message to the target node which includes information from which the stack can be re-created on the target node.

10. A multicomputer system according to claim 9 in which the STREAMS mechanism includes means for performing a marshalling function upon a portion of the data structure to assemble information needed to replicate a private data structure for a module represented in the stack on the target node.

11. In a multicomputer system capable of STREAMS operation, the system which including a cluster of two or more nodes including a local node and a remote node connected via a data communications interconnect subsystem, each node including a computer having one or more system processor units, local memory, and an input/output subsystem, an operating system running on each of the system processor units in the cluster, the operating system including a file system and a STREAMS message-passing mechanism having an open function for creating a stream head and a driver with bidirectional communications, client/server applications and services, a software application operative on the system processor unit of at least one node under control of the operating system to perform a task or solve a problem, a method of creating a distributed STREAMS data structure, the method comprising:

initiating a controlling thread on each node in the cluster, including determining where STREAMS drivers are located within each node and determining which facilities are associated with each driver;

setting a flag in the STREAMS mechanism on each node in the cluster indicating that clustering is enabled;

assigning a file name uniquely representing a specific driver on a node in the cluster, the file name encoding a major number table identification for each driver and a minor number parameter for selectably identifying at least one of a driver on a remote node and local facilities on the local node;

communicate the file names of the drivers on each node to the other nodes in the cluster through the file system;

running the STREAMS open function to open the driver for the file, looking at the file name to ascertain that it is a clustering facility and, if so, passing the initial major number and minor number to the controlling thread;

the controlling thread using the major and minor numbers to look up the represented devices and facilities and deriving a new major and minor number and passing those numbers along with a set of facilities identifiers back to the STREAMS mechanism; and if the initial major number and minor number pertain to facilities on the remote node, the STREAMS mechanism in the local node opening a STREAMS software interconnect driver (S-ICS) on the local node and the S-ICS driver communicating an open request to the controlling thread on the remote node;

the controlling thread being operative upon initialization to establish a STREAMS software interconnect driver (S-ICS) on the local node;

the controlling thread on the remote node performing an internal STREAMS open to create on the remote node a distributed STREAMS instance of the STREAMS data structure on the local node.

12. A method according to claim 11 including, if the initial major number and minor number pertain to facilities on the local node, the STREAMS mechanism in the local node opening a designated local driver to enable the local facilities associated with that driver.

13. A method according to claim 11 in which:

the STREAMS message-passing mechanism includes a data structure implemented in each computer which provides a bidirectional data path between a user process and a device driver via a module which is an intermediate element that can be dynamically added to or removed from the data path;

the device driver residing in a system kernel of the operating system and operative to control a peripheral device to transfer data between said kernel and said device so that data received by the device driver can travel upstream to the user process; and the STREAM data structure includes a stack stored in local memory and containing a set of function pointers for controlling execution of module and driver functions;

the method including migrating at least a portion of the distributed STREAMS instance to a second of said nodes by communicating at least a portion of the stack on the first node to the second node.

14. A method according to claim 13 in which the STREAMS stack executes on a different node from the node where the application accessing it is executing.

15. A method according to claim 13 in which the STREAM is broken into constituent components at the module/driver/stream head levels with each component being executed on different, individual nodes within the cluster.

16. A method according to claim 13 in which the distributed STEAMS data structure includes a STREAMS-based pipe having two pipe ends, each end executing on a different node within the cluster.

17. A method according to claim 13 in which the STREAMS stack is migrated, either in whole or part, from one node to another.

18. A method according to claim 13 including detecting a failure condition on the second node and initiating error recovery.

19. A method according to claim 13 including performing a marshalling function upon a portion of the data structure to assemble information needed to replicate a private data structure for a module represented in the stack on the second node.

20. A method for migrating at a portion of a stack on multicomputer system capable of distributed operation, from a first node to a second node, wherein the stack contains a set of function pointers for controlling execution of module and driver functions, the method comprising the steps of:

issuing a system call requesting migration;

freezing the stack to prevent message flow into and out of the stack;

marshaling all information necessary to replicate the portion;

delivering the marshaled information to a control thread on the second node;

recreating the portion on the second node;

releasing the remaining portion of the stack; and activating a communications route between the portion on the second node and the remaining portion on the first node.

21. The method of claim 20, further comprising the step of:

informing the control thread on the second node that migration will occur.

22. The method of claim 20, wherein the step of freezing comprises the steps of:

preventing entities from queuing messages for the stack; and preventing the stack from sending out messages.

23. The method of claim 20, wherein the step of marshaling comprises the step of:

forming a marshaling structure for each component of the stack which will be migrated.

24. The method of claim 23, wherein:

the marshaling structure includes state specific information.

25. The method of claim 24, wherein:

the state specific information includes information detailing queued messages awaiting processing, queued messages awaiting transmission, and timer values.

26. The method of claim 20, wherein:

the system call contains necessary information for the migration of the portion of the stack.

27. The method of claim 20, wherein:

the migration is occurring to facilitate load balancing of the nodes of the multicomputer system.

28. The method of claim 20, wherein:

the migration requires the stack to be split between a module and a driver.

29. The method of claim 20, wherein:

the migration requires the stack to be split between a multiplexor and a driver.

30. The method of claim 20, wherein the portion is a driver, the method further comprising the steps of:

installing a software interconnect driver in the first node; and linking the software interconnect driver with the remaining portion of the stack in the first node to allow communications with the migrated driver in the second node.

31. The method of claim 30, further comprising the step of:

updating tables to allow inbound packets to be routed to the migrated driver on the second node through the software interconnect driver.

32. The method of claim 20, wherein the portion is a module, the method further comprising the steps of:

installing an upper level software interconnect driver in the first node; and linking the upper level software interconnect driver with the remaining portion of the stack in the first node to allow communications with the migrated module in the second node.

33. The method of claim 32, further comprising the step of:

updating tables to allow inbound packets to be routed to the migrated module on the second node through the software interconnect driver.

34. The method of claim 20, further comprising the step of:

reallocating resources in the first node which were occupied by the migrated portion.

35. The method of claim 20, wherein:

the step of issuing a system call is performed by a third node.

36. The method of claim 20, wherein:

the distributed operation is STREAMS distributed operation, and the stack is a STREAMS stack.

37. A multicomputer system that is capable of distributed operations and includes a plurality of nodes connected via communications interconnects, the system is running an operating system which uses a messaging mechanism in a portion of its operations, the system comprising:

a plurality of controlling threads, with one controlling thread associated with each node of the plurality of nodes, wherein each controlling thread is resident on a kernel of its associated node, and each controlling thread managing the messaging mechanism resident within its node;

a plurality of stacks, wherein each stack is capable of containing a set of function pointers for controlling execution of module and driver functions useable by the plurality of nodes;

a plurality of a physical interconnection drivers (PID), with one PID associated with each node of the plurality of nodes, wherein each PID which provides communication facilities between its node and the remaining nodes of the plurality of nodes, each PID is under the control of the control thread of the same node;

a plurality of a software interconnection drivers (SID), with one SID associated with each node of the plurality of nodes, wherein each SID allows communications between the PID of its associated node and at least one other component of its node, each SID is under the control of the control thread of the same node; and a plurality of preview functions, with at least one preview function associated with each node of the plurality of nodes, wherein each preview function is a policy regarding a system wide facility, the controlling thread of the associated node will use the at least one preview function to modify operations of the associated stack.

38. The system of claim 37, wherein:

each controlling thread acts as a third-party communication and control point for its associated node.

39. The system of claim 37, wherein:

the stack is created with assistance from the controlling thread of its associated node.

40. The system of claim 37, wherein:

a portion of the stack of one node of the plurality of nodes may be migrated to another node of the plurality of nodes.

41. The system of claim 37, wherein:

each stack may utilize components resident on other nodes of the plurality of nodes.

42. The system of claim 41, wherein:

a controlling thread may create components to allow the stack associated with its node to utilize components resident on the other nodes.

43. The system of claim 37, wherein:

a controlling thread creates the SID for its associated node.

44. The system of claim 37, wherein:

each node includes at least one SMP processor.

45. The system of claim 37, wherein:

the distributed operation is a STREAMS distributed operation, the messaging mechanism is a STREAMS messaging mechanism, and the stack is a STREAMS stack.

46. The system of claim 37, wherein:

a stack of the plurality of stacks includes a stream head and a driver.

47. The system of claim 37, wherein:

a stack of the plurality of stacks includes a stream head, at least one module, and at least one driver.

* * * * *